United States Patent [19]

Takeda et al.

[11] Patent Number: 6,071,191
[45] Date of Patent: Jun. 6, 2000

[54] SYSTEMS AND METHODS FOR PROVIDING SECURITY IN A VIDEO GAME SYSTEM

[75] Inventors: Genyo Takeda, Kyoto; Shuhei Kato, Otsu; Satoshi Nishiumi, Kyoto, all of Japan

[73] Assignee: Nintendo Co., Ltd., Kyoto, Japan

[21] Appl. No.: 08/850,676

[22] Filed: May 2, 1997

Related U.S. Application Data

[63] Continuation-in-part of application No. 08/562,288, Nov. 22, 1995.

[51] Int. Cl.[7] ........................................ G06F 1/00
[52] U.S. Cl. .................... 463/29; 463/36; 463/43
[58] Field of Search ................... 463/29, 36, 43, 463/44, 45, 46, 47

[56] References Cited

U.S. PATENT DOCUMENTS

| | | | |
|---|---|---|---|
| Re. 31,200 | 4/1983 | Sukonick et al. | 345/24 |
| Re. 35,839 | 7/1998 | Asai et al. | 380/3 |
| D. 316,879 | 5/1991 | Shulman et al. | D14/117.7 |
| D. 317,946 | 7/1991 | Tse | D14/117.7 |
| D. 357,712 | 4/1995 | Wu | D14/117.7 |
| D. 363,092 | 10/1995 | Hung | D21/453 |
| D. 375,326 | 11/1996 | Yokoi et al. | D14/117.1 |
| 3,755,641 | 8/1973 | Rackman | 200/52 R |
| 3,772,662 | 11/1973 | Blair | 360/60 |
| 3,818,190 | 6/1974 | Silverman et al. | 235/382 |

(List continued on next page.)

FOREIGN PATENT DOCUMENTS

| | | |
|---|---|---|
| 0 268 419 | of 0000 | European Pat. Off. . |
| 0 553 532 | of 0000 | European Pat. Off. . |
| 0 685 246 | of 0000 | European Pat. Off. . |
| 0 724 220 | of 0000 | European Pat. Off. . |
| 0206704A2 | 6/1986 | European Pat. Off. . |

(List continued on next page.)

OTHER PUBLICATIONS

*Open Programming Guide*, "The Official Guide to Learning OpenGL, Release 1," OpenGL Architecture Review Board, Jackie Neider, Tom Davis, Mason Woo, Copyright 1993 by Silicon Graphics, Inc.

*Open GL Reference Manual*, "The Official Reference Document for OpenGL, Release 1," OpenGL Architecture Review Board, Copyright 1992 by Silicon Graphics, Inc.

*MIPS Microprocessor R4000 User's Manual*, First Edition, by Joe Heinrich, Copyright 1993 by MIPS Technologies, Inc.

(List continued on next page.)

*Primary Examiner*—Valencia Martin-Wallace
*Attorney, Agent, or Firm*—Nixon & Vanderhye P.C.

[57] ABSTRACT

A video game system includes a game cartridge which is pluggably attached to a main console having a main processor, a 3D graphics generating coprocessor, expandable main memory and player controllers. A multifunctional peripheral processing subsystem external to the game microprocessor and coprocessor is described which executes commands for handling player controller input/output to thereby lessen the processing burden on the graphics processing subsystem. The player controller processing subsystem is used for both controlling player controller input/output processing and for performing game authenticating security checks continuously during game play. A peripheral interface macro may be executed to start a read or write transaction with each peripheral device and thereafter transfer the transaction results stored in the random access memory to the game microprocessor main memory. The peripheral interface performs security in addition to input/output functions. The peripheral interface interacts with a security microprocessor chip within an external storage unit. The video game system authenticates the security microprocessor chip, and also authenticates the video game program stored on a storage medium within the external storage unit.

16 Claims, 35 Drawing Sheets

U.S. PATENT DOCUMENTS

| | | | |
|---|---|---|---|
| 3,839,736 | 10/1974 | Hoshall | 360/132 |
| 3,859,634 | 1/1975 | Perron et al. | 235/382 |
| 3,934,122 | 1/1976 | Riccitelli | 235/380 |
| 4,095,791 | 6/1978 | Smith et al. | 463/44 |
| 4,117,605 | 10/1978 | Kurland et al. | 434/319 |
| 4,118,789 | 10/1978 | Casto | 364/184 |
| 4,120,030 | 10/1978 | Johnstone | 380/4 |
| 4,149,027 | 4/1979 | Asher et al. | 463/44 |
| 4,193,131 | 3/1980 | Lennon et al. | 380/25 |
| 4,218,582 | 8/1980 | Hellman et al. | 380/30 |
| 4,218,738 | 8/1980 | Matyas et al. | 380/25 |
| 4,268,715 | 5/1981 | Atalla | 380/23 |
| 4,281,215 | 7/1981 | Atalla | 380/23 |
| 4,281,833 | 8/1981 | Sandler et al. | 463/3 |
| 4,295,039 | 10/1981 | Stuckert | 235/380 |
| 4,310,720 | 1/1982 | Check, Jr. | 380/25 |
| 4,352,492 | 10/1982 | Smith | 463/44 |
| 4,359,222 | 11/1982 | Smith, III et al. | 463/31 |
| 4,384,326 | 5/1983 | Devchoudhury | 711/163 |
| 4,386,773 | 6/1983 | Bronstein | 463/44 |
| 4,430,728 | 2/1984 | Beitel et al. | 379/93.02 |
| 4,432,067 | 2/1984 | Nielsen | 463/44 |
| 4,442,486 | 4/1984 | Mayer | 395/186 |
| 4,446,519 | 5/1984 | Thomas | 711/164 |
| 4,454,594 | 6/1984 | Heffron et al. | 395/186 |
| 4,458,315 | 7/1984 | Uchenick | 380/4 |
| 4,459,655 | 7/1984 | Willemin | 364/132 |
| 4,462,076 | 7/1984 | Smith, III | 380/4 |
| 4,469,330 | 9/1984 | Asher | 463/38 |
| 4,471,163 | 9/1984 | Donald et al. | 380/4 |
| 4,471,216 | 9/1984 | Herve | 235/380 |
| 4,492,582 | 1/1985 | Chang et al. | 434/169 |
| 4,497,038 | 1/1985 | Diepold-Scharnitzky | 710/110 |
| 4,500,879 | 2/1985 | Smith, III et al. | 345/16 |
| 4,523,297 | 6/1985 | Ugon et al. | 708/140 |
| 4,552,360 | 11/1985 | Bromley et al. | 463/38 |
| 4,562,306 | 12/1985 | Chou et al. | 380/4 |
| 4,575,622 | 3/1986 | Pellegrini | 463/25 |
| 4,587,510 | 5/1986 | Kim | 338/128 |
| 4,602,351 | 7/1986 | Shimamura et al. | 365/52 |
| 4,652,990 | 3/1987 | Pailen et al. | 380/4 |
| 4,659,313 | 4/1987 | Kuster et al. | 434/45 |
| 4,670,857 | 6/1987 | Rackman | 380/4 |
| 4,680,731 | 7/1987 | Izumi et al. | 365/52 |
| 4,683,553 | 7/1987 | Mollier | 380/4 |
| 4,723,121 | 2/1988 | van den Boom et al. | 340/825.31 |
| 4,736,419 | 4/1988 | Roe | 380/3 |
| 4,748,441 | 5/1988 | Brzezinski | 345/161 |
| 4,755,799 | 7/1988 | Romano | 340/543 |
| 4,757,468 | 7/1988 | Domenik et al. | 380/4 |
| 4,789,927 | 12/1988 | Hannah | 395/800.16 |
| 4,799,635 | 1/1989 | Nakagawa | 711/115 |
| 4,801,787 | 1/1989 | Suzuki | 235/380 |
| 4,817,149 | 3/1989 | Myers | 381/1 |
| 4,824,106 | 4/1989 | Ueda | 463/33 |
| 4,849,746 | 7/1989 | Dubner | 345/124 |
| 4,862,156 | 8/1989 | Westberg et al. | 345/133 |
| 4,865,321 | 9/1989 | Nakagawa et al. | 463/29 |
| 4,868,780 | 9/1989 | Stern | 395/892 |
| 4,870,389 | 9/1989 | Ishiwata et al. | 463/38 |
| 4,879,645 | 11/1989 | Tamado et al. | 235/380 |
| 4,887,966 | 12/1989 | Gellerman | 463/38 |
| 4,891,504 | 1/1990 | Gupta | 235/375 |
| 4,904,851 | 2/1990 | Yukino | 235/379 |
| 4,924,216 | 5/1990 | Leung | 463/38 |
| 4,933,670 | 6/1990 | Wislocki | 345/167 |
| 4,951,232 | 8/1990 | Hannah | 345/422 |
| 4,974,192 | 11/1990 | Face et al. | 710/1 |
| 4,976,429 | 12/1990 | Nagel | 463/34 |
| 4,990,903 | 2/1991 | Cheng et al. | 345/471 |
| 5,001,632 | 3/1991 | Hall-Tipping | 463/36 |
| 5,012,230 | 4/1991 | Yasuda | 345/160 |
| 5,038,297 | 8/1991 | Hannah | 345/422 |
| 5,046,739 | 9/1991 | Reichow | 273/148 B |
| 5,051,737 | 9/1991 | Akeley et al. | 345/434 |
| 5,052,685 | 10/1991 | Lowe et al. | 463/35 |
| 5,070,479 | 12/1991 | Nakagawa | 395/182.04 |
| 5,095,798 | 3/1992 | Okada et al. | 463/35 |
| 5,113,490 | 5/1992 | Winget | 345/419 |
| 5,134,391 | 7/1992 | Okada | 345/116 |
| 5,193,145 | 3/1993 | Akeley | 345/423 |
| 5,203,563 | 4/1993 | Loper, III | 273/148 B |
| 5,207,426 | 5/1993 | Inoue et al. | 463/36 |
| 5,213,327 | 5/1993 | Kitaue | 463/38 |
| 5,230,039 | 7/1993 | Grossman et al. | 345/430 |
| 5,245,320 | 9/1993 | Bouton | 345/167 |
| 5,259,626 | 11/1993 | Ho | 463/37 |
| 5,265,199 | 11/1993 | Catlin | 345/422 |
| 5,265,888 | 11/1993 | Yamamoto | 463/10 |
| 5,266,941 | 11/1993 | Akeley et al. | 345/508 |
| 5,286,024 | 2/1994 | Winblad | 273/148 B |
| 5,290,034 | 3/1994 | Hineman | 363/38 |
| 5,291,189 | 3/1994 | Otake et al. | 345/516 |
| 5,307,450 | 4/1994 | Grossman | 345/423 |
| 5,343,558 | 8/1994 | Akeley | 345/426 |
| 5,347,618 | 9/1994 | Akeley | 345/421 |
| 5,357,604 | 10/1994 | San et al. | 463/31 |
| 5,369,739 | 11/1994 | Akeley | 345/434 |
| 5,388,841 | 2/1995 | San et al. | 463/44 |
| 5,390,937 | 2/1995 | Sakaguchi et al. | 463/7 |
| 5,393,073 | 2/1995 | Best | 463/35 |
| 5,394,170 | 2/1995 | Akeley et al. | 345/509 |
| 5,426,762 | 6/1995 | Nakagawa | 711/115 |
| 5,436,640 | 7/1995 | Reeves | 345/161 |
| 5,451,053 | 9/1995 | Garrido | 463/38 |
| 5,457,668 | 10/1995 | Hibino et al. | 369/32 |
| 5,459,487 | 10/1995 | Bouton | 463/37 |
| 5,473,325 | 12/1995 | McAlindon | 341/20 |
| 5,515,044 | 5/1996 | Glatt | 341/22 |
| 5,541,923 | 7/1996 | Kato | 711/100 |
| 5,550,999 | 8/1996 | Nagano et al. | 711/115 |
| 5,551,693 | 9/1996 | Goto et al. | 463/37 |
| 5,563,629 | 10/1996 | Caprara | 345/160 |
| 5,593,350 | 1/1997 | Bouton et al. | 463/47 |
| 5,607,157 | 3/1997 | Nagashima | 463/37 |
| 5,615,083 | 3/1997 | Burnett | 361/686 |
| 5,624,117 | 4/1997 | Ohkubo et al. | 463/38 |
| 5,632,680 | 5/1997 | Chung | 463/36 |
| 5,640,177 | 6/1997 | Hsu | 345/161 |
| 5,643,087 | 7/1997 | Marcus et al. | 273/148 B |
| 5,649,862 | 7/1997 | Sakaguchi et al. | 463/44 |
| 5,653,637 | 8/1997 | Tai | 463/36 |
| 5,706,029 | 1/1998 | Tai | 463/38 |

FOREIGN PATENT DOCUMENTS

| | | |
|---|---|---|
| 0449530A2 | 3/1991 | European Pat. Off. . |
| 431 732 | 6/1991 | European Pat. Off. . |
| 0 470 615 | 2/1992 | European Pat. Off. . |
| 0 632 407 A1 | 1/1995 | European Pat. Off. . |
| 0 633 533 A2 | 1/1995 | European Pat. Off. . |
| 0 649 118 A2 | 4/1995 | European Pat. Off. . |
| 0 676 719 A2 | 10/1995 | European Pat. Off. . |
| 0 676 726 A2 | 10/1995 | European Pat. Off. . |
| 40 18 052 | 12/1990 | Germany . |
| 50-22475 | 3/1975 | Japan . |
| 57-18236 | 1/1982 | Japan . |
| 57-2084 | 1/1982 | Japan . |
| 57-136217 | 8/1982 | Japan . |
| 59-40258 | 3/1984 | Japan . |
| 59-121500 | 7/1984 | Japan . |
| 61-16641 | 1/1986 | Japan . |
| 61-198286 | 9/1986 | Japan . |

| | | |
|---|---|---|
| 61-185138 | 11/1986 | Japan . |
| 2-31256 | 2/1990 | Japan . |
| 3-16620 | 1/1991 | Japan . |
| 3-248215 | 11/1991 | Japan . |
| 4-26432 | 1/1992 | Japan . |
| 4-20134 | 2/1992 | Japan . |
| 4-42029 | 2/1992 | Japan . |
| 4-106594 | 8/1992 | Japan . |
| 4-104893 | 9/1992 | Japan . |
| 4-291468 | 10/1992 | Japan . |
| 5-100759 | 4/1993 | Japan . |
| 5-177057 | 7/1993 | Japan . |
| 5-241502 | 9/1993 | Japan . |
| 6-23148 | 2/1994 | Japan . |
| 6-54962 | 3/1994 | Japan . |
| 6-68238 | 3/1994 | Japan . |
| 6-110602 | 4/1994 | Japan . |
| 6-190145 | 7/1994 | Japan . |
| 6-190147 | 7/1994 | Japan . |
| 6-205010 | 7/1994 | Japan . |
| 6-285259 | 10/1994 | Japan . |
| 6-315095 | 11/1994 | Japan . |
| 7-104930 | 4/1995 | Japan . |
| 62-269221 | 11/1997 | Japan . |
| 2033763 | 5/1980 | United Kingdom . |
| 2 244 546 | 12/1991 | United Kingdom . |
| 2 263 802 | 8/1993 | United Kingdom . |
| WO 92/09347 | 6/1992 | WIPO . |
| WO94/10685 | 5/1994 | WIPO . |
| WO 94/12999 | 6/1994 | WIPO . |
| WO94/27205 | 11/1994 | WIPO . |
| WO97/17651 | 5/1997 | WIPO . |

OTHER PUBLICATIONS

*MIPS Microprocessor R4000 User's Manual*, Second Edition, by Joe Heinrich, Copyright 1994 by MIPS Technologies, Inc.

*MIPS RISC Architecture*, "Introducing the R4000 Technology," by Gerry Kane and Joe Heinrich, Copyright 1992 by MIPS Technologies, Inc.

*MIPS Open RISC Technology*, "R4400 Microprocessor Product Information," by Satya Simha, MIPS Technologies, Inc., Sep. 27, 1993.

*Indy Product Guide*, Indy–TMG–(Sep. 1993), Copyright 1993 by Silicon Graphics, Inc.

*Open GL, It's Everywhere*, Information Sheet, OPGL–BRO (Jul. 1993), Copyright 1993 by Silicon Graphics, Inc.

*Reality Engine/Reality Engine², Graphics Subsystems*, Data Sheet, Copyright 1993 by Silicon Graphics, Inc.

*Indy Technical Report*, Indy–TR (Jun. 1993) Copyright 1993 by Silicon Graphics, Inc.

*Reality Engine in Visual Simulation Technical Overview*, RE–VisSim–TR(Aug. 1992), Copyright 1992 by Silicon Graphics, Inc.

*Rambus Architectural Overview*, DL0001–02, Copyright 1992, 1993 by Rambus Inc.

*SH7600 Series Super H RISC Engine, Overview*, Hitachi manual, Oct. 17, 1994.

*This Is What It's Like to Give Your Next Product A 32–Bit RISC Controller*, Hitachi America, Ltd. brochure, 1994.

*Sega Genesis Instruction Manual*, Sega, Hayward, California,#3701–926–0–01 (1994).

*Sega Genesis 32X Instruction Manual*, Sega, Redwood City California, #672–2116 (1994).

*Knuckles Chaotix Instruction Manual*, Sega, Redwood City, California, #84503 (1995).

*3D Ballz Instruction Booklet*, Accolade, San Jose, California, #3050–00231 Rev. A.

*Sonic 2 The HedgeHog Instruction Manual*, Sega, Hayward, California, #672–0944 3701–925–0–01 (1992).

PR Newswire, Sony Enters the CD–ROM Based Video Game, New York, Ny, May 31, 1991.

Sony Playstation Instruction Manual, and information materials, Sony Computer Entertainment Inc. 1995.

6 Photographs of Sony Playstation: 1) top case and compact disk; 2) hand controller; 3) internal circuit boards (top view); 4) internal circuit boards (top view); 5) compact disk reader (bottom view); and internal main circuit board (bottom view).

*Falcon Electronic Battlefield Series*, Advertisement, Spectrum HoloByte, Alameda, California, #F303IBM 208858.

*Nintendo Power*, vol. 30, p. 22, PilotWings article.

*Nintendo Power*, vol. 31, p. 35, PilotWings article.

*Nintendo Power*, vol. 31, pp. 74–76, PilotWings article.

*Nintendo Power*, vol. 38, p. 25, PilotWings article.

*Nintendo Power*, vol. 46, PilotWings article.

*PilotWings Instruction Booklet*, Super Nintendo Entertainment System, SNS–PW–USA, copyright 1991.

*PilotWings, It's a Festival of Flight*, Top Secret Password Nintendo Player's Guide, pp. 82–83 and 160, copyright 1991.

*PilotWings, Soar with the Flight Club*, Super Nintendo Entertainment System Play's Guide, pp. 100–105, copyright 1991.

PR Newswire, Sony Enters the CD–ROM–Based Video Game, New York, Ny, May 31, 1991.

"Hardware Reset With Microcode Warning Period", *IBM Technical Disclosure Bulletin*, vol. 33, No. 11, Apr. 1991, pp. 105–106.

Rockwell International Document No. 29650 N30, Rev. 1, "R6500 Microcomputer System Programming Manual," Feb. 1979.

Steve Ciarcia, "Build Your Own Z80 Computer," Byte Books, 1981.

FAMICOM schematic diagram.

U.S. Department of Commerce, FIPS PUB 46, "Data Encryption Standard," Jan. 15, 1977.

*Nintendo Power*, vol. 80, Jan. 1996.

IBM Tech. Disc. Bul. vol. 14, No. 11, Apr. 1972, "Computer Program Protection," E.J. Lengyel et al.

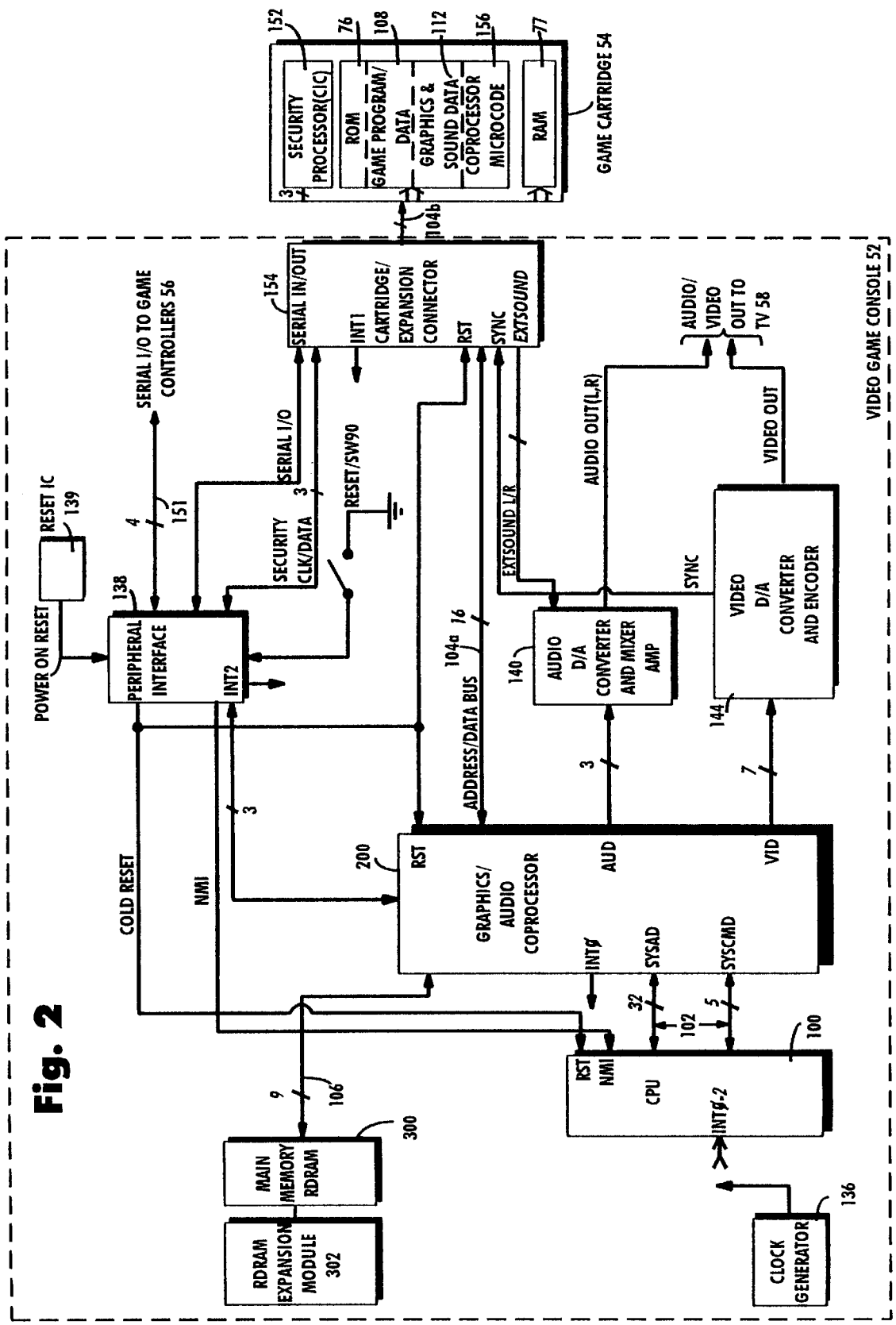

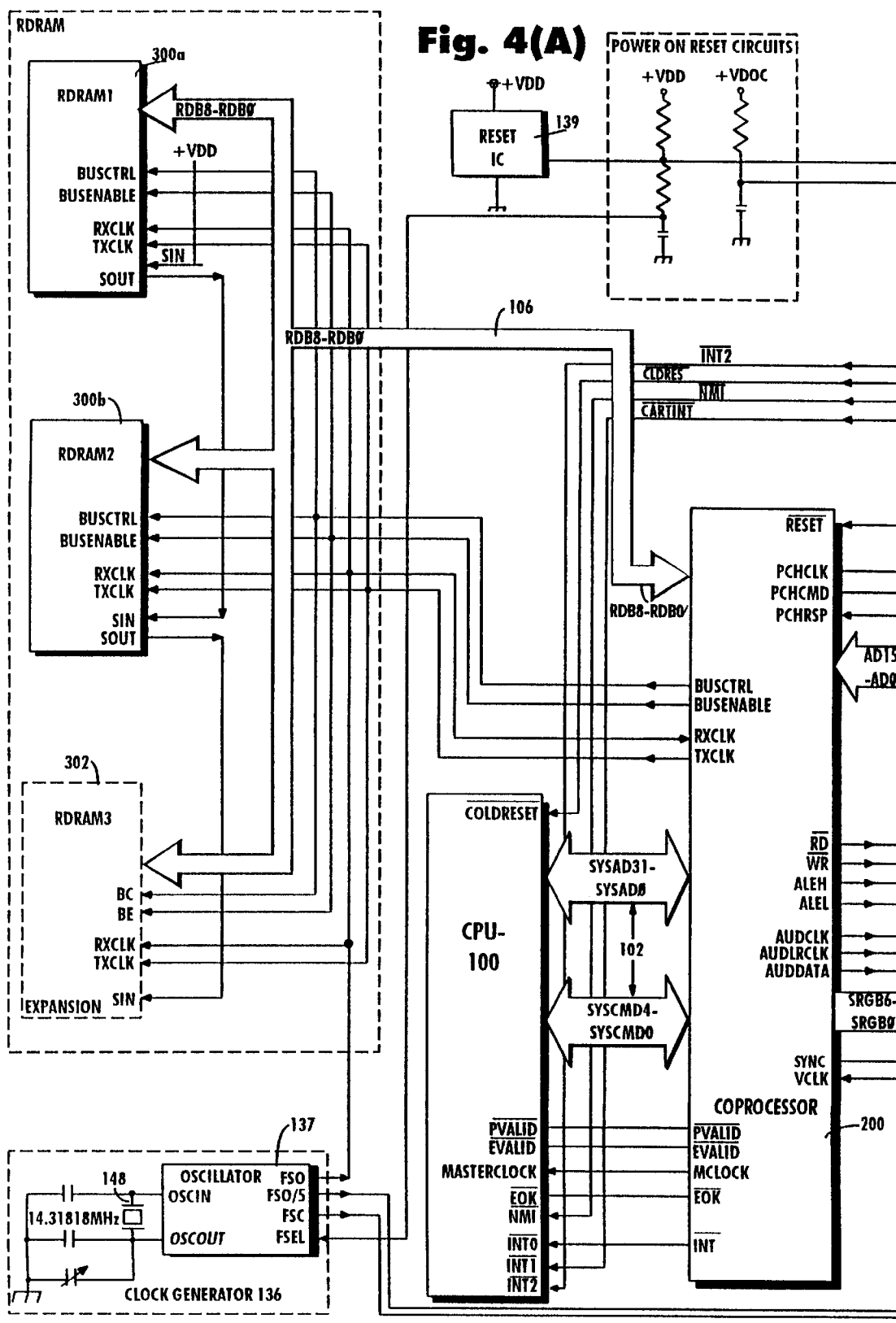

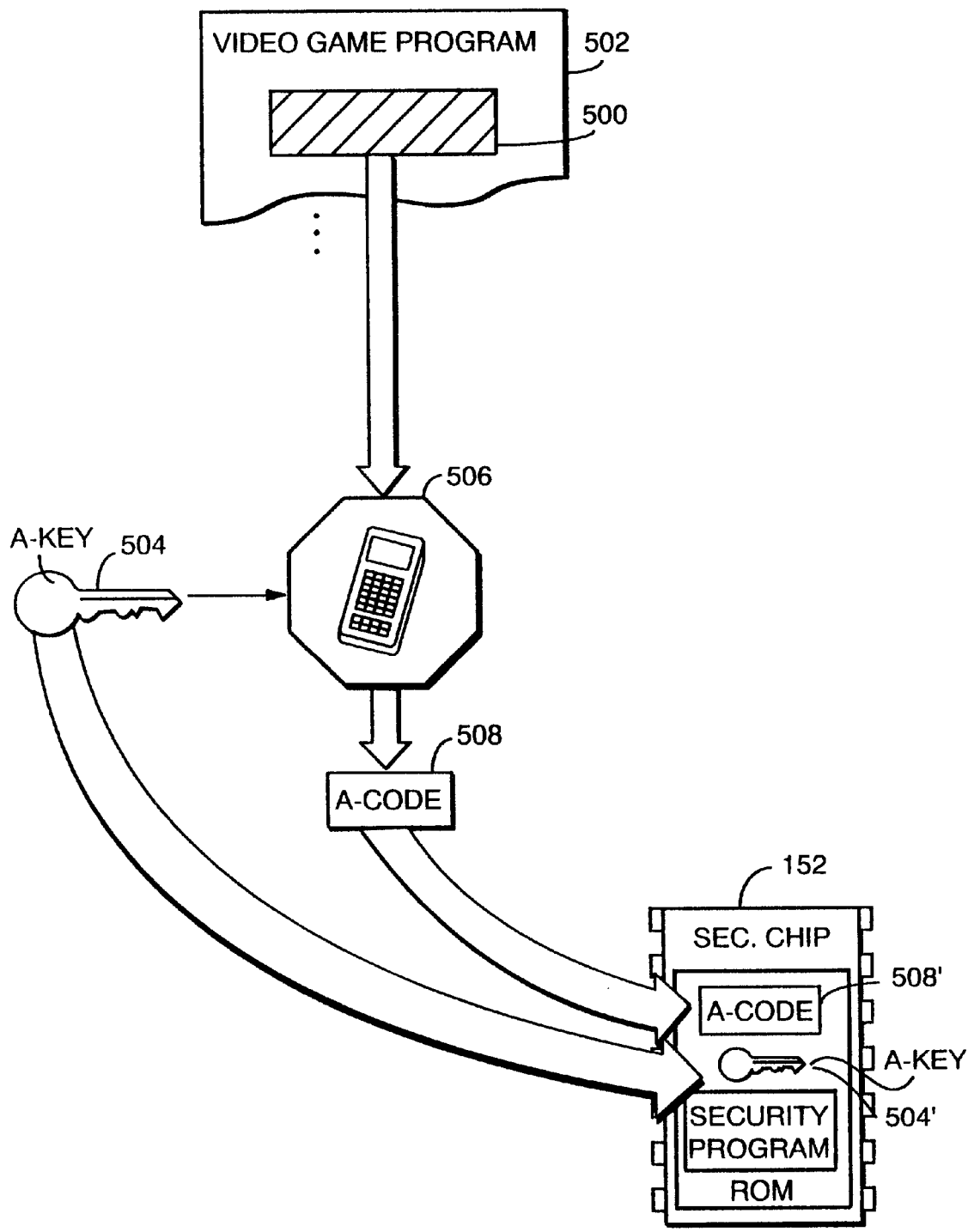
Fig. 15 EXAMPLE SECURITY CHIP MANUFACTURING PROCESS

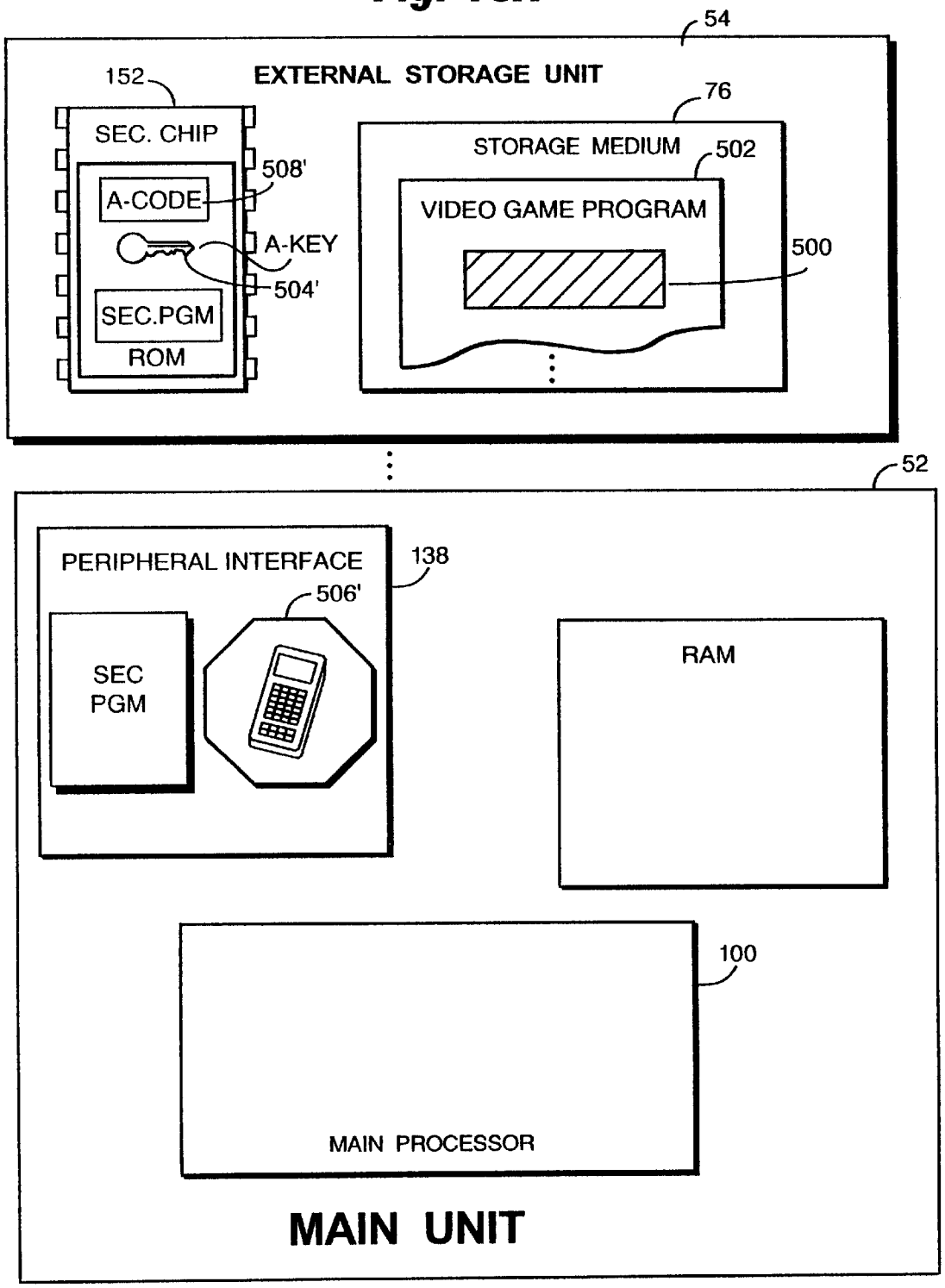

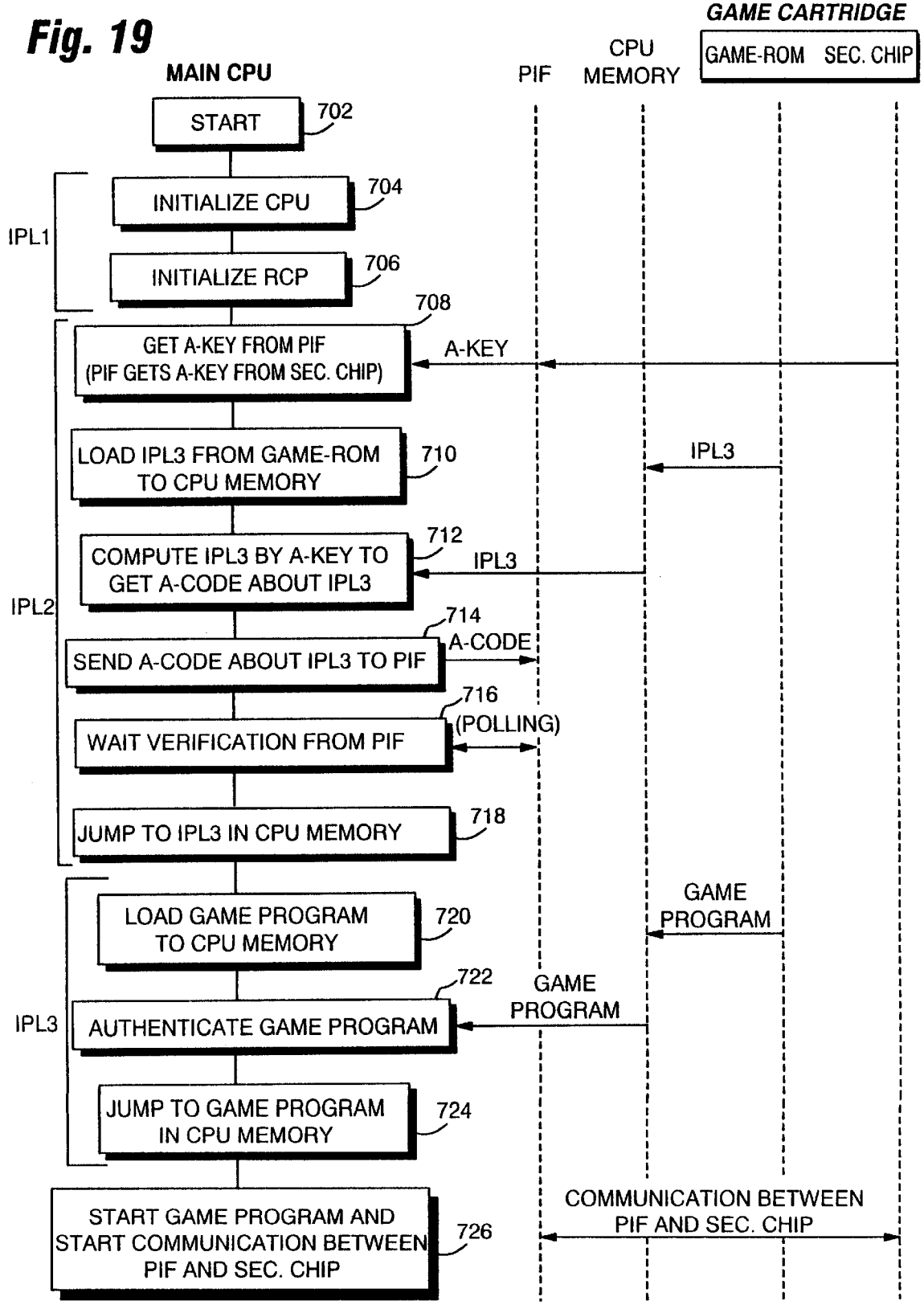

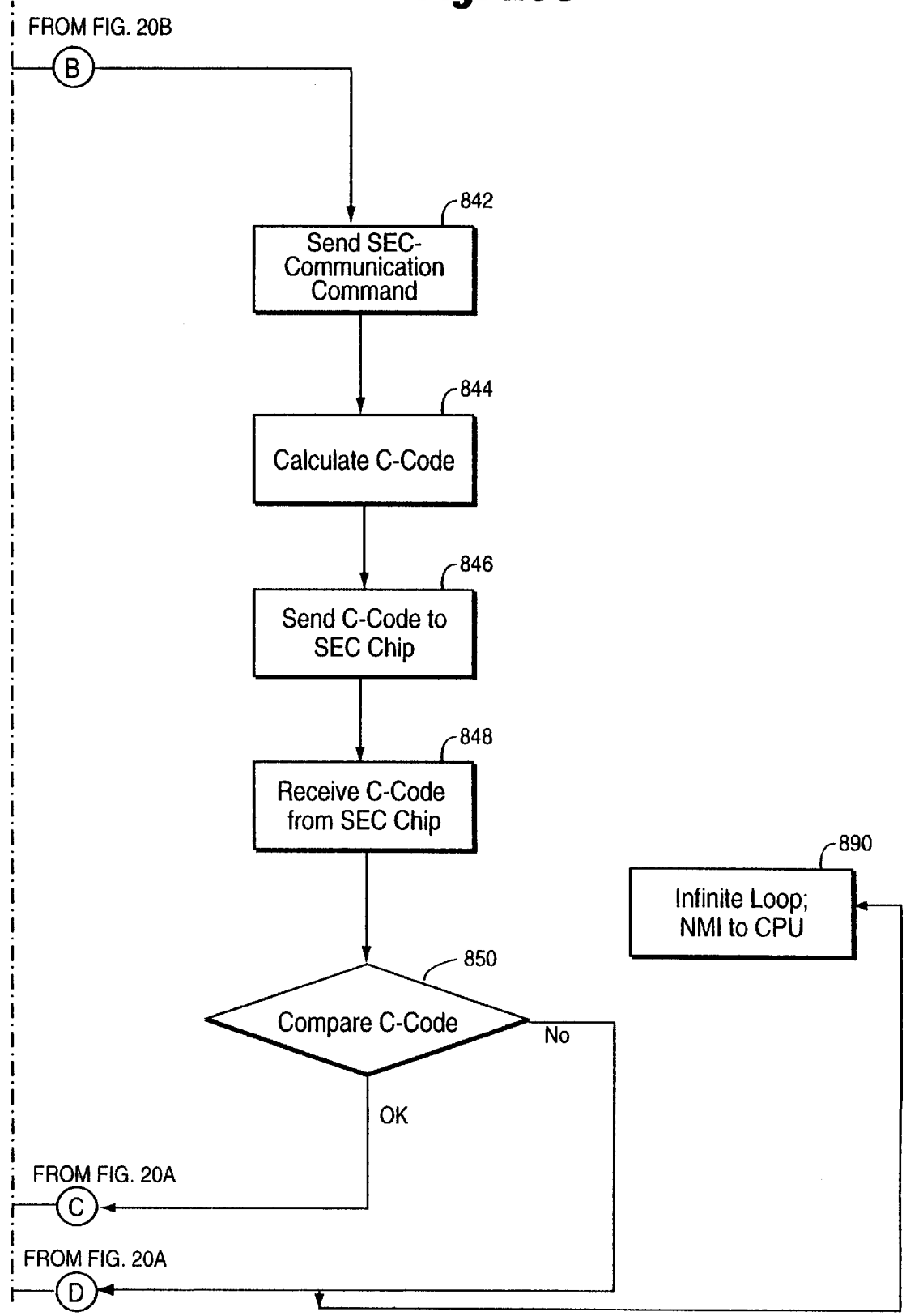

SYSTEMS AND METHODS FOR PROVIDING SECURITY IN A VIDEO GAME SYSTEM

This application is a continuation-in-part of application Ser. No. 08/562,288, filed Nov. 22, 1995.

FIELD OF THE INVENTION

The present invention relates to a high performance low cost video game system. More particularly, the invention relates to a video game system having a multifunctional player controller processing subsystem with security features, and a flexibly expandable video game external memory with a low pin out.

BACKGROUND AND SUMMARY OF THE INVENTION

Microprocessor-based home video game systems such as the Nintendo Entertainment System and the Super Nintendo Entertainment System have been highly successful in part because they can interactively produce exciting video graphics involving numerous animated moving objects.

The video game system described herein and in further detail in a concurrently filed patent application, which has been incorporated herein by reference and names Van Hook et al as inventors, permits game play involving three-dimensional images having a depth and realism far exceeding these and other heretofore known video game systems. In the past, computer systems required to produce such images interactively costs tens of thousands of dollars.

In order to provide such a high performance video game system at a cost affordable to the average consumer, many features in the video game system were uniquely optimized. In so doing, many unique features were incorporated into the system described herein using novel, multifunctional components having a low pinout, but which provide for highly flexible future expansion.

The processor and/or picture processing unit of video game systems such as the Nintendo Entertainment System and the Super Nintendo Entertainment System exercise direct control over processing of signals from player input/game control devices, i.e., player controllers. These prior art systems do not include a player controller processing subsystem which coacts with the game microprocessor and picture processing unit to process commands for handling player controller related input/output.

The present invention is directed in part to a multifunctional peripheral processing subsystem external to the game microprocessor and disclosed coprocessor which executes commands for handling player controller input/output to thereby lessen the processing burden on the graphics processing subsystem. The peripheral processing subsystem is used for both controlling player controller input/output processing and for performing game authenticating security checks continuously during game play. The peripheral processing subsystem is also used during the game cartridge/video game system console initial communication protocol using instructions stored in its boot ROM to enable initial game play.

The peripheral interface is coupled to the coprocessor by a three bit wide serial bus over which commands are received over one line, clock signals over another line and responses are tranrsmitted to the coprocessor over a third serial line. The peripheral interface includes a microprocessor for controlling various peripheral interface functions, a read/write random access memory, a boot ROM, a coprocessor command channel interface, a player controller channel interface, etc., which components interact to efficiently process player controller commands while also performing other important functions without requiring significant main processor processing time.

The coprocessor command channel interface responds to coprocessor clock and command control signals to permit access to the random access memory and to the boot ROM and generates control signals to interrupt the peripheral interface microprocessor. A peripheral interface macro may be executed to start a read or write transaction with each peripheral device and thereafter transfer the transaction results stored in the random access memory to the game microprocessor main memory.

In accordance with another aspect of the present invention, a portable storage device is used in the form of a game cartridge in the exemplary embodiment having a low pinout due in part to the use of a multiplexed address/data bus. Memory access related timing signals are transmitted to the cartridge which may be programmably varied depending upon detected address domain which is used to establish the type of storage device being used by the video game system.

BRIEF DESCRIPTION OF THE DRAWINGS

These and other features and advantages of the present invention will be better and more completely understood by referring to the following detailed description of a presently preferred exemplary embodiment in connection with the drawings, of which:

FIG. 2 is a block diagram of a video game console and game cartridge shown in FIG. 1;

FIGS. 4A and 4B is an exemplary, more detailed, implementation of the vide game console as shown in the FIG. 2 block diagram;

FIG. 15 shows an example process for manufacturing external storage units embodying security features;

FIGS. 16A–16F show an example embodiment of an overall video game security arrangement that tests whether a video game program and storage unit security chip match;

FIG. 19 is a simplified flowchart of a further embodiment of example security steps performed by a video game main processor;

FIGS. 20A–20C are a simplified flowchart of a further embodiment of example security steps perfonrmed by a video game peripheral interface.

DETAILED DESCRIPTION OF EXEMPLARY EMBODIMENT

Figure 1:
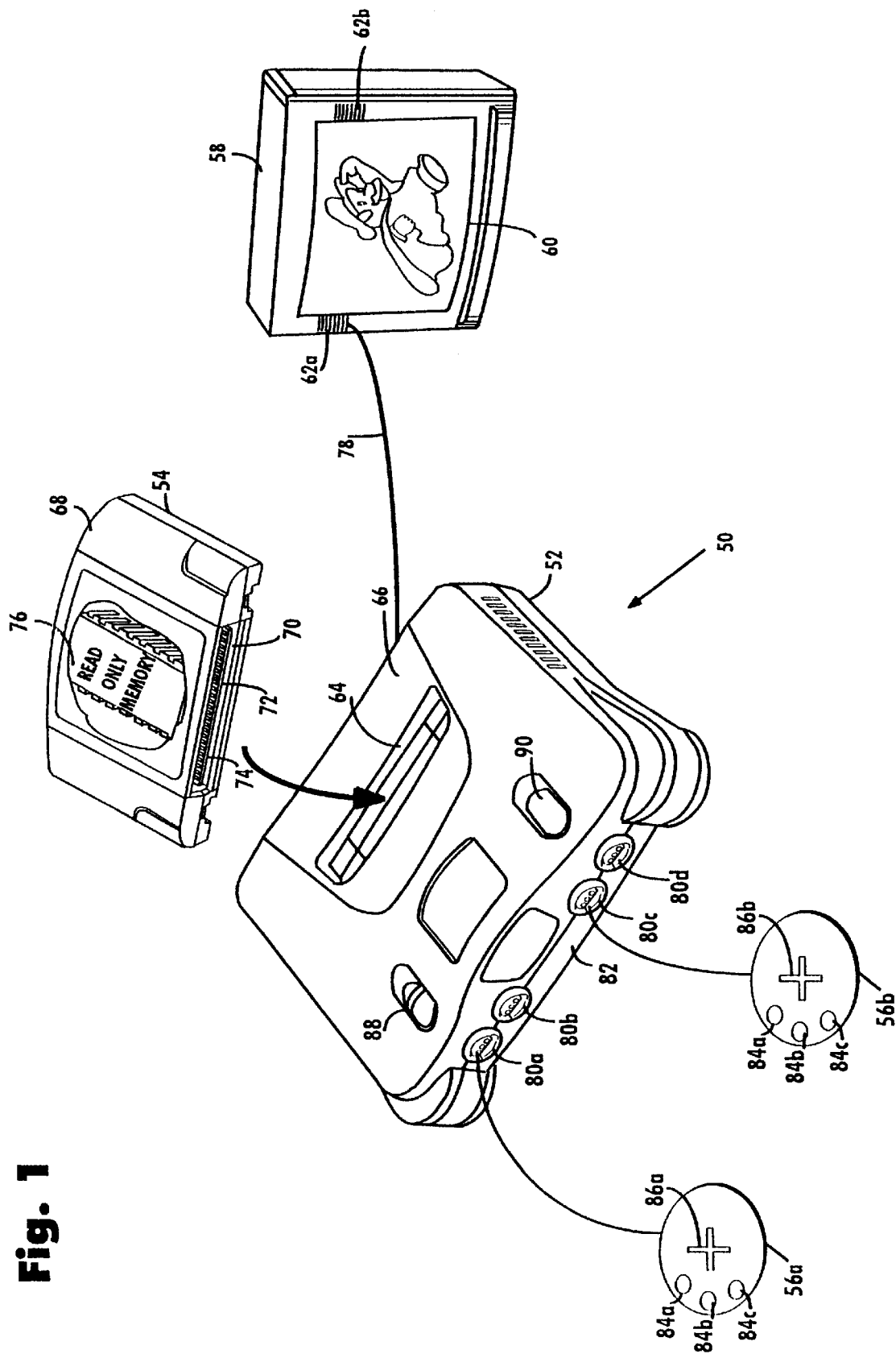
FIG. 1 is a perspective view of an exemplary embodiment of a video game system in accordance with the present invention.

FIG. 1 shows an exemplary embodiment of a video game system 50 in accordance with the present invention. Illustrative video game system 50 includes a main console 52, a video game storage device 54, and handheld controllers 56a,b (or other user input devices). Main console 52 is connected to a conventional home color television set 58. Television set 58 displays 3D video game images on its television screen 60 and reproduces stereo sound through its speakers 62a,b.

In the illustrative embodiment, the video game storage device 54 is in the form of a replaceable memory cartridge insertable into a slot 64 on a top surface 66 of console 52. A wide variety of alternative program storage media are contemplated by the present invention such as CD ROM, floppy disk, etc. In this exemplary embodiment, video game storage device 54 comprises a plastic housing 68 encasing a printed circuit board 70. Printed circuit board 70 has an edge 72 defining a number of electrical contacts 74. When the video game storage device 68 is inserted into main console slot 64, the cartridge electrical contacts 74 mate with corresponding "edge connector" electrical contacts within the main console. This action electrically connects the storage device printed circuit board 72 to the electronics within main console 52. In this example, at least a "read only memory" chip 76 is disposed on printed circuit board 70 within storage device housing 68. This "read only memory" chip 76 stores instructions and other information pertaining to a particular video game. The read only memory chip 76 for one game cartridge storage device 54 may, for example, contain instructions and other information for an adventure game while another storage device 54 may contain instructions and information to play a car race game, an educational game, etc. To play one game as opposed to another game, the user of video game system 60 need only plug the appropriate storage device 54 into main console slot 64—thereby connecting the storage device's read only memory chip 76 (and any other circuitry it may contain) to console 52. This enables a computer system embodied within console 52 to access the information contained within read only memory 76, which information controls the console computer system to play the appropriate video game by displaying images and reproducing sound on color television set 58 as specified under control of the read only memory game program information.

To set up the video game system 50 for game play, the user first connects console 52 to color television set 58 by hooking a cable 78 between the two. Console 52 produces both "video" signals and "audio" signals for controlling color television set 58. The "video" signals control the images displayed on the television screen 60 and the "audio" signals are played back as sound through television loudspeaker 62. Depending on the type of color television set 58, it may be necessary to connect a conventional "RF modulator" between console 52 and color television set 58. This "RF modulator" (not shown) converts the direct video and audio outputs of console 52 into a broadcast type television signal (e.g., for a television channel 2 or 3) that can be received and processed using the television set's internal "tuner." Other conventional color television sets 58 have direct video and audio input jacks and therefore don't need this intermediary RF modulator.

The user then needs to connect console 52 to a power source. This power source may comprise a conventional AC adapter (not shown) that plugs into a standard home electrical wall socket and converts the house voltage into a lower voltage DC signal suitable for powering console 52. The user may then connect up to 4 hand controllers 56a, 56b to corresponding connectors 80a–80d on main unit front panel 82. Controllers 56 may take a variety of forms. In this example, the controllers 56a,b include various function controlling push buttons such as 84a–c and X-Y switches 86a,b used, for example, to specify the direction (up, down, left or right) that a player controllable character displayed on television screen 60 should move. Other controller possibilities include joysticks, mice pointer controls and a wide range of other conventional user input devices.

The present system has been designed to accommodate expansion to incorporate various types of peripheral devices yet to be specified. This is accomplished by incorporating a programmable peripheral device input/output system (to be described in detail below) which permits device type and status to be specified by program commands.

In use, a user selects a storage device 54 containing a desired video game, and inserts that storage device into console slot 64 (thereby electrically connecting read only memory 76 and other cartridge electronics to the main console electronics). The user then operates a power switch 88 to turn on the video game system 50 and operates controllers 86a,b (depending on the particular video game being played, up to four controllers for four different players can be used with the illustrative console) to provide inputs to console 52 and thus control video game play. For example, depressing one of push buttons 84a–c may cause the game to start playing. Moving directional switch 86 may cause animated characters to move on the television screen 60 in controllably different directions. Depending upon the particular video game stored within the storage device 54, these various controls 84, 86 on the controller 56 can perform different functions at different times. If the user wants to restart game play from the beginning, or alternatively with certain game programs reset the game to a known continuation point, the user can press a reset button 90.

FIG. 2 is a block diagram of an illustrative embodiment of console 52 coupled to a game cartridge 54 and shows a main processor 100, a coprocessor 200, and main memory 300 which may include an expansion module 302. Main processor 100 is a computer that executes the video game program within storage device 54. In this example, the main processor 100 accesses this video game program through the coprocessor 200 over a communication path 102 between the main processor and the coprocessor 200, and over another communication path 104a,b between the coprocessor and the video game storage device 54. Alternatively, the main processor 100 can control the coprocessor 200 to copy the video game program from the video game storage device 54 into main memory 300 over path 106, and the main processor 100 can then access the video game program in main memory 300 via coprocessor 200 and paths 102, 106. Main processor 100 accepts inputs from game controllers 56 during the execution of the video game program.

Main processor 100 generates, from time to time, lists of instructions for the coprocessor 200 to perform. Coprocessor 200, in this example, comprises a special purpose high performance, application specific integrated circuit having an internal design that is optimized for rapidly processing 3D graphics and digital audio information. In the illustrative embodiment, the coprocessor described herein is the product of a joint venture between Nintendo Company Limited and Silicon Graphics, Inc. For further details of exemplary coprocessor hardware and software beyond that expressly disclosed in the present application, reference is made to copending application Ser. No. 08/561,718, naming Van-Hook et al as inventors of the subject matter claimed therein, which is entitled "High Performance Low Cost Video Game System With Coprocessor Providing High Speed Efficient 3D Graphics and Digital Audio Signal Processing" (Attorney Docket 723-425) filed concurrently herewith, which application is expressly incorporated herein by reference. The present invention is not limited to use with the above-identified coprocessor. Any compatible coprocessor which supports rapid processing of 3D graphics and digital audio may be used herein. In response to instruction lists provided by main processor 100 over path 102, coprocessor 200 generates video and audio outputs for application to color television set 58 based on data stored within main memory 300 and/or video game storage device 54.

FIG. 2 also shows that the audio video outputs of coprocessor 200 are not provided directly to television set 58 in this example, but are instead further processed by external electronics outside of the coprocessor. In particular, in this example, coprocessor 200 outputs its audio and video information in digital form, but conventional home color television sets 58 require analog audio and video signals. Therefore, the digital outputs of coprocessor 200 must be converted into analog form—a function performed for the audio information by DAC and mixer amp 40 and for the video information by VDAC and encoder 144. The analog audio signals generated in DAC 140 are amplified and filtered by an audio amplifier therein that may also mix audio signals generated externally of console 52 via the EXT-SOUND L/R signal from connector 154. The analog video signals generated in VDAC 144 are provided to a video encoder therein which may, for example, convert "RGB" inputs to composite video outputs compatible with commercial TV sets. The amplified stereo audio output of the amplifier in ADAC and mixer amp 140 and the composite video output of video DAC and encoder 144 are provided to directly control home color television set 58. The composite synchronization signal generated by the video digital to analog converter in component 144 is coupled to its video encoder and to external connector 154 for use, for example, by an optional light pen or photogun.

FIG. 2 also shows a clock generator 136 (which, for example, may be controlled by a crystal 148 shown in FIG. 4A) that produces timing signals to time and synchronize the other console 52 components. Different console components require different clocking frequencies, and clock generator 136 provides suitable such clock frequency outputs (or frequencies from which suitable clock frequencies can be derived such as by dividing).

In this illustrative embodiment, game controllers 56 are not connected directly to main processor 100, but instead are connected to console 52 through serial peripheral interface 138. Serial peripheral interface 138 demultiplexes serial data signals incoming from up to four or five game controllers 56 (e.g., 4 controllers from serial I/O bus 151 and 1 controller from connector 154) and provides this data in a predetermined format to main processor 100 via coprocessor 200. Serial peripheral interface 138 is bidirectional, i.e., it is capable of transmitting serial information specified by main processor 100 out of front panel connectors 80a–d in addition to receiving serial information from those front panel connectors. The serial interface 138 receives main memory RDRAM data, clock signals, commands and sends data/responses via a coprocessor serial interface (not shown). I/O commands are transmitted to the serial interface 138 for execution by its internal processor as will be described below. In this fashion, the peripheral interface's processor (250 in FIG. 7) by handling I/O tasks, reduces the processing burden on main processor 100. As is described in more detail below in conjunction with FIG. 7, serial peripheral interface 138 also includes a "boot ROM (read only memory)" that stores a small amount of initial program load (IPL) code. This IPL code stored within the peripheral interface boot ROM is executed by main processor 100 at time of startup and/or reset to allow the main processor to begin executing game program instructions 108 within storage device 54. The initial game program instructions 108 may, in turn, control main processor 100 to initialize the drivers and controllers it needs to access main memory 300.

In this exemplary embodiment, serial peripheral interface 138 includes a processor (see 250 in FIG. 7) which, in addition to performing the I/O tasks referred to above, also communicates with an associated security processor 152 within storage device 54. This pair of security processors (one in the storage device 54, the other in the console 52) performs, in cooperation with main processor 100, an authentication function to ensure that only authorized storage devices may be used with video game console 52.

Figure 3A:
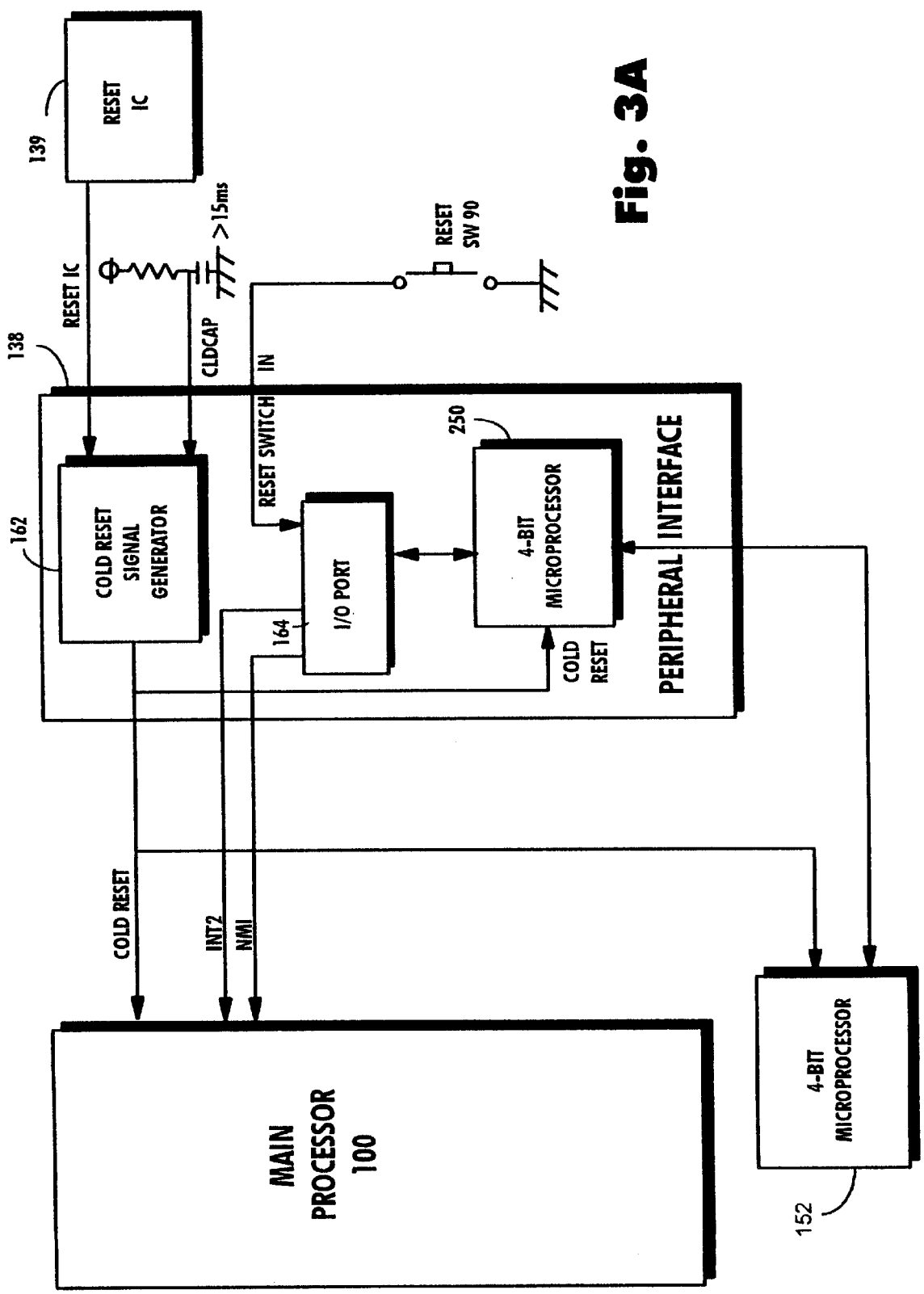
FIG. 3A is a block diagram of reset related circuitry embodied in the video game console shown in FIG. 2.
Figure 3B:
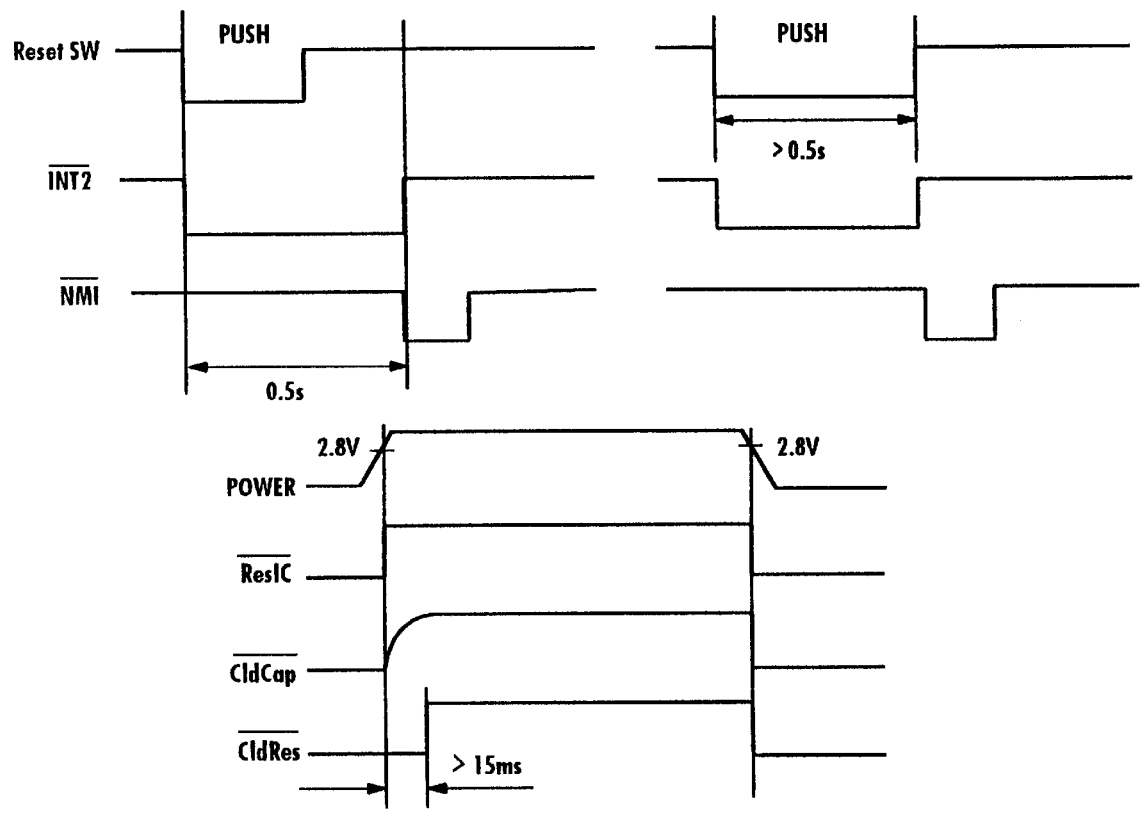
FIG. 3B depicts timing signals generated by the circuitry of FIG. 3A.

As shown in FIGS. 2 and 3A, peripheral interface 138 receives a power-on reset signal from reset IC 139. Reset IC 139 detects an appropriate threshold voltage level and thereafter generates a power-on reset signal which, in turn, results in a cold reset signal being generated by circuit 162, which signal is coupled to the reset input of main processor 100. In order to ensure that the cold reset signal is generated at the proper time, a delaying signal CLDCAP is coupled to cold reset signal generating circuit 162. Cold reset signal generator 162 includes a Schmidt trigger circuit (which receives the reset IC signal from reset IC 139) whose output is coupled to one input of an AND gate. The output of the Schmidt trigger is also coupled to a buffer inverter whose output and the CLDCAP signal are coupled to a second input of the AND gate. The output of the AND gate serves as the cold reset signal which is coupled to microprocessor 250 and main processor 100 and microprocessor 152 shown in FIG. 3A. The cold reset signal generated by the cold reset signal generator is fed back to the input of generator 162 through a diode (not shown). The cold reset signal is also coupled to the reset input of the processor 250 embodied within the peripheral interface 138 (see FIG. 7) and to the reset pin of connector 154 which is coupled to the reset input of security processor 152. FIG. 3B shows the reset IC (RESIC), cold reset (CLDRES) and CLDCAP signals. Although signals shown in FIGS. 3B, 4A, 4B, etc. are referenced in the specification (and in FIGS. 2 and 3A) without regard to whether they are inverted or not (for ease of reference), FIGS. 3B, 4A and 4B and each of the timing diagrams in this disclosure indicate the appropriate inverted nature of the signal by a line over the signal (or pin) designation as is conventional.

FIG. 2 also shows a connector 154 within video game console 52. In this illustrative embodiment, connector 154 connects, in use, to the electrical contacts 74 at the edge 72 of storage device printed circuit board 70. Thus, connector 154 electrically connects coprocessor 200 to storage device ROM 76. Additionally, connector 154 connects the storage device security processor 152 to main unit serial peripheral interface 138. Although connector 154 in the particular example shown in FIG. 2 may be used primarily to read data and instructions from a non-writable read only memory 76, system 52 is designed so that the connector is bidirectional, i.e., the main unit can send information to the storage device 54 for storage in random access memory 77 in addition to reading information from it.

Main memory 300 stores the video game program in the form of CPU instructions 108. All accesses to main memory 300 are through coprocessor 200 over path 106. These CPU instructions are typically copied from the game program/data 108 stored in storage device 54 and downloaded to RDRAM 300. This architecture is likewise readily adaptable for use with CD ROM or other bulk media devices. Although CPU 100 is capable of executing instructions directly out of storage device ROM 76, the amount of time required to access each instruction from the ROM is much greater than the time required to access instructions from main memory 300. Therefore, main processor 100 typically copies the game program/data 108 from ROM 76 into main memory 300 on an as-needed basis in blocks, and accesses the main memory 300 in order to actually execute the instructions. Memory RD RAM 300 is preferably a fast access dynamic RAM capable of achieving 500 Mbytes/second access times such as the DRAM sold by RAMBUS, Inc. The memory 300 is coupled to coprocessor 200 via a unified nine bit wide bus 106, the control of which is arbitrated by coprocessor 200. The memory 300 is expandable by merely plugging, for example, an 8 Mbyte memory card into console 52 via a console memory expansion port (not shown).

As described in the copending Van Hook et al application, the main processor 100 preferably includes an internal cache memory (not shown) used to further decrease instruction access time. Storage device 54 also stores a database of graphics and sound data 112 needed to provide the graphics and sound of the particular video game. Main processor 100, in general, reads the graphics and sound data 112 from storage device 54 on an as-needed basis and stores it into main memory 300 in the form of texture data, sound data and graphics data. In this example, coprocessor 200 includes a display processor having an internal texture memory into which texture data is copied on an as—needed basis for use by the display processor.

As described in the copending Van Hook et al application, storage device 54 also stores coprocessor microcode 156. In this example, a signal processor within coprocessor 200 executes a computer program in order to perform its various graphics and audio functions. This computer program, called the "microcode," is provided by storage device 54. Typically, main processor 100 copies the microcode 156 into main memory 300 at the time of system startup, and then controls the signal processor to copy parts of the microcode on an as-needed basis into an instruction memory within signal processor for execution. Because the microcode 156 is provided by storage device 54, different storage devices can provide different microcodes—thereby tailoring the particular functions provided by coprocessor 200 under software control. Because the microcode 156 is typically too large to fit into the signal processor's internal instruction memory all at once, different microcode pages or portions may need to be loaded from main memory 300 into the signal processor's instruction memory as needed. For example, one part of the microcode 156 may be loaded into signal processor 400 for graphics processing, and another part of microcode may be loaded for audio processing. See the above-identified related application for further details relating to the signal processor, and display processor embodied within the coprocessor as well as the various data bases maintained in RD RAM 300.

Although not shown in FIG. 2, as described in the copending Van Hook et al application, coprocessor 200 also includes a CPU interface, a serial interface, a parallel peripheral interface, an audio interface, a video interface, a main memory DRAM controller/interface, a main internal bus and timing control circuitry. The coprocessor main bus allows each of the various main components within coprocessor 200 to communicate with one another. The CPU interface is the gateway between main processor 100 and coprocessor 200. Main processor 100 reads data to and writes data from coprocessor CPU interface via a CPU-to-coprocessor bus. A coprocessor serial interface provides an interface between the serial peripheral interface 138 and coprocessor 200, while coprocessor parallel peripheral interface 206 interfaces with the storage device 54 or other parallel devices connected to connector 154.

A coprocessor audio interface reads information from an audio buffer within main memory 300 and outputs it to audio DAC 140. Similarly, a coprocessor video interface reads information from an RDRAM frame buffer and then outputs it to video DAC 144. A coprocessor DRAM controller/interface is the gateway through which coprocessor 200 accesses main memory 300. The coprocessor timing circuitry receives clocking signals from clock generator 136 and distributes them (after appropriate dividing as necessary) to various other circuits within coprocessor 200.

Main processor 100 in this example is a MIPS R4300 RISC microprocessor designed by MIPS Technologies, Inc., Mountain View, Calif. For more information on main processor 100, see, for example, Heinrich, MIPS Microprocessor R4000 User's Manual (MIPS Technologies, Inc., 1984, Second Ed.).

As described in the copending Van Hook et al application, the conventional R4300 main processor 100 supports six hardware interrupts, one internal (timer) interrupt, two software interrupts, and one non-maskable interrupt (NMI). In this example, three of the six hardware interrupt inputs (INT0, INT1 and INT2) and the non-maskable interrupt (NMI) input allow other portions of system 50 to interrupt the main processor. Specifically, main processor INT0 is connected to allow coprocessor 200 to interrupt the main processor, the main processor interrupt INT1 is connected to allow storage device 54 or other external devices to interrupt the main processor, and main processor interrupts INT2 and NMI are connected to allow the serial peripheral interface 138 to interrupt the main processor. Any time the processor is interrupted, it looks at an internal interrupt register to determine the cause of the interrupt and then may respond in an appropriate manner (e.g., to read a status register or perform other appropriate action). All but the NMI interrupt input from serial peripheral interface 138 are maskable (i.e., the main processor 100 can selectively enable and disable them under software control).

When the video game reset switch 90 is pressed, a non-maskable interrupt signal is generated by peripheral interface circuit 138 and is coupled to main processor 100 as shown in FIG. 2. The NMI signal, however, results in non-maskable, immediate branching to a predefined initialization state. In order to permit the possibility of responding to reset switch 90 actuation by branching, for example, to the current highest game level progressed to, the circuit shown in FIG. 3A is used. When the reset switch 90 is depressed, I/O port 164 receives a reset switch input signal which sets a logic circuit therein and immediately couples an INT2 signal to processor 100. INT2 is an NMI pre-warning signal and is used to, for example, trigger game processor 100 to save the state of the game in predetermined registers. The logic circuit within I/O port 164 may be a time delay circuit that ensures that the NMI signal occurs five seconds after INT2, as can be seen from the timing signals shown in FIG. 3B. The left hand portion of FIG. 3B shows the signal generation when the reset switch is pushed for less than one-half second. The right hand portion of FIG. 3B shows the timing when the reset switch is pushed for greater than one-half second. Thus, an individual game program can designate a desired response to depressing the reset switch 90 by executing a predefined set of instructions in response to the INT2 signal before the occurrence of NMI. The CPU 100 also responds to the pre-NMI warning signal INT2 by initiating shut down processing for related audio and video systems and preparing for its cache memory and other circuits to shut down so that a return is possible to a desired known state other than merely the beginning of the game. The NMI signal is also coupled to the peripheral interface microprocessor 250.

In operation, as described in detail in the copending Van Hook et al application, main processor 100 receives inputs from the game controllers 56 and executes the video game program provided by storage device 54 to provide game processing, animation and to assemble graphics and sound commands. The graphics and sound commands generated by main processor 100 are processed by coprocessor 200. In this example, the coprocessor performs 3D geometry transformation and lighting processing to generate graphics display commands which the coprocessor then uses to "draw" polygons for display purposes. As indicated above, coprocessor 200 includes a signal processor and a display processor. 3D geometry transformation and lighting is performed in this example by the signal processor and polygon rasterization and texturing is performed by display processor 500. Display processor writes its output into a frame buffer in main memory 300. This frame buffer stores a digital representation of the image to be displayed on the television screen 60. Further circuitry within coprocessor 200 reads the information contained in the frame buffer and outputs it to television 58 for display. Meanwhile, the signal processor also processes sound commands received from main processor 100 using digital audio signal processing techniques. The signal processor writes its digital audio output into main memory 300, with the main memory temporarily "buffering" (i.e., storing) the sound output. Other circuitry in coprocessor 200 reads this buffered sound data from main memory 300 and converts it into electrical audio signals (stereo, left and right) for application to and reproduction by television 58.

More specifically, main processor 100 reads a video game program 108 stored in main memory 300. In response to executing this video game program 108, main processor 100 creates a list of commands for coprocessor 200. This command list, in general, includes two kinds of commands: graphics commands and audio commands. Graphics commands control the images coprocessor 200 generates on TV set 58. Audio commands specifying the sound coprocessor 200 causes to be reproduced on TV loudspeakers 62. The list of graphics commands may be called a "display list" because it controls the images coprocessor 200 displays on the TV screen 60. A list of audio commands may be called a "play list" because it controls the sounds that are played over loudspeaker 62. Generally, main processor 100 specifies both a display list and a play list for each "frame" of color television set 58 video.

In this example, main processor 100 provides its display/play list 110 to coprocessor 200 by copying it into main memory 300. Main processor 100 also arranges for the main memory 300 to contain a graphics and audio database that includes all that the data coprocessor 200 needs to generate graphics and audio requested in the display/play list 10. For example, main processor 100 may copy the appropriate graphics and audio data from storage device read only memory 76 into the graphics and audio database within main memory 300. Main processor 100 tells coprocessor 200 where to find the display/play list 110 it has written into main memory 300, and that display/play list 110 may specify which portions of graphics and audio database 112 the coprocessor 200 should use.

The coprocessor's signal processor reads the display/play list 110 from main memory 100 and processes this list (accessing additional data within the graphics and audio database as needed). The signal processor generates two main outputs: graphics display commands for further processing by display processor; and audio output data for temporary storage within main memory 300. Once signal processor 400 writes the audio output data into main memory 300, another part of the coprocessor 200 called an "audio interface" (not shown) reads this audio data and outputs it for reproduction by television loudspeaker 62.

The signal processor can provide the graphics display commands directly to display processor over a path internal to coprocessor 200, or it may write those graphics display commands into main memory 300 for retrieval from the main memory by the display processor. These graphics display commands command display processor to draw ("render") specified geometric images on television screen 60. For example, display processor can draw lines, triangles or rectangles based on these graphics display commands, and may fill triangles and rectangles with particular textures (e.g., images of leaves of a tree or bricks of a brick wall such as shown in the exemplary screen displays in FIGS. 6A through F) stored within main memory 300—all as specified by the graphics display command. It is also possible for main processor 100 to write graphics display commands directly into main memory 300 so as to directly command the display processor. The coprocessor display processor generates, as output, a digitized representation of the image that is to appear on television screen 60.

This digitized image, sometimes called a "bit map," is stored (along with "depth or Z" information) within a frame buffer residing in main memory 300 of each video frame displayed by color television set 58. Another part of coprocessor 200 called the "video interface" (not shown) reads the frame buffer and converts its contents into video signals for application to color television set 58.

Each of FIGS. 6A–6F was generated using a three-dimensional model of a "world" that represents a castle on a hilltop. This model is made up of geometric shapes (i.e., lines, triangles, rectangles) and "textures" (digitally stored pictures) that are "mapped" onto the surfaces defined by the geometric shapes. System 50 sizes, rotates and moves these geometric shapes appropriately, "projects" them, and puts them all together to provide a realistic image of the three-dimensional world from any arbitrary viewpoint. System 50 can do this interactively in real time response to a person's operation of game controllers 86.

FIGS. 6A–6C and 6F show aerial views of the castle from four different viewpoints. Notice that each of the views is in perspective. System 50 can generate these views (and views in between) interactively with little or no discernible delay so it appears as if the video game player is actually flying over the castle.

Figure 6A:
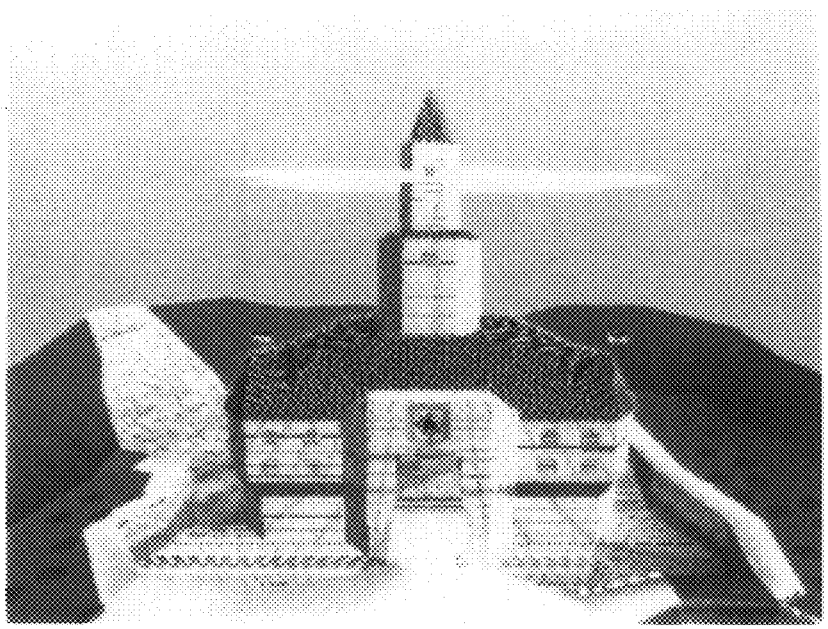
FIGS. 6A–F show exemplary 3D screen effects achievable using the system described herein.
Figure 6B:
Figure 6C:
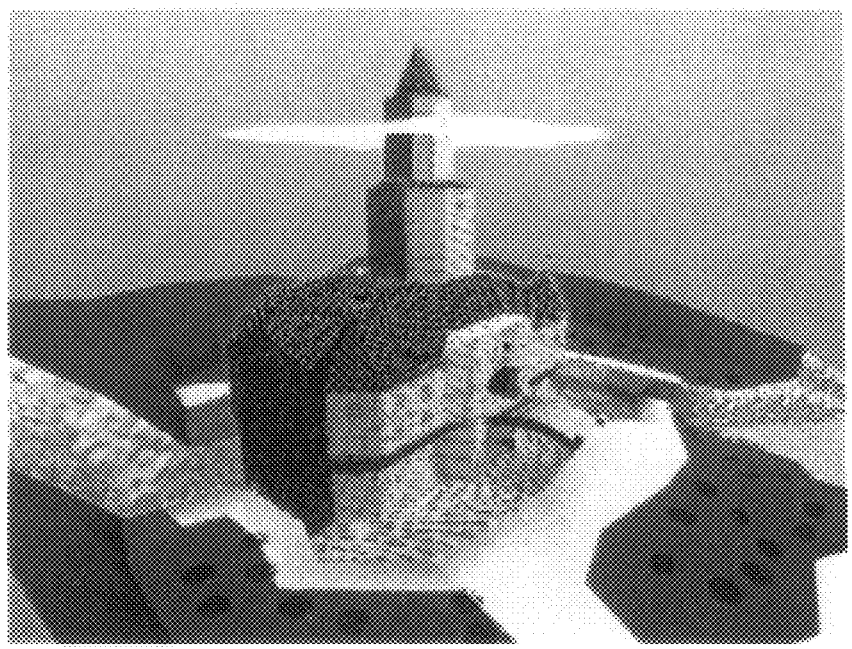
Figure 6D:
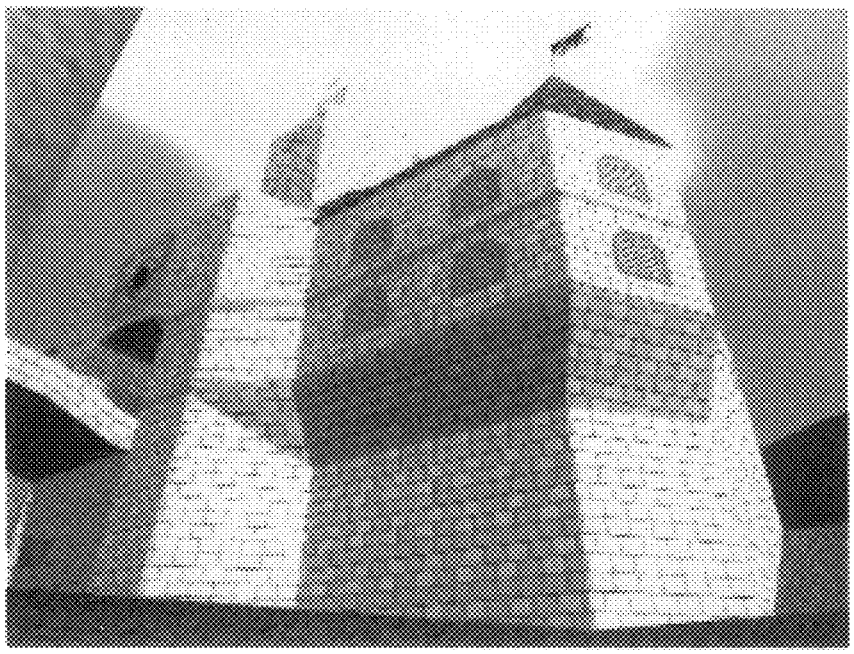
Figure 6E:
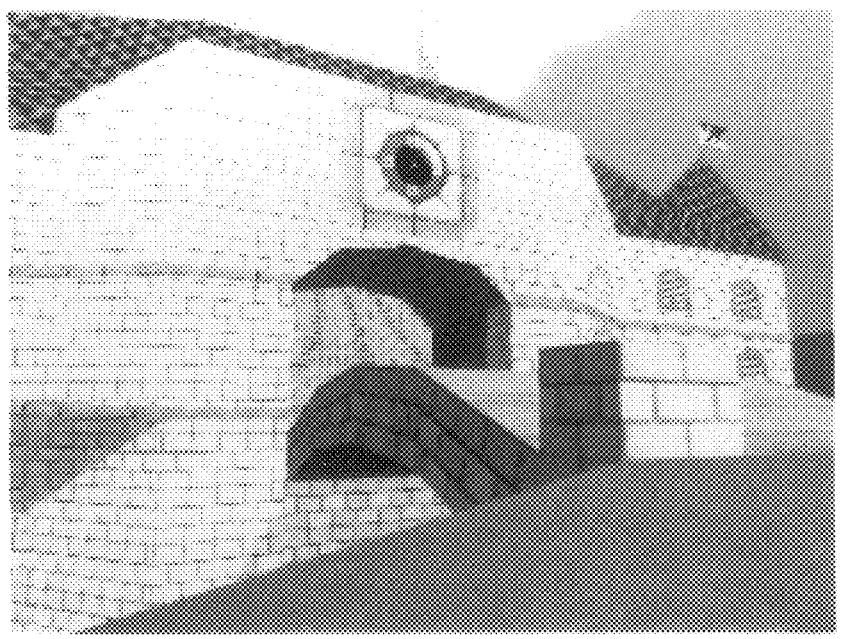
Figure 6F:
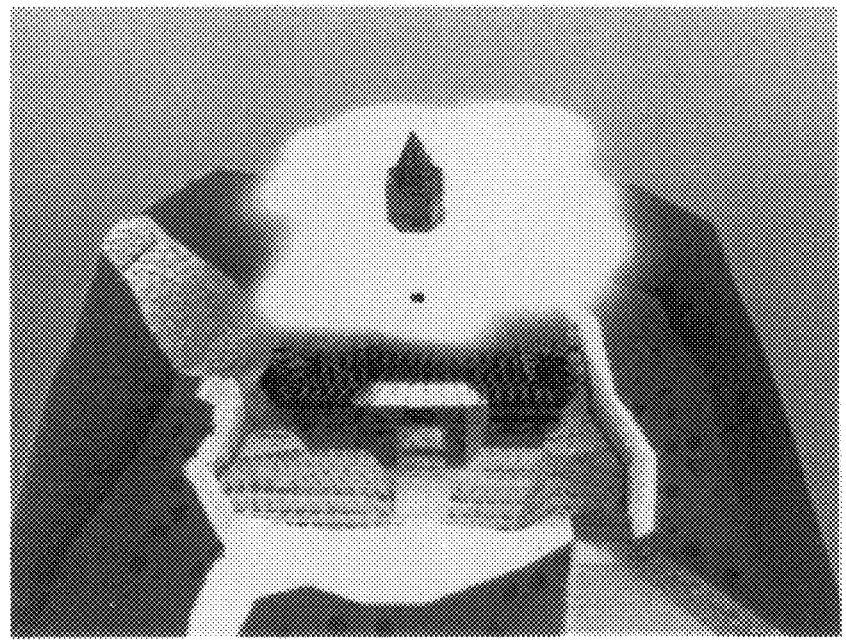

FIGS. 6D and 6E show views from the ground looking up at or near the castle main gate. System 50 can generate these views interactively in real time response to game controller inputs commanding the viewpoint to "land" in front of the castle, and commanding the "virtual viewer" (i.e., the imaginary person moving through the 3-D world through whose eyes the scenes are displayed) to face in different directions. FIG. 6D shows an example of "texture mapping" in which a texture (picture) of a brick wall is mapped onto the castle walls to create a very realistic image.

Figure 4B:
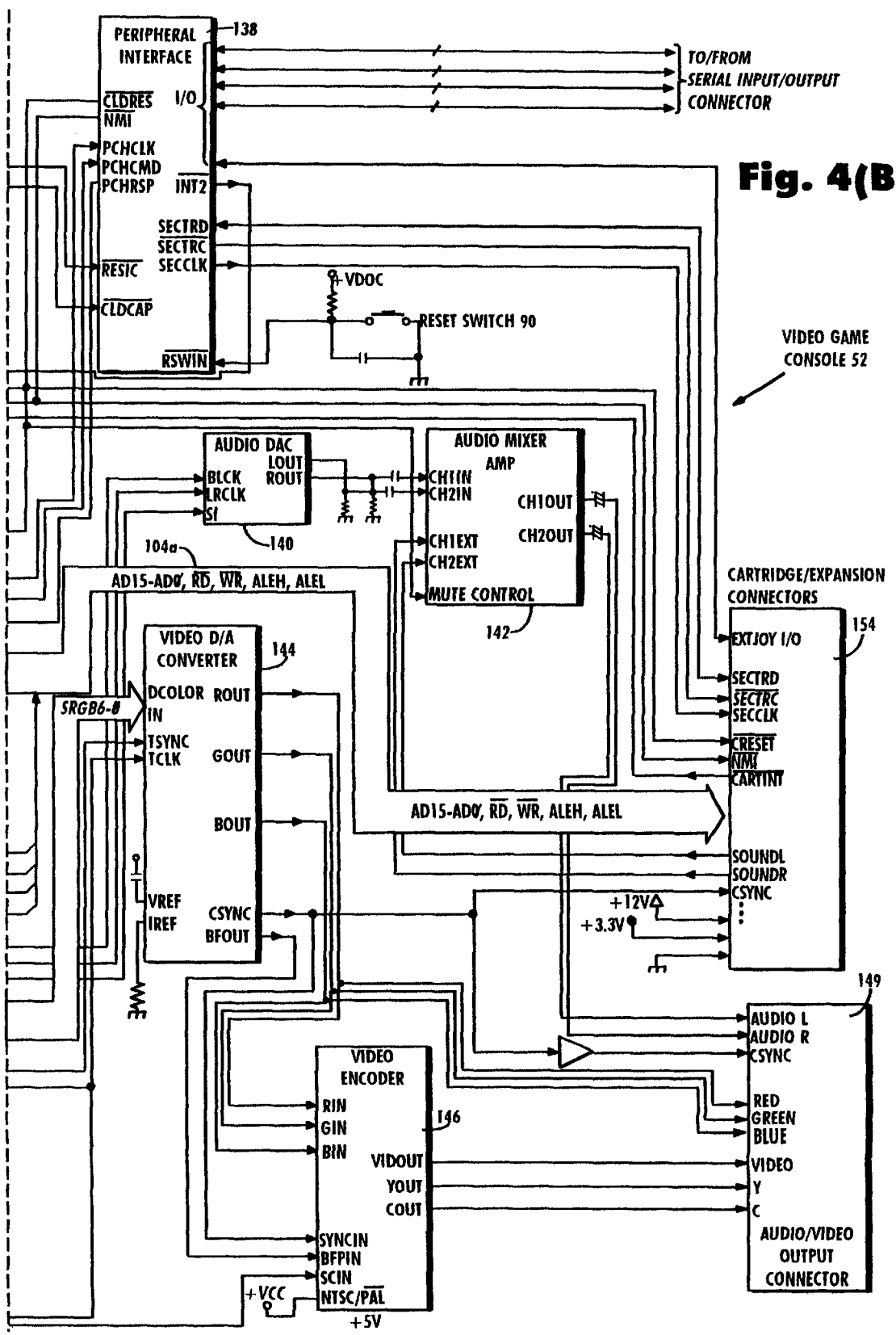

FIGS. 4A and 4B comprise an exemplary more detailed implementation of the FIG. 2 block diagram. Components in FIGS. 4A and 4B, which are identical to those represented in FIG. 2, are associated with identical numerical labels. Many of the components shown in FIGS. 4A and 4B have already been described in conjunction with FIG. 2 and further discussion of these components is not necessary.

FIGS. 4A and 4B show the interface between system components and the specific signals received on device pins in greater detail than shown in FIG. 2. To the extent that voltage levels are indicated in FIGS. 4A and 4B, VDD represents +3.3 volts and VCC represents +5 volts.

Focusing first on peripheral interface 138 in FIG. 4B, signals such as CLDRES, NMI, RESIC, CLDCAP and RSWIN have been previously explained in conjunction with FIGS. 2, 3A and 3B which explanation will not be repeated herein. Three coprocessor 200/peripheral interface 138 communication signals are shown: PCHCLK, PCHCMD, and PCHRSP. These signals are transmitted on 3 bit wide peripheral interface channel bus as shown in FIGS. 2, 4A and 4B. The clock signal PCHCLK is used for timing purposes to trigger sampling of peripheral interface data and commands. The clock signal is transmitted from the coprocessor 200 to the peripheral interface 138.

Coprocessor 200 and CPU 100, based on the video game program store in storage device 54, supply commands for the peripheral interface 138 to perform on the PCHCMD control line. The command includes a start bit field, a command code field and data or other information.

The peripheral interface circuitry (as will be described further below) decodes the command and, if the data is ready in response to the command, sends a PCHRSP response signal comprising an acknowledge signal "ACK" followed by the response data. Approximately two clock pulses after the peripheral interface 138 generates the acknowledgment signal ACK, data transmission begins. Data received from the peripheral interface 138 may be information/instructions stored in the boot ROM or controller status or controller data, etc.

Figure 5A:
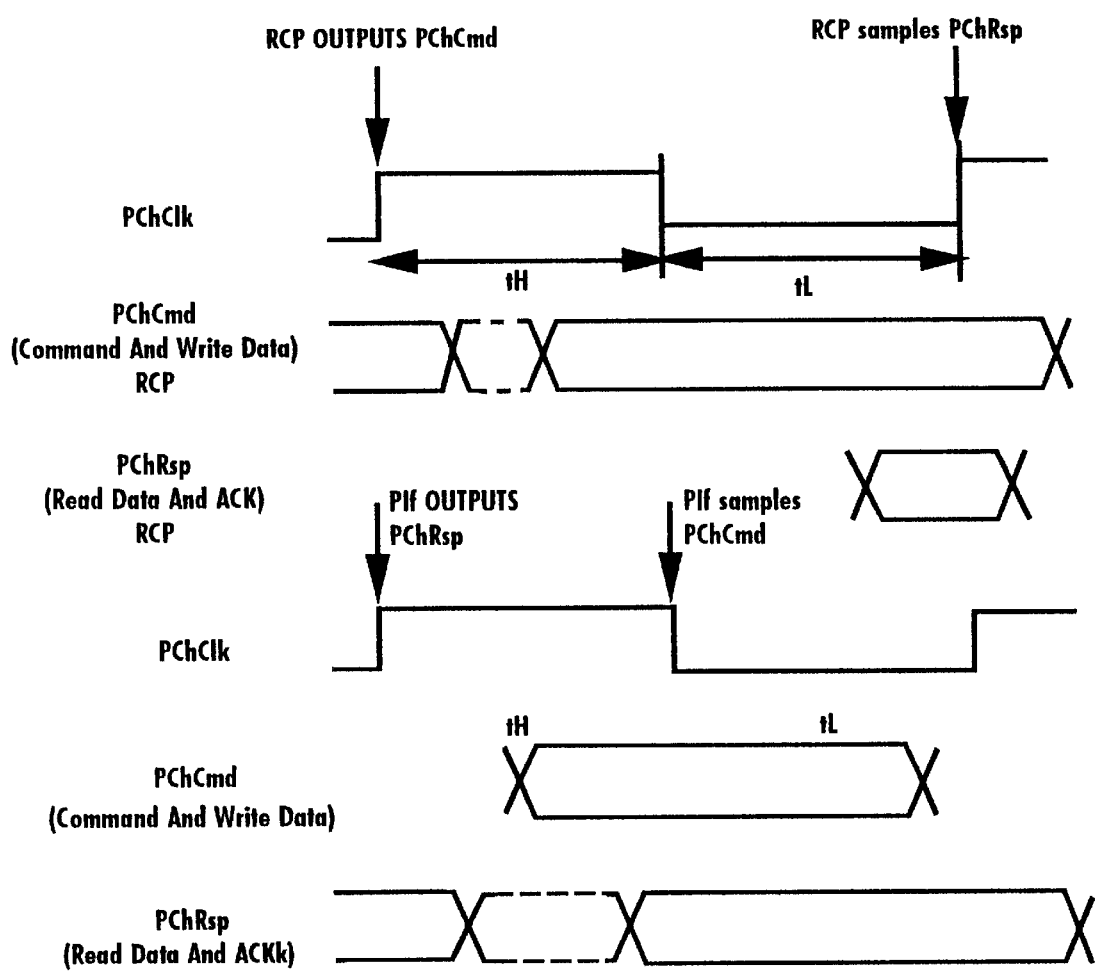
FIG. 5A shows exemplary signals appearing on the communication channel between the coprocessor in the peripheral interface subsystem.
Figure 5B:
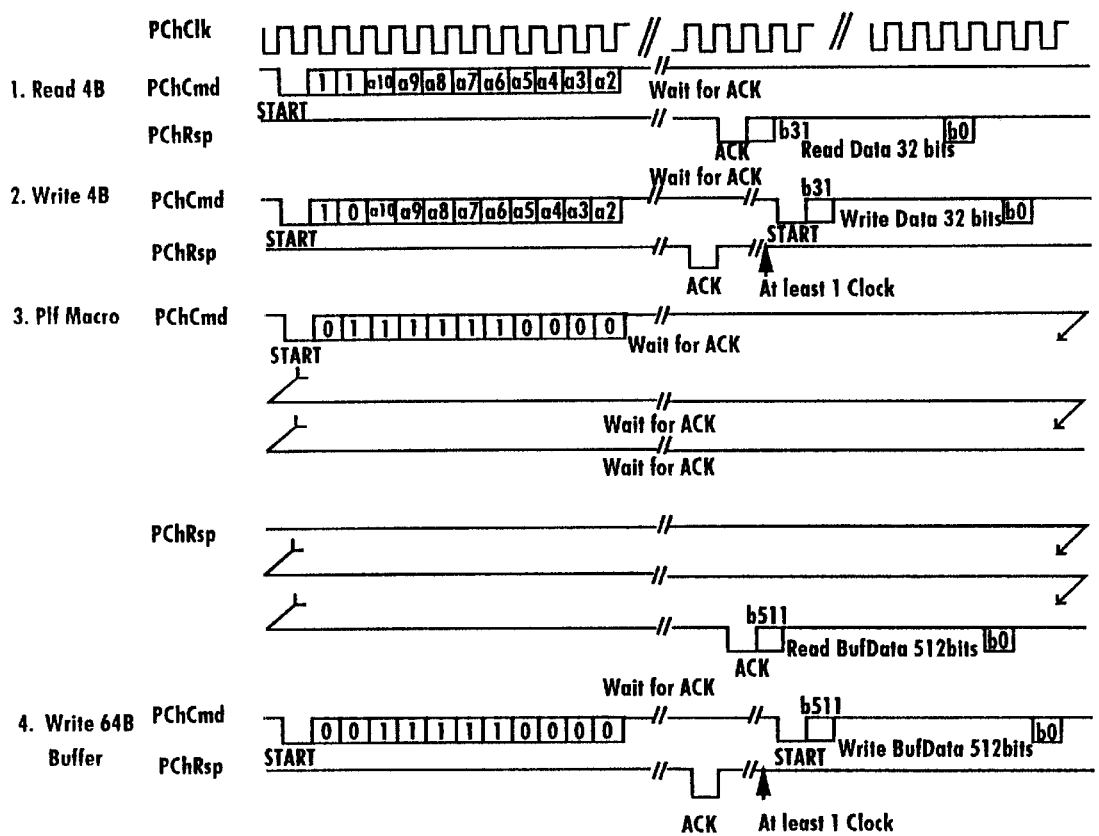
FIG. 5B depicts exemplary timing signals for illustrative commands communicated on this communication channel.

FIG. 5A shows representative signals transmitted across the PCHCLK, PCHCMD and PCHRSP lines. The relationships between the clock signal and the peripheral interface sampling of the PCHCMD line and the clock signal and the peripheral interface outputting of the response is shown in FIG. 5A. Additionally, the relationships between the clock signal and coprocessor 200 (RCP) outputting a PCHCMD and the coprocessor sampling the PCHRSP is shown in FIG. 5A. As suggested by FIG. 5A, the high and low levels of the clock signal may have different pulse widths dependent upon whether the system is to be utilized with NTSC or PAL. FIG. 5B shows exemplary signals appearing on the peripheral interface channel for four exemplary commands serving to read 4 bytes into memory, write 4 bytes into memory, execute a peripheral interface macro instruction or write 64 bytes into peripheral interface buffer memory. Further explanation of the peripheral interface device and these commands will be described in detail below.

Turning back to the FIG. 4B peripheral interface 138, SECCLK, SECTRC and SECTRD are three security related signals coupled between two security processors embodied within the peripheral interface 138 and game cartridge, respectively. SECCLK is a clock signal used to clock security processor operations in both the peripheral interface and the game cartridge. SECTRC is a signal sent from the peripheral interface 138 to the game cartridge defining a data transmission clock signal window in which data is valid and SECTRD is a data transmission bus signal in which data from the peripheral interface 138 and data from the game cartridge security processor are exchanged at times identified by the SECTRD transmission clock pulses. Finally, the peripheral interface 138 includes a pin RSWIN which is the reset switch input pin.

Turning next to connector 154, as previously mentioned, the system 50 includes an expansion capability for adding another controller 56. Data from such a controller would be transmitted via the EXTJOY I/O pin of the connector 154. The three above-mentioned security related signals are coupled between the game cartridge security processor and peripheral interface processor at the pins labeled SECTRD, SECTRC and SECCLK.

The cartridge connector additionally couples a cold reset signal CRESET to the game cartridge security processor to enable a power on reset function. Additionally, if during processor authentication checking, if, for example, the peripheral interface processor does not receive data which matches what is expected, the cartridge processor may be placed in a reset state via the CRESET control pin.

The NMI input is a control pin for coupling an NMI interrupt signal to the cartridge. The control line CARTINT is provided to permit an interrupt signal to be generated from the cartridge to CPU 100 to, for example, if devices are coupled to the cartridge requiring service by CPU 100. By way of example only, a bulk storage device such as a CD ROM is one possible device requiring CPU interrupt service.

As shown in FIG. 4B, the system bus is coupled to the cartridge connector 154 to permit accessing of program instructions and data from the game cartridge ROM and/or bulk storage devices such as CD ROM, etc. In contrast with prior video game systems such as the Nintendo NES and SNES, address and data signals are not separately coupled on different buses to the game cartridge but rather are multiplexed on an address/data 16 bit wide bus. Read and write control signals and address latch enable high and low signals, ALEH and ALEL, respectively are also coupled to the game cartridge. The state of the ALEH and ALEL signals defines the significance of the information transmitted on the 16 bit bus. The read signal RD is a read strobe signal enabling data to be read from the mask ROM or RAM in the game cartridge. The write signal WR is a strobe signal enabling the writing of data from the coprocessor 200 to the cartridge static RAM or bulk media device. The multiplexed use of the 16 bit address/data bus is described in further detail in conjunction with FIGS. 12–14 in describing external memory accessing.

Sound may be output from the cartridge and/or through connector 154 to the audio mixer 142 channel 1 and channel 2 inputs, CH1EXT and CH2EXT, respectively. The external sound inputs from SOUNDL and SOUNDR will be mixed with the sound output from the coprocessor via the audio DAC 140 and the CH1IN, CH2IN inputs to thereafter output the combined sound signal via the audio mixer outputs CH1OUT, CH2OUT which are, in turn, coupled to the AUDIOL and AUDIOR inputs of the audio video output connector 149 and thereafter coupled to the TV speakers 62*a,b*.

The connector 154 also receives a composite sync signal CSYNC which is the output of video DAC 144 which is likewise coupled to the audio video output connector 149. The composite sync signal CSYNC, as previously described, is utilized as a synchronization signal for use in synchronizing, for example, a light pen or photogun.

The cartridge connector also includes pins for receiving power supply and ground signals as shown in FIGS. 4B. The +3.3 volts drives, for example, the 16 bit AD bus as well as other cartridge devices. The 12 volt power supply connection is utilized for driving bulk media devices.

Turning to coprocessor 200 in FIG. 4A, many of the signals received or transmitted by coprocessor 200 have already been described, which will not be repeated herein. The coprocessor 200 outputs an audio signal indicating whether audio data is for the left or right channel, i.e., AUDLRCLK. Serial audio data is output on a AUDDATA pin. Timing for the serially transmitted data is provided at the AUDCLK pin. Coprocessor 200 outputs seven video signals SRGB0 through SRGB7 which synchronized RGB digital signals are coupled to video DAC 144 for conversion to analog. Coprocessor 200 generates a timing signal SYNC that controls the timing for the SRGB data which is coupled to the TSYNC input of video DAC 144. Coprocessor 200 receives a video clock input from clock generator 136 via the VCLK input pin for controlling the SRGB signal timing. The coprocessor 200 and CPU 100 use a PVALID SIGNAL to indicate that the processor 100 is driving a valid command or data identifier or valid address/data on the system bus and an EVALID signal to indicate that the coprocessor 200 is driving a valid command or data identifier or valid address/data on the system bus. Coprocessor 200 supplies CPU 100 with master clock pulses for timing operations within the CPU 100. Coprocessor 200 and CPU 100 additionally use an EOK signal for indicating that the coprocessor 200 is capable of accepting a processor 100 command.

Turning to main memory RDRAM 300, 302, as depicted in FIG. 4A, two RDRAM chips 300*a* and 300*b* are shown with an expansion RDRAM module 302. As previously described, the main memory RDRAM may be expanded by plugging in a memory module into a memory expansion port in the video console housing. Each RDRAM module 300*a,b*, 302 is coupled to coprocessor 200 in the same manner. Upon power-up RDRAM 1 (300*a*) is first initialized, then RDRAM2 (300*b*) and RDRAM3 (302) are initialized.

RDRAM1 is recognized by coprocessor 200 since its SIN input is tied to VDD, as shown in FIG. 4A. When RD1 is initialized under software control SOUT will be at a high level. The SOUT high level signal is coupled to SIN of RDRAM 2 (300*b*) which operates to initialize RDRAM2. SOUT will then go to a high level which operates to initialize RDRAM3 (302) (if present in the system).

Each of the RDRAM modules receives bus control and bus enable signals from coprocessor 200. The coprocessor 200 outputs a TXCLK signal when data is to be output to one of RDRAM1 through 3 and a clock signal RXCLK is output when data is to be read out from one of the RDRAM banks. The serial in (SIN) and serial out (SOUT) pins are used during initialization, as previously described. RDRAM receives clock signals from the clock generator 136 output pin FSO.

Clock generator 136 is a three frequency clock signal generator. By way of example, the oscillator within clock generator 136 may be a phase-locked locked loop based oscillator which generates an FSO signal of approximately 250 MHz. The oscillator also outputs a divided version of the FSO signal, e.g., FSO/5 which may be at approximately 50 MHz, which is used for timing operations involving the coprocessor 200 and video DAC 144, as is indicated in FIGS. 4A and 4B. The FSC signal is utilized for timing the video encoder carrier signal. Clock generator 136 also includes a frequency select input in which frequencies may be selected depending upon whether an NTSC or PAL version of the described exemplary embodiment is used. Although the FSEL select signal is contemplated to be utilized for configuring the oscillator for NTSC or PAL use, as shown in FIG. 4A, the input resets the oscillator under power-on reset conditions. When connected to the power on reset, the oscillator reset is released when a predetermined threshold voltage is reached.

Figure 7:
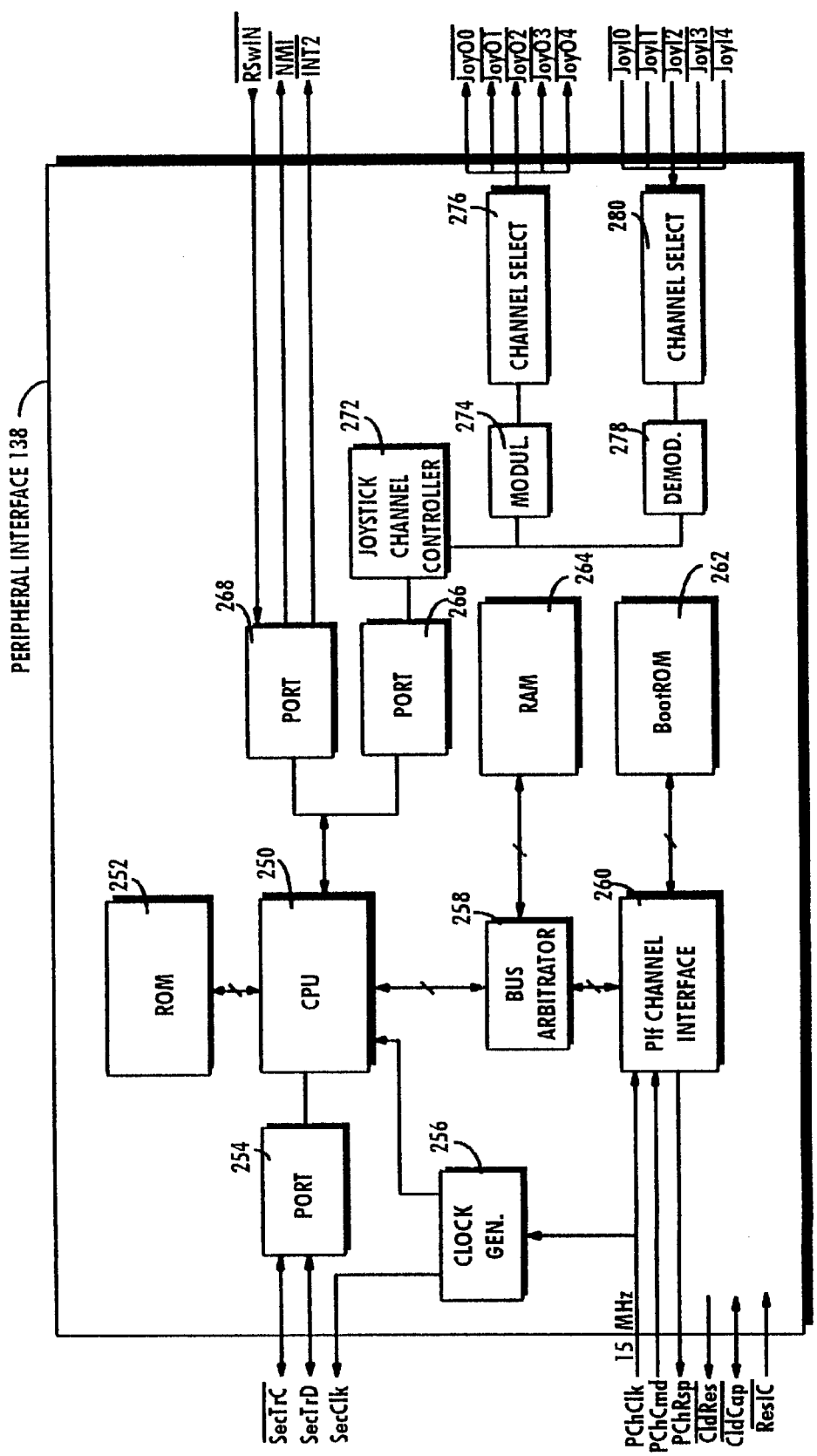
FIG. 7 is a block diagram of the peripheral interface shown in FIG. 2.

FIG. 7 is a block diagram of peripheral interface 138 shown in FIG. 2. The portion of peripheral interface 138 previously described in conjunction with FIGS. 3A and 3B is not shown in FIG. 7. Peripheral interface 138 is utilized for I/O processing, e.g., controlling the game controller 56 input/output processing, and for performning game authenticating security checks continuously during game play. Additionally, peripheral interface 138 is utilized during the game cartridge/coprocessor 200 communication protocol using instructions stored in boot ROM 262 to enable initial game play. Peripheral interface 138 includes CPU 250, which may, for example, be a 4 bit microprocessor of the type manufactured by Sharp Corporation. CPU 250 executes its security program out of program ROM 252. As previously described, the peripheral interface processor 250 communicates with the security processor 152 embodied on the game cartridge utilizing the SECTRC, SECTRD and SECCLK signals. Peripheral interface port 254 includes two 1 bit registers for temporarily storing the SECTRC and SECTRD signals.

Overall system security for authenticating game software is controlled by the interaction of main processor 100, peripheral interface processor 250, boot ROM 262 and cartridge security processor 152. Boot ROM 262 stores a set of instructions executed by processor 100 shortly after power is turned on (and, if desired, upon the depression of reset switch 90). The boot ROM program includes instructions for initializing the CPU 100 and coprocessor 200 via a set of initial program loading instructions (IPL). Authentication calculations are thereafter performed by the main processor 100 and the result is returned to the CPU 250 in peripheral interface 138 for verification. If there is verification, the game program is transferred to the RDRAM, after it has been initialized, and a further authentication check is made. Upon verification of an authentic game program, control jumps to the game program in RDRAM for execution. Continuous authentication calculations continue during game play by the authenticating processor in the peripheral interface 138 and by security processor 152 such as is described, for example, in U.S. Pat. No. 4,799,635 and related U.S. Pat. No. 5,426,762 which patents are incorporated by reference herein.

Turning back to FIG. 7, a PCHCLK clock signal having a frequency of, for example, approximately 15 MHz is input to clock generator 256 which, in turn, supplies an approximately 1 MHz clocking signal to CPU 250 and an approximately 1 MHz clock signal along the line SECCLK for transmission to the game cartridge security processor 152. PIF channel interface 260 responds to PCHCLK and PCHCMD control signals to permit access of the boot ROM 262 and RAM 264 and to generate signals for controlling the interruption of CPU 250, when appropriate.

Figure 8:
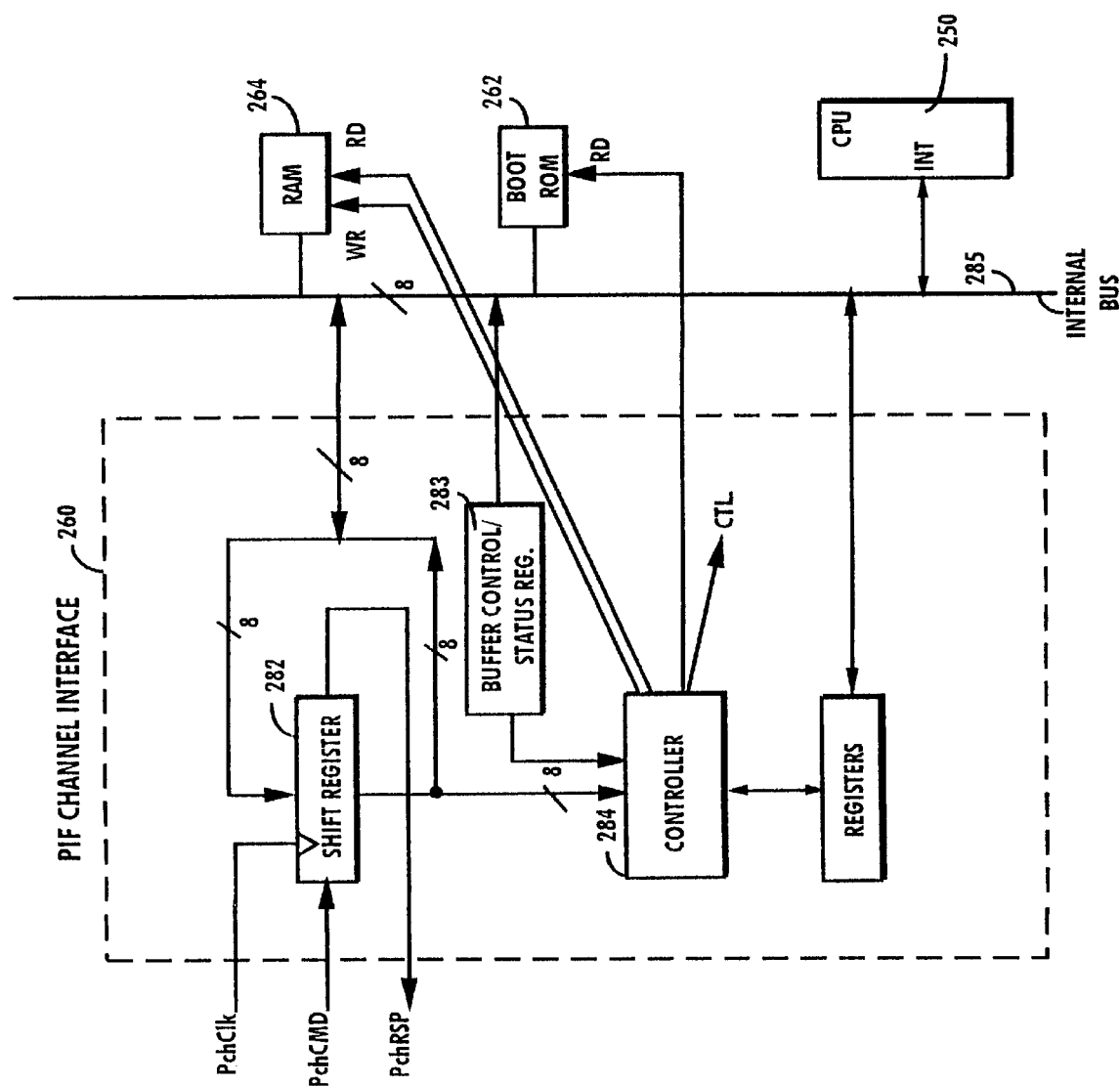
FIG. 8 depicts in further detail the PIF channel interface shown in FIG. 7.

FIG. 8 is a block diagram of the PIF channel interface 260 shown in FIG. 7. As shown in FIG. 8, commands are serially loaded into shift register 282 on line PCHCMD under the control of clock pulses PCHCLK. Shift register 282 operates as a serial to parallel converter and a parallel to serial converter as explained below. Controller 284 decodes commands which are output in parallel from shift register 282 to, for example, generate read or write control signals for accessing information from RAM 264, reading instructions out of boot ROM 262 or to generate interrupt control signals to be communicated to CPU 250 and/or generates other conventional control signals (CTL) as needed. Information accessed from RAM 264 and instructions accessed from boot ROM 262 are loaded via internal bus 285 in parallel to shift register 282 and then are clocked out of shift register 282 serially on the response line PCHRSP. If the command loaded into shift register 282 is a write to RAM 264 command, controller 284 will decode the command, generate a write control signal and output data associated with the command in parallel from the shift register to RAM 264. Thus, controller 284 exercises DMA control in controlling accessing of RAM 264 and boot ROM 262 data, and loading such data in shift register 282 and in controlling data transfer from shift register 282 to RAM 264. PIF channel interface 260 also includes a buffer control/status register 283 for storing channel status and/or control bits which may be accessed by controller 284 or CPU 250. This register stores information indicative of current buffer 264 access size and buffer 264 read/write status.

As shown in FIG. 5A, the PCHCLK signal is the basic clock signal which may, for example, be a 15.2 MHz signal utilized for clocking communication operations between the coprocessor 200 and the peripheral interface 138. FIG. 5A also shows the timing for the PCHCMD command issued by the coprocessor 200 to the peripheral interface 138. The command is utilized for reading and writing from and to RAM 264 and for reading from boot ROM 262. The peripheral interface 138 in turn provides a PCHRSP response which includes both accessed data and an acknowledgment signal. The lower three timing signals shown in FIG. 5A are signals from the perspective of the peripheral interface (PIF) whereas the upper three timing signals are from the perspective of the coprocessor.

In the present exemplary embodiment, four commands are contemplated including a read 4 byte from memory command for reading from RAM 264 and boot ROM 262, a write 4 byte memory command for writing to RAM 264, a PIF macro command for reading 64 bytes from buffer 264 and accessing control/data from the player controller (hereinafter JoyChannel). The CPU 250 is triggered to send or receive JoyChannel data by the PIF macro instruction. The main processor 100 may thus generate a PIF macro command which will initiate I/O processing operations by CPU 250 to lessen the processing burden on main processor 100. The main processor 100 may also issue a write 64 byte buffer command which writes 64 bytes into RAM 264.

Turning back to FIG. 7, peripheral interface 138 also includes a bus arbitrator 258 which allocates access to RAM 264 between CPU 250 and PIF channel interface 260. RAM 264 operates as a working RAM for CPU 250 and stores cartridge authenticating related calculations. RAM 264 additionally stores status data such as, for example, indicating whether the reset switch has been depressed. RAM 264 also stores controller related information in, for example, a 64 byte buffer within RAM 264. FIG. 5B shows exemplary command formats for reading and writing from and to the 64 byte buffer.

Both the buffer RAM 264 and the boot ROM 262 are in the address space of main processor 100. The CPU 250 of the peripheral interface 138 also can access buffer RAM 264 in its address space. Memory protection techniques are utilized in order to prevent inappropriate access to portions of RAM 264 which are used for authenticating calculations.

As can be seen in FIG. 7, the reset and interrupt related signals shown in FIGS. 3A and 3B, such as CLDRES, CLDCAP and RESIC are generated and/or processed as explained above. The signal RSWIN is coupled to port 268 upon the depression of reset switch 90 and, as explained above, the NMI and the pre-NMI warning signal, INT2, are generated as previously described in conjunction with FIG. 3B.

Port 268 includes a reset control register storing bits indicating whether an NMI or INT2 signal is to be generated. A third bit in the reset control register indicates whether the reset switch 90 has been depressed.

As mentioned previously, peripheral interface 138, in addition to its other fuinctions, serves to provide input/output processing for two or more player controllers. As shown in FIG. 1, an exemplary embodiment of the present invention includes four sockets 80a–d to accept up to four peripheral devices. Additionally, the present invention provides for including one or more additional peripheral devices. See connector 154 and pin EXTJOY I/O. The 64 byte main processor 100 does not directly control peripheral devices such as joystick or cross-switch based controllers. Instead, main processor 100 controls the player controllers indirectly by sending commands via coprocessor 200 to peripheral interface 138 which handles I/O processing for the main processor 100. As shown in FIG. 7, peripheral interface 138 also receives inputs from, for example, five player controller channels via channel selector 280, demodulator 278, joystick channel controller 272 and port 266. Joystick channel data may be transmitted to peripheral devices via port 266 to joystick channel controller 272, modulator 274 and channel select 276.

With respect to JoyChannel communication protocol, there is a command protocol and a response protocol. After a command frame, U there is a completion signal generated. A response frame always comes after a command frame. In a response frame, there is a completion signal generated after the response is complete. Data is also sent from the peripheral interface 138 to the JoyChannel controllers. The CPU 250 of the peripheral interface controls such communications.

Each channel coupled to a player controller is a serial bilateral bus which may be selected via the channel selector 276 to couple information to one of the peripheral devices under the control of the four bit CPU 250. If the main processor 100 wants to read or write data from or to player controllers or other peripheral devices, it has to access RAM 264. There are several modes for accessing RAM 264 as shown in FIG. 5B. The 64 bit CPU 100 may execute a 32 bit word read or write instruction from or to the peripheral interface RAM 264. Alternatively, the CPU may execute a write 64 byte DMA instruction. This instruction is performed by first writing a DMA starting address into the main RAM address register. Thereafter, a buffer RAM 264 address code is written into a predetermined register to trigger a 64 byte DMA write operation to transfer data from a main RAM address register to a fixed destination address in RAM 264.

A PIF macro also may be executed. A PIF macro involves an exchange of data between the peripheral interface RAM 264 and the peripheral devices and the reading of 64 bytes by DMA. By using the PIF macro, any peripheral device's status may be determined. The macro is initiated by first setting the peripheral interface 138 to assign each peripheral device by using a write 64 byte DMA operation or a write 4 byte operation (which could be skipped if done before and no change in assignment is needed). Thereafter, the DMA destination address is written onto amain RAM addres address register and a predetermined RAM 264 address code is written in a PIF macro register located in the coprocessor which triggers the PIF macro. The PIF macro involves two phases where first, the peripheral interface 138 starts a reading or writing transaction with each peripheral device at each assigned mode which results in updated information being stored in the peripheral interface RAM 264.

Thereafter, a read 64 byte DMA operating is performed for transferring 64 bytes from the fixed DMA starting address of the RAM 264 to the main RAM address register programmable DMA destination address within main RAM 300. See FIGS. 5B for PIF macro timing signals.

The table below exemplifies the manner in which the 64 bit main processor 100 communicates using its memory address space by addressing RAM 264 to exchange information with the JoyChannels.

|  | Addr. +0 | Addr. +1 | Addr. +2 | Addr. +3 |
|---|---|---|---|---|
| 0x1FC007FC |  |  |  | Format |
| 0X1fc007F8 |  |  |  |  |
|  |  |  | ------» Ch. 6 Nth Rx Data |  |
|  |  |  |  |  |
| ------» | Ch. 5 Nth Rx Data | Ch. 6 Tx Size Area M Bytes | Ch. 6 Rx Size Area N Bytes | Ch. 6 1st Tx Data |
|  | Ch. 3, Ch. 4, Ch. 5 |  |  |  |
| ------» | Ch. 1 Nth Rx Data | Ch. 2 Rx Size Area M Bytes | Ch. 2 Rx Size Area N Bytes | Ch. 2 1st Tx Data |
|  |  |  |  |  |
|  |  | ------» Ch. 1 Mth Tx Data | Ch. 1st Rx Data «------ |  |
| 0x1FC007C4 |  |  |  |  |
| 0x1FC007C0 | Ch. 1 Tx Size Area M Bytes | Ch. 1 Rx Size Area N Bytes | Ch. 1st Tx Data «------ |  |

There are six JoyChannels available in the present exemplary embodiment. Each Channel's transmit data and receive data byte sizes are all independently assignable by setting size parameters. In the exemplary embodiment, all six channels size parameter setups are required, whether they are used or not. As shown above, RAM 264 is to be used for each channel's TxData/RxData assignment. TxData/RxData assignment becomes effective when main processor 100 sets a fornat flag (0x1FC007FC b0) by using Wr64B or Wr4B.

In the exemplary embodiment, if processor 100 writes "0x00", "0xFD", "0xFE" or "0xFF" as TxData Size, the data is not recognized as TxData size but has a special function as indicated below. They become effective when processor 100 sets format bit (0x1FC007FC b0) by using Wr64B or Wr4B.

"0x00"=Channel Skip

If 0x00 is written as TxData Size, respective JoyChannel transaction is not executed.

"0xFD"=Channel Reset

If 0xFD is written as TxData Size, PIF outputs reset signal to respective JoyChannel.

"0xFE"=Format End

If 0xFE is written as TxData Size, TxData RxData assignment is end at this ")xFE". In other words, the TxData Size or RxData Size after "0xFE" is ignored.

"0xXFF"=Dummy Data

TxData Size's 0xFF is used as the dummy data for word aligning the data area.

Each Channel has four flags. Two of them have information from processor 100 to JoyChannel and others from JoyChannel to processor 100.

Skip Channel=Skip

If processor 100 sets this flag to "1", respective JoyChannel transaction is not executed. This flag becomes effective without formal flag.

Res=Channel Reset

If 64 bit CPU set this flag to "1", PIF outputs reset signal to respective JoyChannel. This flag becomes effective without format flag.

NR=No Response to JoyChannel

When each JoyChannel's peripheral device does not respond, the respective NR bit is set to "1". This is the way to detect the number of currently connected peripheral devices.

Err=JoyChannel Error

When communication error has occurred between PIF and peripheral device, Err flag is set to "1".

If the 64 bit CPU 100 wants to change Joy Channel's Tx/RxData assignment, a 32 bit format flag is used, where a certain bit(s) specify the desired format. For example, when Wr64B or Wr4B is issued when this flag is "1", PIF executes each JoyChannel's Tx/RxData assignment based on each channel's Tx/Rx Size. In other words, unless this flag is set to "1" with Wr64B or Wr4B, Tx/RxData area assignment does not change. After Tx/RxData assignment, this flag is reset to "0" automatically.

Figure 9A:
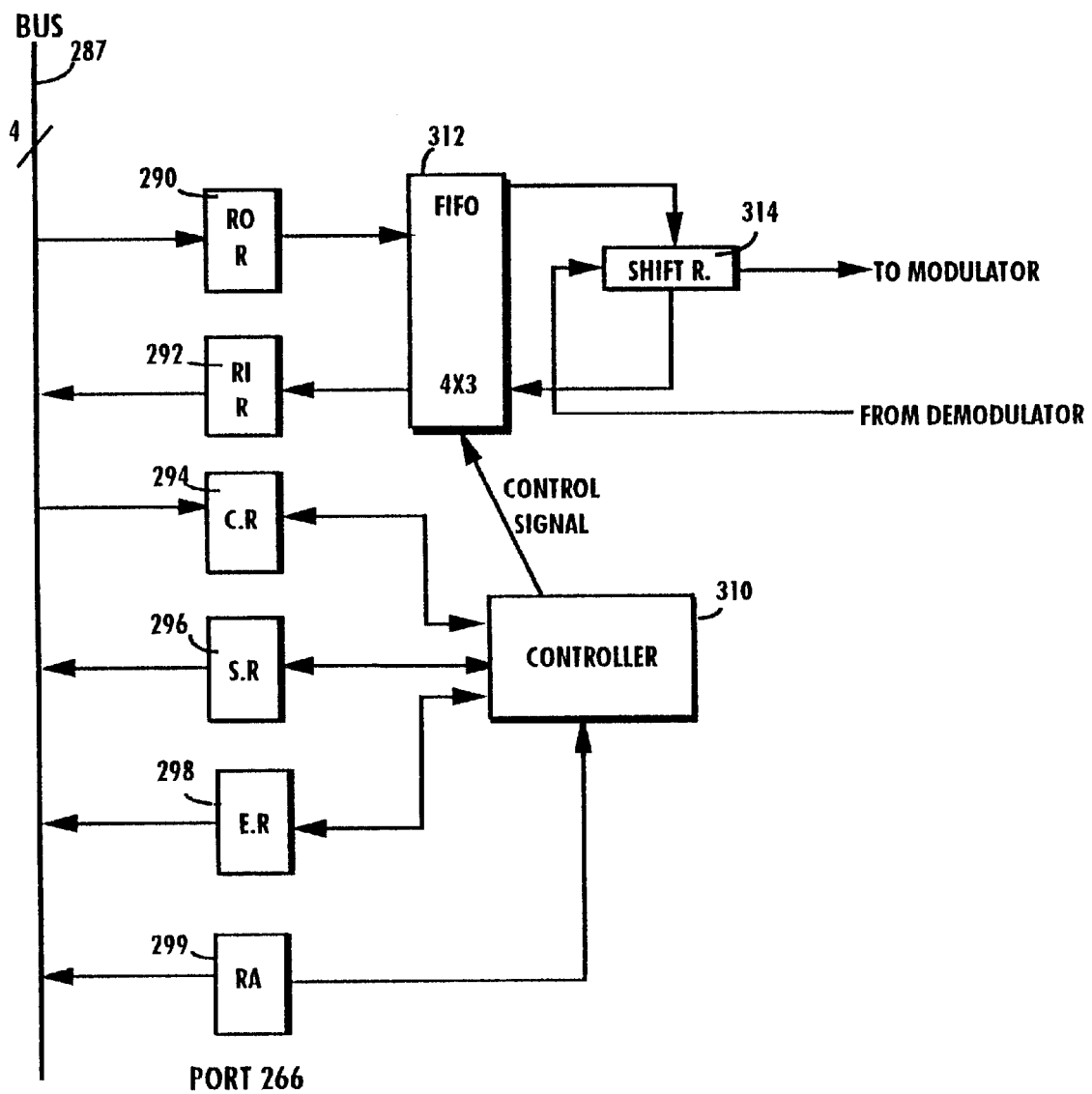
FIG. 9A is a block diagram showing in further detail the joystick channel controller in one of the ports depicted in the block diagram of FIG. 7.

FIG. 9A is a block diagram of the joystick channel controller 272 and port 266 shown in FIG. 7. As indicated in FIG. 9A, bus 287 which is coupled to CPU 250 couples data to be transmitted to JoyChannel through port register 290 to FIFO buffer 312. Under the control of controller 310, four bit data is then loaded into shift register 314 in parallel and serially clocked out to modulator 274 into an identified JoyChannel selected by channel select 276 based on an address resident in address register RA299. Data received from a JoyChannel is input via channel selector 280 to demodulator 278 and then is serially loaded into shift register 314. The serial data is converted to parallel by shift register 314, loaded into FIFO 312 and then coupled to CPU 250 via register 292. Controller 310 generates conventional control signals (CTL) used to control the data exchange described herein.

The function of the various port 266 registers are summarized below. Register RO(290) is a JoyChannel output register for receiving data to be output via modulator 274 and channel select 276. Joystick Channel controller 272 uses a JoyChannel address register RA to control the channel select to identify particular JoyChannels for input and output of data. Register R1 292 is a four bit JoyChannel input data register. Register CR 294 is a JoyChannel control register which, for example, identifies whether data is being received or transmitted. Register SR 296 is a JoyChannel status register which, for example, includes a bit indicating that a Joy Bus data register is ready and that a bit indicating that a Joy Bus error has been detected. Register ER 298 is a Joy Bus error register that indicates whether there has been a collision error, frame error, overrun error or no response error. With respect to the no response signal, even if a controller is not connected and therefore could not give a response, the lack of response is treated as an error signal in the exemplary embodiment of the present invention.

As can be seen in FIG. 9A, controller 310 supplies the status register and the error register with the status and error information identified above in parallel and receives control signals from control register 294 for controlling buffer 312 and shift register 314 to respond according to the current mode of operation.

The video game system is programmed to allow one to four players to play at the same time by, for example, setting up RDRAM 300 as shown below:

|  | Addr. +0 | Addr. +1 | Addr/ +2 | Addr. +3 |  |
|---|---|---|---|---|---|
| Addr. +60 |  |  |  | 0 × 01 | PIfRAM Format Flag On |
|  | Ch. 5 | Ch. 6 |  |  |  |
|  | 0 × 00 | 0 × 00 |  |  |  |
|  | Channel Skip | Channel Skip |  |  |  |
|  | 0 × FF | 0 × 01 | 0 × 04 | 0 × 01 | Ch. 4 |
|  | 0 × FF | 0 × 01 | 0 × 04 | 0 × 01 | Ch. 3 |
| Addr. +8 | 0 × FF | 0 × 01 | 0 × 04 | 0 × 01 | Ch. 2 |
| Addr. +4 |  |  |  |  |  |
| DMA Start Addr. | 0 × FF | 0 × 01 | 0 × 04 | 0 × 01 | Ch. 1 |
|  | Ch.1~4 | Ch.1~4 | Ch. 1~4 |  |  |
|  | TxData Size | RxData Size | Read Controller |  |  |
|  | 1 Byte | 4 Byte | Data Command |  |  |
|  |  |  | 0 × 01 |  |  |

Thereafter, the DMA start address is written in a RDRAM coprocessor 200 address register. A RAM 264 address code is then written into the write 64 byte register in the coprocessor 200 and a write DMA destination address is written in the RDRAM address register in the coprocessor. Thereafter, the address in the 64 byte RAM 264 is written in the PIF macro register in the coprocessor.

The controllers response is returned to RDRAM. If only two controllers are connected to channel 1 and channel 2, DMA destination RAM area resulting therefrom after the PIF macro is executed is preferably as shown below. However, if a controller is connected to channel 3 or channel 4, the channel's RAM area changes to the same as channel 1 or channel 2.

between such controller and the peripheral interface 138 (and processing associated therewith) reference is made to Japanese patent application no. 00534 filed Oct. 9, 1995 naming Nishiumi et al as inventors, which application is incorporated herein by reference. Exemplary controller commands are shown below.

Command 0: Ask each peripheral device's type and status flag

TxSize: 1 byte RxSize: 3 byte

This command is used to ask the peripheral device's type and status flags, and its answer is supposed to be returned into RX data area.

PIfRAM Format Flag is Reset to "0"

| | Addr. +0 | Addr. +1 | Addr. +2 | Addr. +3 | |
|---|---|---|---|---|---|
| Addr. +60 | | | | 0 × 00 | |
| | Ch. 5 | Ch. 6 | | | |
| | 0 × 00 Channel Skip | 0 × 00 Channel Skip | | | |
| | | No Response from JoyChannel | | | |
| | 0 × FF | 0 × 01 | 0 × 84 | 0 × 01 | Ch. 4 |
| | | No Response from JoyChannel | | | |
| | 0 × FF | 0 × 01 | 0 × 84 No Response | 0 × 01 | Ch. 3 |
| | BAG ST ↑ ↓ ← → | 00LREDCF | Joystick X Pole | Joystick Y Pole | |
| Addr. +8 | 0 × FF | 0 × 01 | 0 × 04 | 0 × 01 | Ch. 2 |
| Addr. +4 | BAG ST ↑ ↓ ← → | 00LREDCF | Joystick X Pole | Joystick Y Pole | |
| DMA Destination Addr. | 0 × FF | 0 × 01 | 0 × 04 | 0 × 01 | Ch. 1 |

Figure 11:
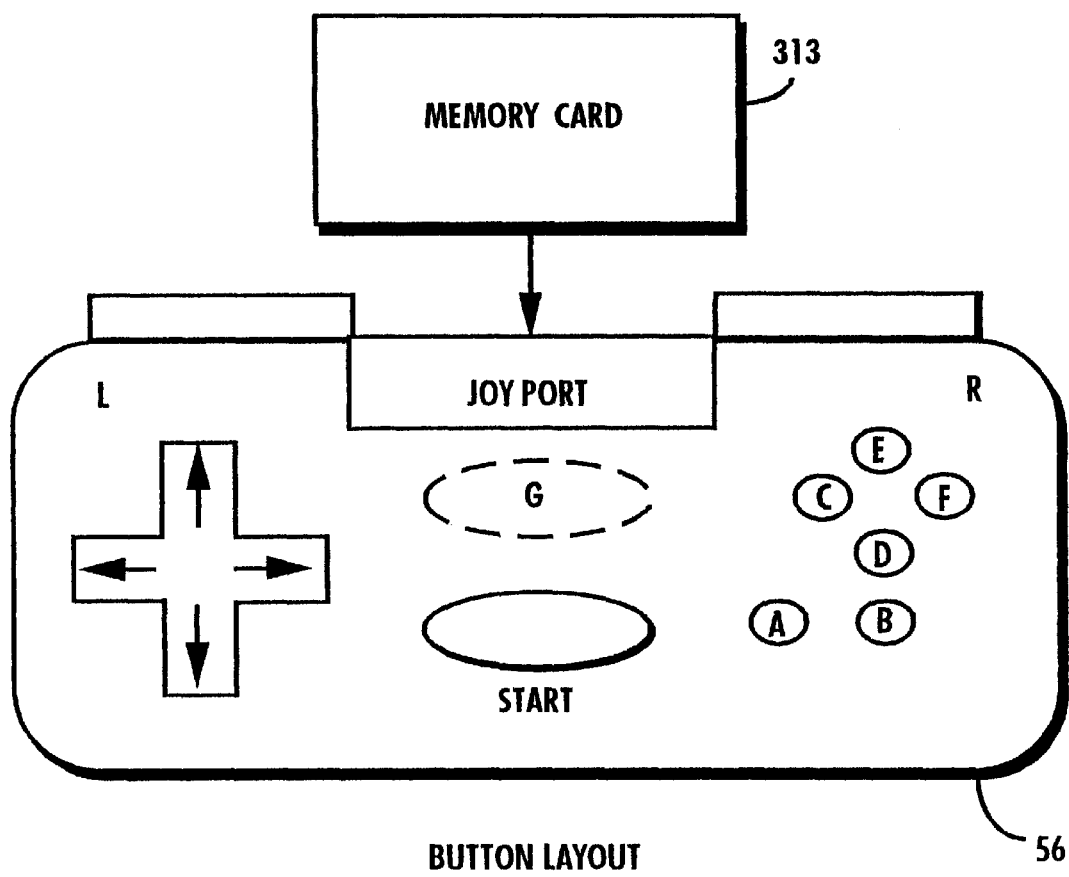
FIG. 11 shows an exemplary player controller with a memory card.

The peripheral device channel is designed to accept various types of future peripheral devices. The present exemplary embodiment uses an extensible command which is to be interpreted by peripherals including future devices. The commands occupy the first byte of a TxData area in RAM 264. Many bits and commands are reserved for future extension. Exemplary commands relating to peripheral devices are shown below. Commands are also provided for read and writing data to a memory card. Backup data for a game may be stored on a memory card. In this fashion, no backup battery need be used for this memory during game play since it plugs into the controller. Certain of these commands contemplate an expansion memory card module 313 that plugs into a player controller 56 as is shown in FIG. 11. For further details relating to exemplary controllers that may be used in system 50 and the communications protocol

| | | b7 | b6 | b5 | b4 | b3 | b2 | b1 | b0 |
|---|---|---|---|---|---|---|---|---|---|
| TxData | 1 BYTE | | | | ← Command O → | | | | |
| RxData | 1 BYTE | | | | ← Type L → | | | | |
| | 2 BYTE | | | | ← Type H → | | | | |
| | 3 BYTE | | | | ← Status Flag → | | | | |

Peripheral Device's Type

This type is provided from the connected peripheral device about its functions and features as shown for example below.

|   | b7 | b6 | b5 | b4 | b3 | b2 | b1 | b0 |
|---|---|---|---|---|---|---|---|---|
| H | Reserved | Reserved | Reserved | Reserved | Reserved | Reserved | Reserved | Reserved |
| L | Reserved | Reserved | Reserved | Reserved | Reserved | Reserved With JoyPort | Reserved | Joystick ABS Count, Standard |

L b0: In the case of the standard controllers, they would send a "1" response which indicates that controllers contain counters and send the joystick data as the absolute value.

L b2: In the case of the standard controllers, they would send a "1" response which indicates that controllers have the JoyPort which connects to the exchangeable memory card shown in FIG. 11.

Status Flags

These status flags are the response from the connected peripheral device about its status. In the case of standard controllers, these flags are used for memory card.

| b7 | b6 | b5 | b4 | b3 | b2 | b1 | b0 |
|---|---|---|---|---|---|---|---|
| Reserved | Reserved | Reserved | Reserved | Reserved | ADDR. CRC report | Card Xchg | Card ON | b0: If memory card is connected to controller, this flag is set to "1". If not, this flag is set to "0".

b1: After a controller is plugged in, if memory card is pulled out, this flag is set to "1" This flag is reset to "0" when controller plugged and power supplied, or command 0 or 255 (controller software reset command) issued with memory card connected. If controller is plugged and power supplied without memory card, this flag is indefinite.

b2: AddrCRC (cyclic redundancy code) report is sent from the controller in communicating with JoyPort. This flag status "1" means that Address H/L are not transferred to the controller correctly. This flag is reset to "0", when peripheral device plugged and power supplied or command 0 or 255 issued.

Command 1: Read Controller Data

TxSize: 1 byte RxSize: 4 byte

Command 1 is used for getting controller's button condition and Joystick condition. Joystick's counter is reset to "0x00" when controller is plugged in and power is supplied, command 0 or 255 issued, JoyChannel reset issued or L, R, START buttons pushed at the same time. JRRes bit shows that L, R, START buttons are pushed at the same time.

|  |  | b7 | b6 | b5 | b4 | b3 | b2 | b1 | b0 |
|---|---|---|---|---|---|---|---|---|---|
| TxData | 1 BYTE | ← Command 0 → |
| RxData | 1 BYTE | B | A | G | START | ↑ | ↓ | ← | → |
|  | 2 BYTE | JSRes | O | L | R | E | D | C | F |
|  | 3 BYTE | ← Joystick X axis counter readings → |
|  | 4 BYTE | ← Joystick Y axis counter readings → |

Figure 9B:
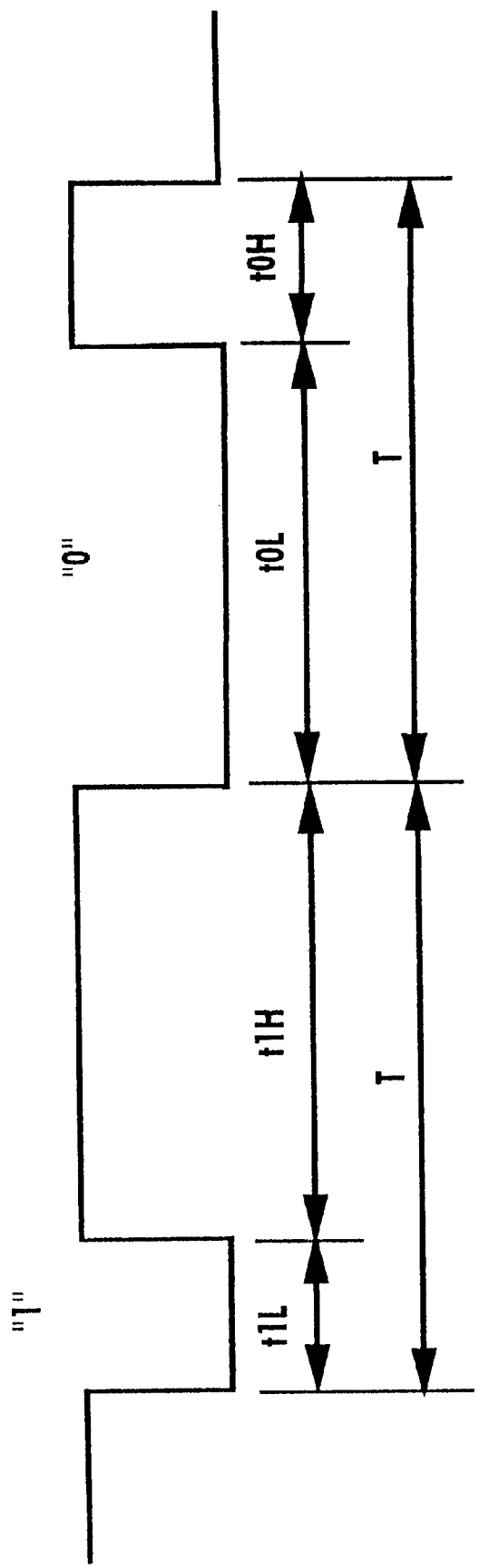
FIG. 9B is an illustrative representation of data from a player controller communicated to the peripheral interface 138.

Turning back to FIG. 7, the JoyChannels do not require two separate lines for clock and data signals, respectively. Instead, JoyChannel data is transmitted to represent 1's and 0's as shown in FIG. 9B. In this fashion, only power line, ground and data transmitted as shown in FIG. 9B are required. Thus, as shown in FIG. 9B, pulse duty modulation is utilized to represent 1's and 0's. By sampling the data at the middle of the clocking signal whether the data represents a 1 or 0 is determined.

Figure 10A:
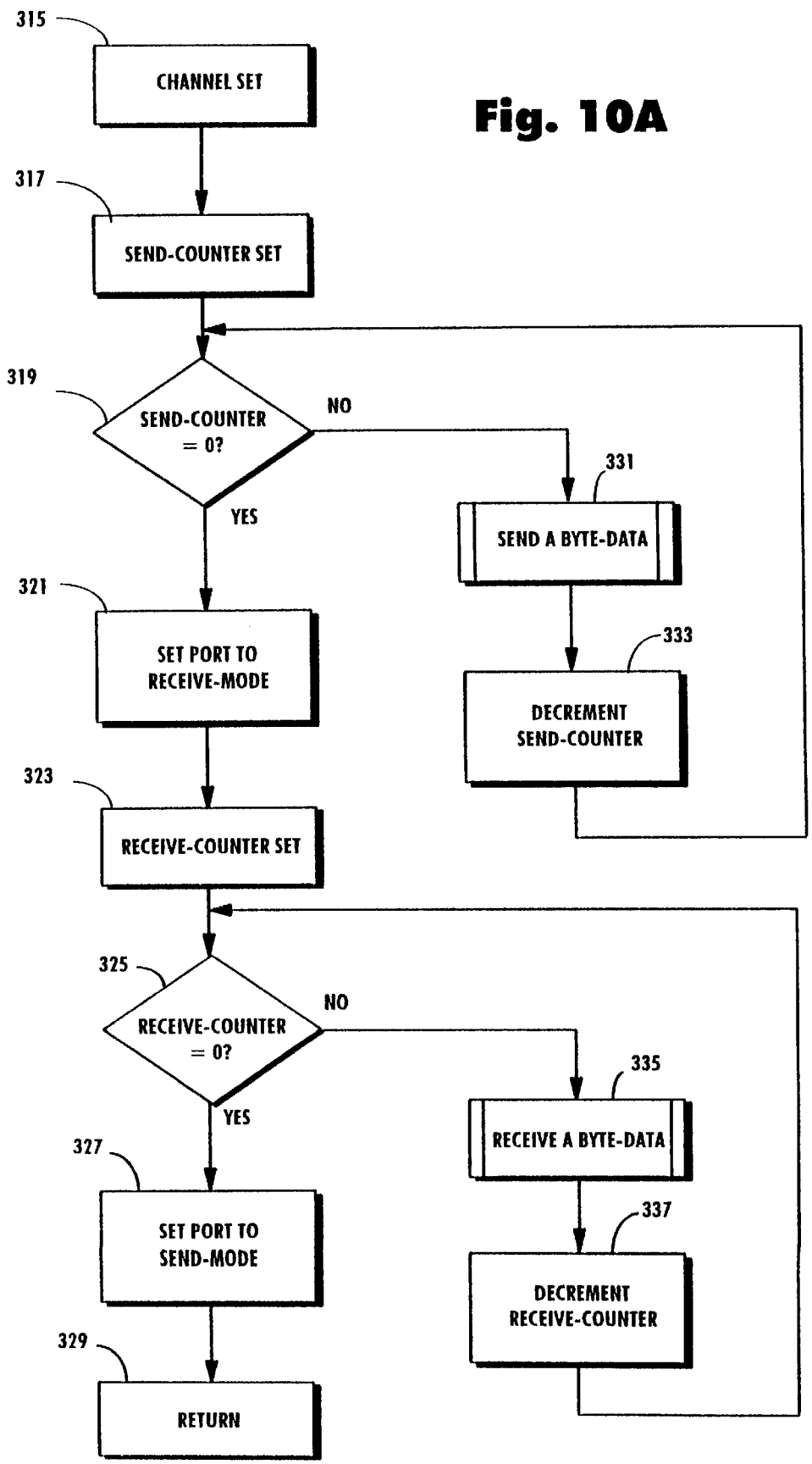
FIGS. 10A through 10C are flowcharts depicting the sending and receiving modes of operation for the player controller channel shown in FIG. 7.
Figure 10B:
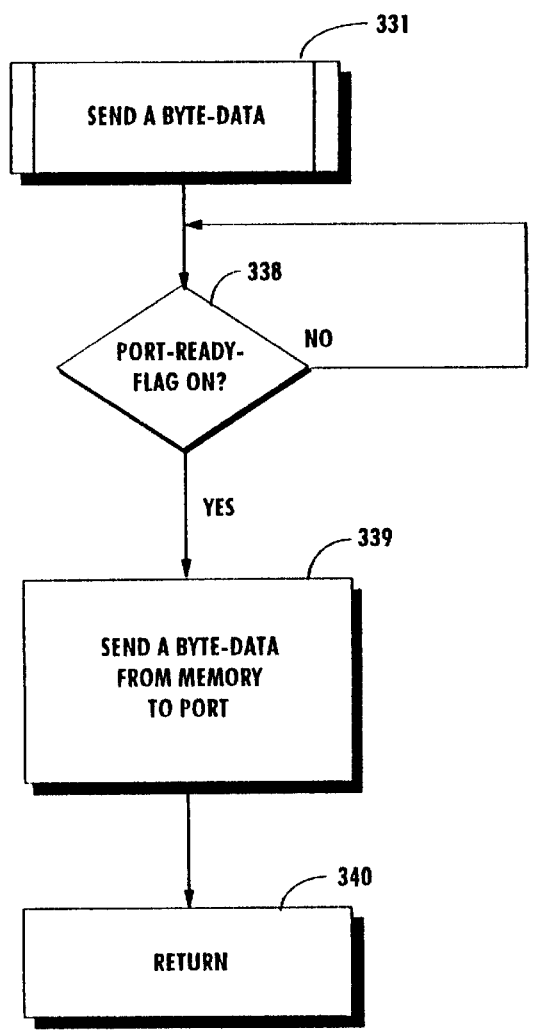
Figure 10C:
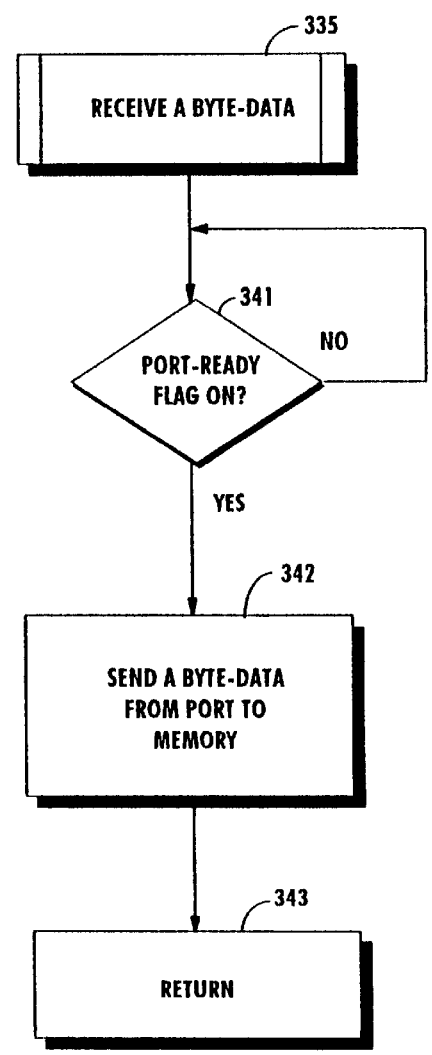

The flow charts in FIGS. 10A through 10C depict the sequence of operations involved in sending and receiving data between port 266 shown in FIG. 9A and the JoyChannels shown in FIG. 7. A routine for sending and receiving data is shown in which the channel mode is set (315). A send counter is set to the desired value (317). A check is then made, as indicated at block 319, to determine if the send counter is equal to zero.

If the send counter is equal to zero, then the port is set to receive mode (321). Thereafter, the receive counter is set (323). A check is then made to determine if the receive counter is zero (325). If the receive counter is zero, then the port is set to send mode (327), after which return is made to the calling routine being executed by CPU 250.

If, at block 319, a determination was made that the send counter is not equal to zero, then the routine branches to a send-a-byte of data sub-routine (331). As indicated in FIG. 10B, in accordance with the send-a-byte of data routine, a check is made to determnine whether the port ready flag is on (338). If the port ready flag is not on, the routine cycles until the port ready flag is on. When the port ready flag is on, then a byte of data is sent from memory to the port (339) and the routine branches to the calling routine in block 331 in FIG. 10A. After a byte of data has been sent, the send counter is decremented (333) and the routine branches back to block 319. Once the send counter is equal to zero, the receive mode is entered as previously described.

If the check at block 325 indicates that the receive counter is not equal to zero, then the routine branches to a receive-a-byte of data subroutine (335) shown in FIG. 10C. In accordance with the receive-a-byte of data routine (335), a check is made to determine whether the port ready flag is on (341). If the port ready flag is not on, then the routine cycles until the port ready flag is turned on. Thereafter, a byte of data from the port is sent to the memory (342) and the routine branches to the calling routine (343) at block 335. After a byte of data has been received, the receive counter is decremented (337) and the routine branches back to block 325.

Figure 12:
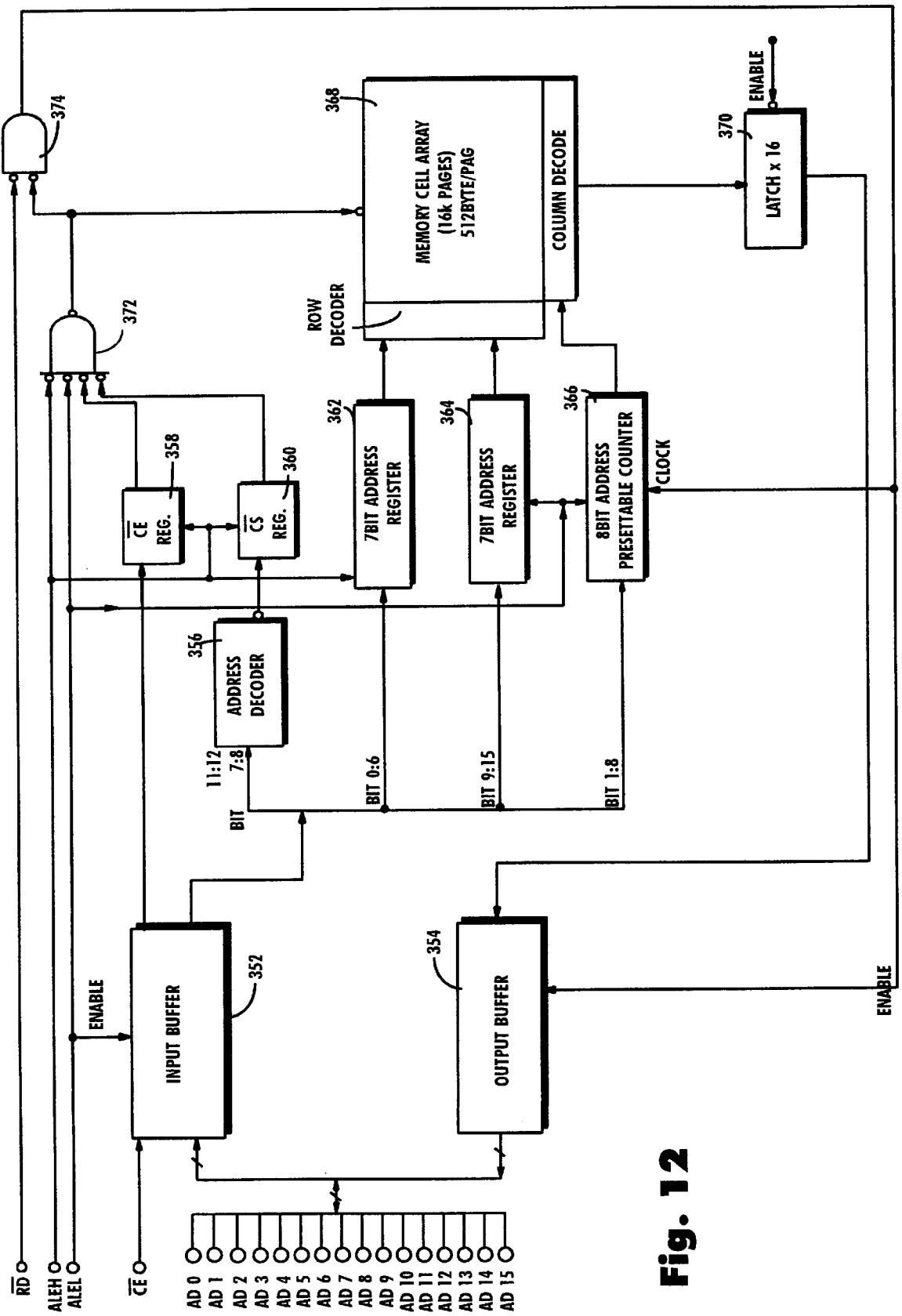
FIG. 12 is a block diagram of an exemplary cartridge memory device and associated accessing circuitry.
Figure 13:
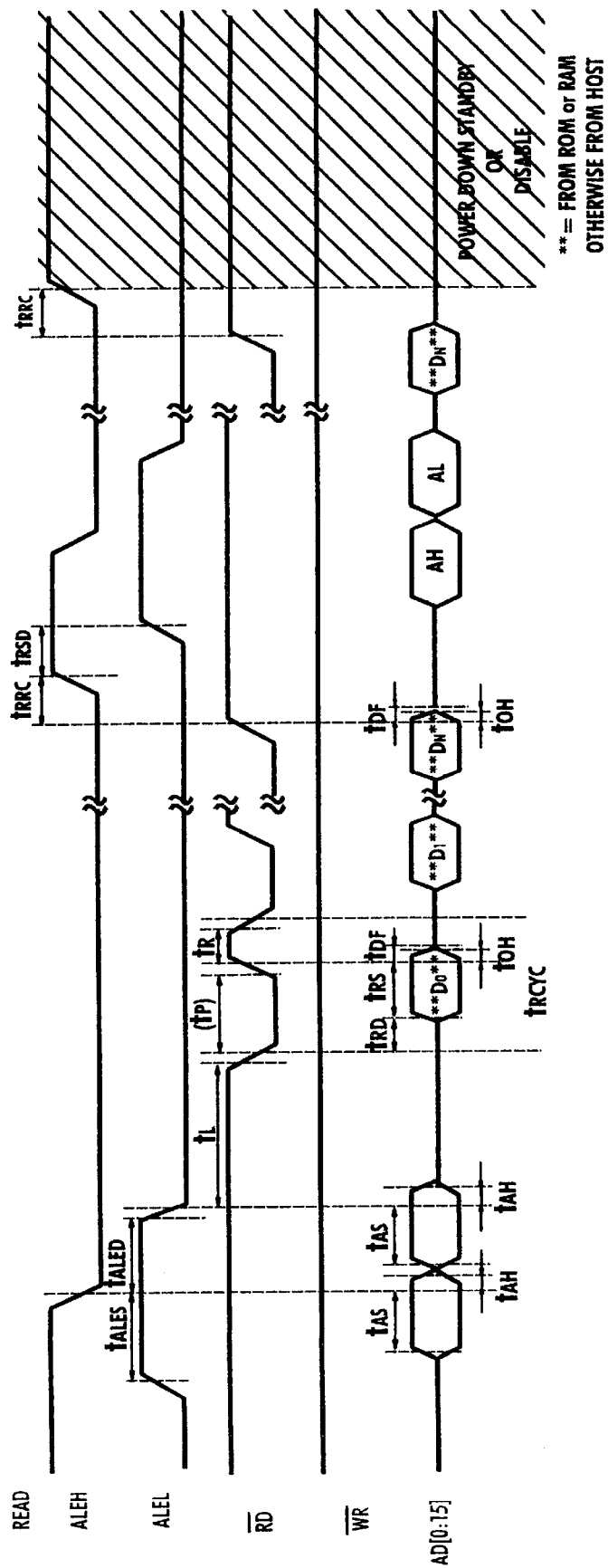
FIGS. 13 and 14 are exemplary timing control and data signals associated with the memory system depicted in FIG. 12.
Figure 14:
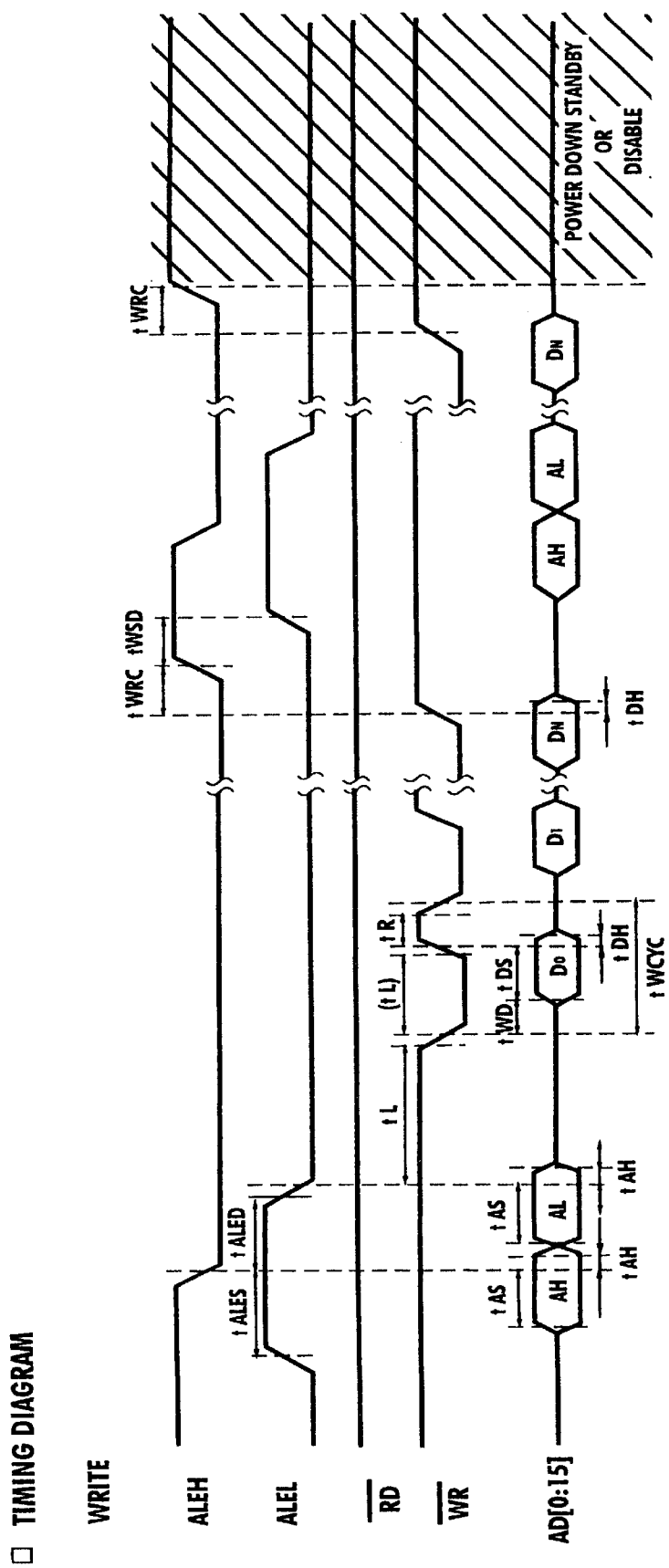

FIG. 12 is a block diagram which demonstrates in detail how the address/data 16 bit bus is utilized to read information from a game cartridge ROM and read and write information from a game cartridge RAM. Coprocessor 200 generates an address latch enable high signal which is input to the ALEH pin in FIG. 12. Exemplary timing signals for the reading and writing of information are shown in FIGS. 13 and 14 respectively. The coprocessor 200 similarly generates an address latch enable flow signal (shown in FIG.

13) which is coupled to the ALEL pin which, in turn, enables information on address pin 0 to 15 to be loaded into the input buffer 352. Bits 7 and 8 and 11 and 12 from input buffer 352 are, in turn, coupled to address decoder 356. In the exemplary embodiment of the present invention, bits 7, 8 and 11, 12 are decoded by the address decoder to ensure that they correspond to 4 bits indicative of the proper location in the address space for the mask ROM 368. Thus, the mask ROM 368 has a designated location in the AD16 bus memory map and decoder 356 ensures that the mask ROM addressing signals correspond to the proper mask ROM location in this memory map. Upon detecting such correspondence, decoder 356 outputs a signal to one-bit chip select register 360. Turning to FIG. 13, when ALEH transitions from high to low, as shown in FIG. 12, bits 0 to 6 output from input buffer 352 are latched into 7 bit address register 362. Simultaneously, data from address decoder 356 is latched into chip select register 360 and register 358 is also enabled, as indicated in FIG. 12.

When the coprocessor 200 outputs low order address bits on the AD16 bus, the address signals are input to input buffer 352. The bits are coupled in multiple directions. As indicated in FIG. 12, bits 1 to 8 are set in an 8 bit address presettable counter 366 and bits 9 to 15 are coupled to 7 bit address register 364. At a time controlled by ALEL (shown in FIG. 13), when registers 358 and 360 are set and registers 362, 364 and 366 are loaded, the read out of data is ready to be initiated. As indicated in FIG. 13, the time TL is required for data to be output after the ALEL signal transitions from high to low. After the ALEL signal has been generated, a read pulse RD is applied on the pin shown in the top lefthand portion of FIG. 12. The read signal is input to gate 374 whose other input is coupled to gate 372. When the output of registers 358, 360 and signals ALEL and ALEH are low, then the output of 372 will be low. When RD and the output of 372 are low, the clock signal is generated at the output of 374 thereby causing the counter 366 to be clocked and begin counting and the output buffer 354 to be enabled. The 8 bit address presettable counter determines the memory cell array column selected and the combination of the output of address register 362 and address register 364 defines the memory cell row selected. The output data is temporarily stored in latch 370 and then coupled to output buffer 354. Thereafter, the data is transmitted back to coprocessor 200 via the same 16AD 0 to 15 lines.

By virtue of using the multiplexed AD 0 to 15 bus, the game cartridge pin out is advantageously reduced.

The circuitry of FIG. 12, although designed for accessing a mask ROM, is readily adaptable for writing information into, for example, static RAM using the timing signals shown in FIG. 14. In a static RAM embodiment, the processing of the ALEH and ALEL signals are the same as previously described as is the loading of information in the registers 358, 360, 362, 364 and 366. A write signal, such as shown in FIG. 14 is generated and coupled to gate 374 instead of the read signal shown in FIG. 12. Data is output from coprocessor 200 for writing into a static RAM memory 368. The data is loaded into buffer 352. A clock pulse is generated at the output of gate 374 to cause the address presettable counter to begin counting to cause data to be written into memory 368 rather than read out as previously described. Tables 1 through 3 below show the signals used in FIG. 12 and explain the timing symbols utilized in the read and write timing charts shown in FIGS. 13 and 14. The times indicated in Tables 2 and 3 are for purposes of illustration only.

TABLE 1

SIGNAL DESCRIPTION

| PIN NAME | I/O | DESCRIPTION |
|---|---|---|
| ALEH | 0 | Latch Timing Clock for High Address |
| ALEL | 0 | Latch Timing Clock for Low Address |
| RD | 0 | Read Strobe |
| WR | 0 | Write Strobe |
| AD [0:15] | I/O | Address or Data Input/Output |

TABLE 2

WRITE Address Domain 1

| SYMBOL | PARAMETER | MIN. | TYP. | MAX. | UNIT |
|---|---|---|---|---|---|
| $t_{ALES}$ | ALEL Setup Time | 70 | | | ns |
| $t_{ALED}$ | ALEL Delay Time | 70 | | | ns |
| $t_{AS}$ | Address Setup Time | 30 | | | ns |
| $t_{AH}$ | Address Hold Time | 0 | | | ns |
| $t_{WCYC}$ | Write Cycle Time | | Variable depend on $t_{P1}$ and $t_{R1}$ | | ns |
| $t_{DS}$ | Data Setup Time | | Variable depend on $t_{P1}$ | | ns |
| $t_{WD}$ | Write Data Delay Time | | 15 | | ns |
| $t_{DH}$ | Data Hold Time | 0 | | | ns |
| $t_{WRC}$ | Write Recovery Time | 20 | | | ns |
| $t_{WSD}$ | Start Delay Time | 0 | | | ns |

READ Address Domain 1

| SYMBOL | PARAMETER | MIN. | TYP. | MAX. | UNIT |
|---|---|---|---|---|---|
| $t_{ALES}$ | ALEL Setup Time | 70 | | | ns |
| $t_{ALED}$ | ALEL Delay Time | 70 | | | ns |
| $t_{AS}$ | Address Setup Time | 30 | | | ns |
| $t_{AH}$ | Address Hold Time | 0 | | | ns |
| $t_{RCYC}$ | Read Cycle Time | | Variable depend on $t_{P1}$ and $t_{R1}$ | | ns |
| $t_{RD}$ | Read Access Time | | Variable depend on $t_{P1}$ | | ns |
| $t_{RS}$ | Read Setup Time | | 15 | | ns |
| $t_{OH}$ | Output Hold Time | 0 | | | ns |
| $t_{DF}$ | Output Disable Time | | | 40 | ns |
| $t_{RRC}$ | Read Recovery Time | 0 | | | ns |
| $t_{RSD}$ | Start Delay Time | 0 | | | ns |

TABLE 3

PROGRAMMABLE PARAMETER (ADDRESS DOMAIN 1)

| Symbol | Parameter | Extent | UNIT |
|---|---|---|---|
| $t_{L1}$ | Latency Time | 16 ns × 1~16 ns × 256 | ns |
| $t_{P1}$ | Pulse Width | 16 ns × 1~16 ns × 256 | ns |
| $t_{R1}$ | Release Time | 16 ns × 1~16 ns × 4 | ns |

As shown in FIG. 2, the AD 16 bus may be used to address devices other than ROM. For example, FIG. 2 shows a read/write RAM which may be accessed by the video game system 50 through connector 154. By way of example only, ROM may occupy address domain 1 in the processor 100 memory space. In accordance with the present invention, a memory device having a different address domain may have different timing parameters. Depending upon the detected address domain, e.g., 1 or 2, the AD 16 bus couples signals having different timing characteristics to connector 154. By detecting, for example, whether address domain 1 or 2 is being accessed, the coprocessor 200 may select one of two sets of timing signals to couple to connected 154 and the AG 16 bus system. In this fashion, a game program can configure the video game system 50 to generate timing signals tailored to the memory media for which the game has been designed. Table 3 also shows an exemplary set of programmable parameters within a given address space, e.g., address domain 1. The concurrently filed copending application incorporated herein by reference shows further details concerning the coprocessor registers involved in programming the AD 16 bus in accordance with address domain as described above.

Further Security System Embodiments

Example Manufacturing Process To Match A Security Microprocessor Chip With a Video Game Program FIG. 15 shows an example process for manufacturing external storage units embodying security features. In this example process, the manufacturing facility customizes security microprocessor chips 152 to match particular video game programs. This customization allows the video game system main unit 52 to confirm, each time a video game is played, that the video game is being supplied by an external storage unit 54 including a security microprocessor chip 152 that has been matched for use with that particular video game or game title. Such matched pairing between video game titles and security microprocessor chips 152 can, for example, make it more difficult for someone to use a security microprocessor chip 152 from one external storage unit 54 with any game or game title other than the one stored in that same external storage unit.

In this FIG. 15 example, the facility that manufactures external storage unit 54 inserts a predetermined block 500 of program instructions and/or data into the video game program 502. This block 500 of program instructions and/or data may, for example, be inserted into the video game program 502 beginning at a predetermined location within the video game program. The block 500 may have a predetermined size.

In addition to inserting the block 500 into the video game program 502, the manufacturing facility uses a computation program 506 to transform or convert the block 500 into a corresponding authentication code ("A code") 508. Computation program 506 is shown for illustration purposes as a calculator, but preferably comprises a computer program performed using a general purpose computer such as a personal computer or any other computing device.

The transformation implemented by computation program 506 has the characteristic that it is difficult to reverse, i.e., it is difficult ("computationally infeasible") to compute or otherwise find another, different instruction/data block 500A that produces the same authentication code 506. Such transformations are commonly referred to as "one way hash" transformations or "cryptographic checksums." The particular one-way function used is not a part of this invention. There is a wealth of information available to those skilled in the art regarding suitable one-way transformations. See, for example, Schneier, Bruce, *Applied Cryptography*, Chapter 18 ("One Way Hash Functions"), pages 429–459 and associated bibliography (2d Ed., Wiley & Sons 1996).

In this particular embodiment, the authentication code 508 outputted by the transformation is much smaller than the instruction/data block 500 (i.e., the one-way function acts as a "compression" function). Those skilled in the art will understand that the length of authentication code 508 should be sufficient to minimize the threat of "brute force" attacks. Due to the information loss between the input and output of the one-way function, the one-way function cannot in this example be considered an "encryption"—since it is not possible to recover the original block 500 from the authentication code 508 even if the transformation can be reversed (as discussed above, the transformation in this example is preferably one-way, not reversible).

In the particular example process shown in FIG. 15, the computation program 506 defines a family of mathematical (or other) one-way transformations. An authentication key 504 is used to select a particular transformation from this family of transformations. FIG. 15 shows for illustration purposes only the authentication key 504 as being a physical key—but the key comprises a digital bit string. In this example, the authentication key 504 does not operate as an "encryption" key or "decryption" key, but instead is used to select which particular one-way transformation the computation program 506 performs.

The manufacturing facility selects a value for authentication key 504. The manufacturing facility stores the authentication code 508 resulting from the one-way function in the read only memory (ROM) of a security microprocessor chip 152. The manufacturing facility also stores, in this security microprocessor chip ROM, the authentication key 504 the manufacturing facility used to select the particular one-way transformation functions the computation program 506 used to generate the authentication code 508. The manufacturing facility also stores a security program in the security microprocessor chip ROM.

Because the security microprocessor chip stores the computed authentication code 508 corresponding to the instruction/data block 500 of game program 502, the security microprocessor chip 152 is matched to work with this particular game program. If the manufacturing facility inserts the same instruction/data block 500 into several different video game programs or titles, then the same security chip 152 can work with each of those video game programs or titles. On the other hand, video game programs having different instruction/data blocks 500 will require different security microprocessor chips 152 (and associated different authentication codes 508).

Figure 16B:
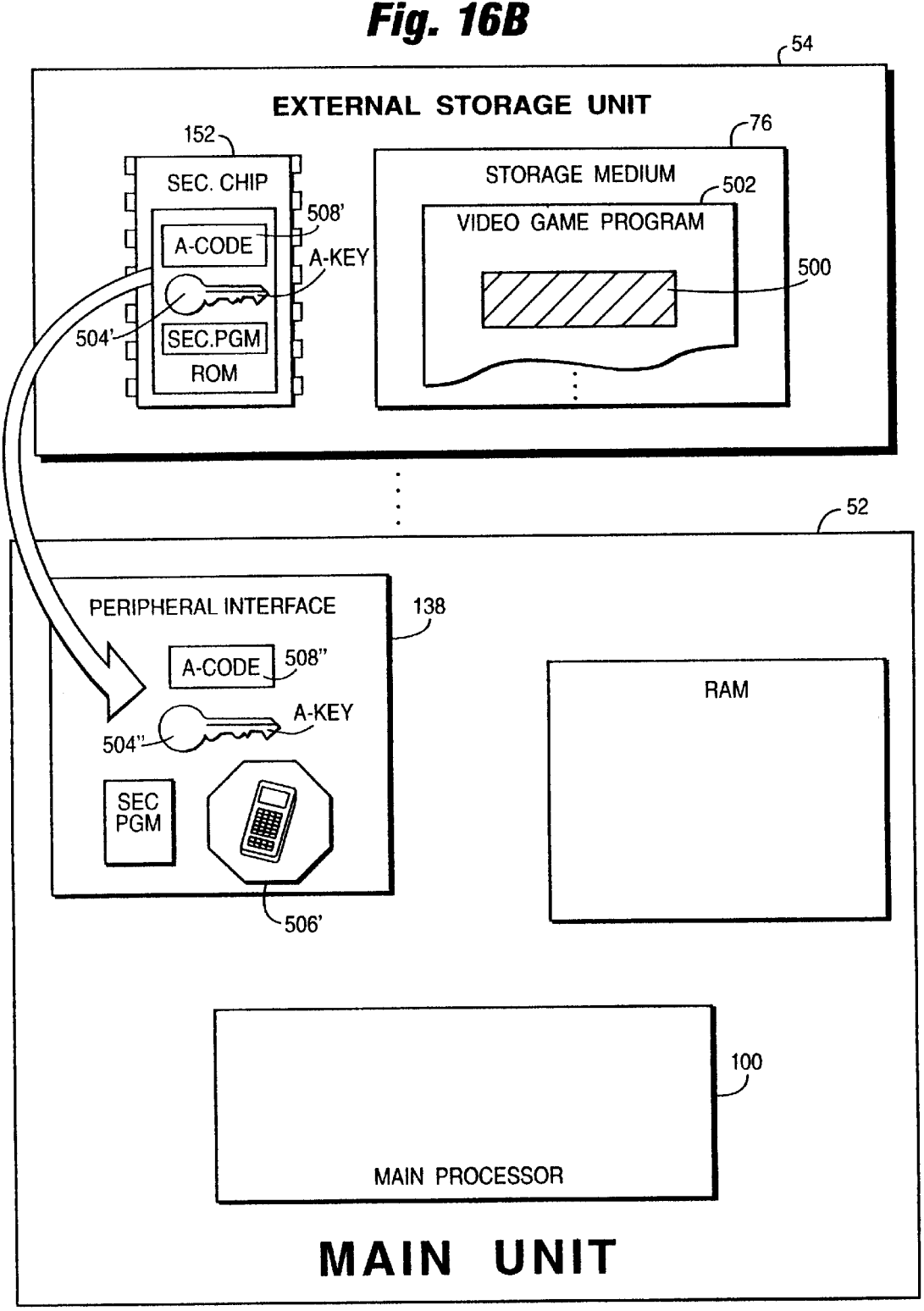

Example Embodiment to Test Whether The Video Game Program and External Storage Unit Security Microprocessor Chip Match FIGS. 16A–16F show an example embodiment of an overall video game security arrangement that tests whether the video game program and storage unit security microprocessor chip 152 match. As shown in FIG. 16A, an authentic external storage unit 54 includes: (a) a storage medium (e.g., a mask ROM or other data storage medium) 76 containing a video game program 502 with its included instruction/data block 500; and (b) a corresponding security microprocessor chip 152 containing the authentication key 504 used by the manufacturing facility, the authentication code 508 computed by the computation program 506 at the manufacturing facility, and a security program. In this example, the main unit 52 determines whether the security microprocessor chip 152 appropriately corresponds to the video game program before it allows the video game program 502 to play.

In this example, when the customer wants to play a particular video game, he or she connects the external storage unit 54 containing the desired video game program 502 and associated corresponding security microprocessor chip 152 to the main unit 52 (see FIG. 16A). Upon power-up, the external storage unit security microprocessor chip 152 sends the authentication key 504 and the authentication code 508 to the main unit peripheral interface 138 (see FIG. 16B). Details of an exemplary peripheral interface 138 are shown for example in FIGS. 3A and 7. The peripheral interface 138 sends the authentication key 504 to the main processor 100 (see FIG. 16C). However, in this example, the peripheral interface 138 retains the authentication code 508, and does not reveal it to the main processor 100.

Figure 16C:
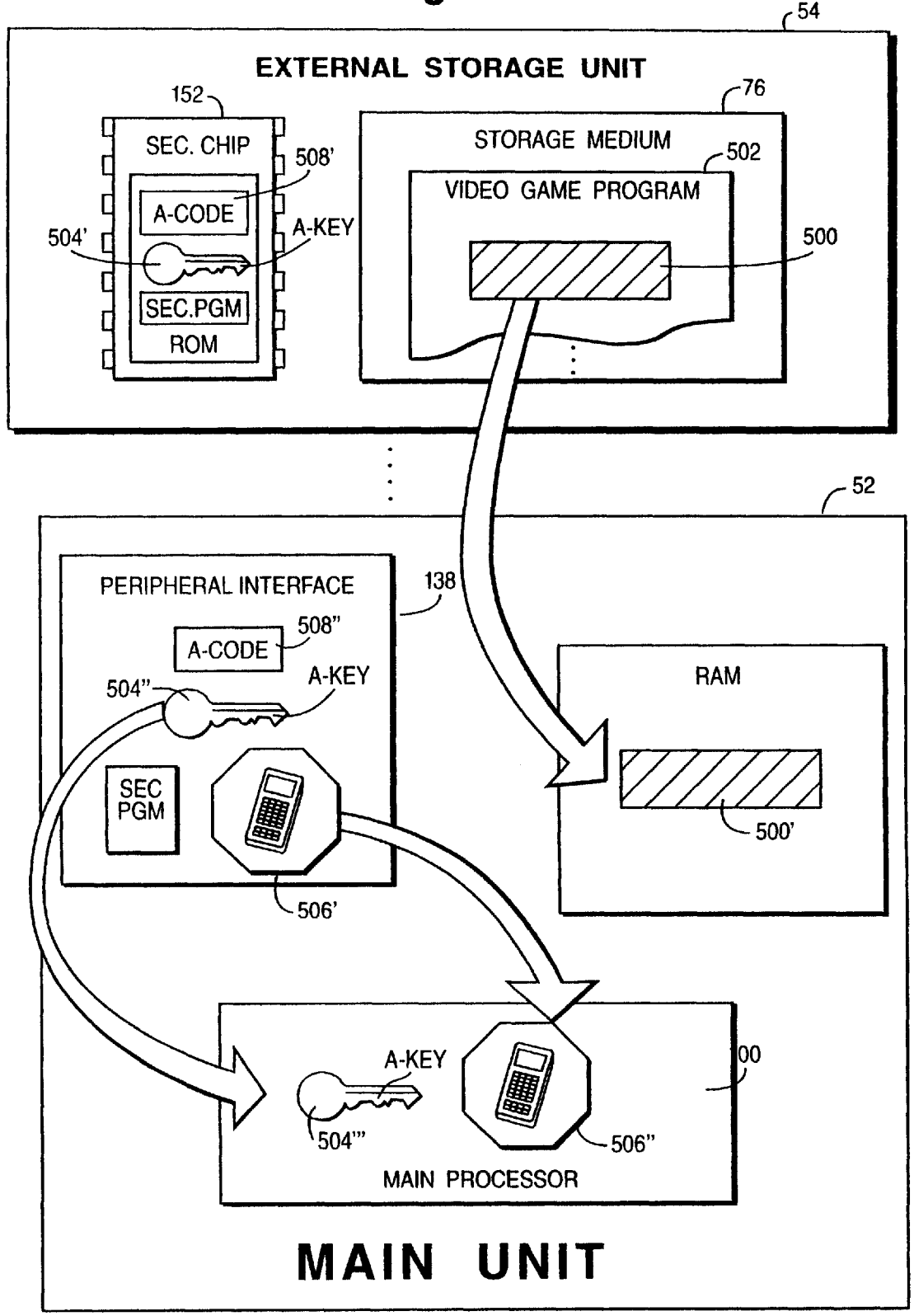

The peripheral interface 138 preferably already has a copy of the same computation program 506 (or another program capable of performing the same one-way transformation(s)) used at the manufacturing facility. The peripheral interface 138 may, in one example, include a boot ROM 262 (see FIG. 7) that stores this computation program 506. The computation program 506 is executed by the main processor 100 in this example. This computation program 506 may, for example, be executed out of boot ROM 262, or if execution speed is a concern, it may be loaded into a random access memory (RAM) accessible by the main processor 100 (for example a cache memory the main processor has read/write access to). The main processor 100 also loads the game program instruction/data block 500 from the external storage unit 54 into RAM (FIG. 16C). The computation program 506 may, for example, specify the location oand/or length of the program instruction/data block 500 within the overall video game program 502.

Figure 16D:
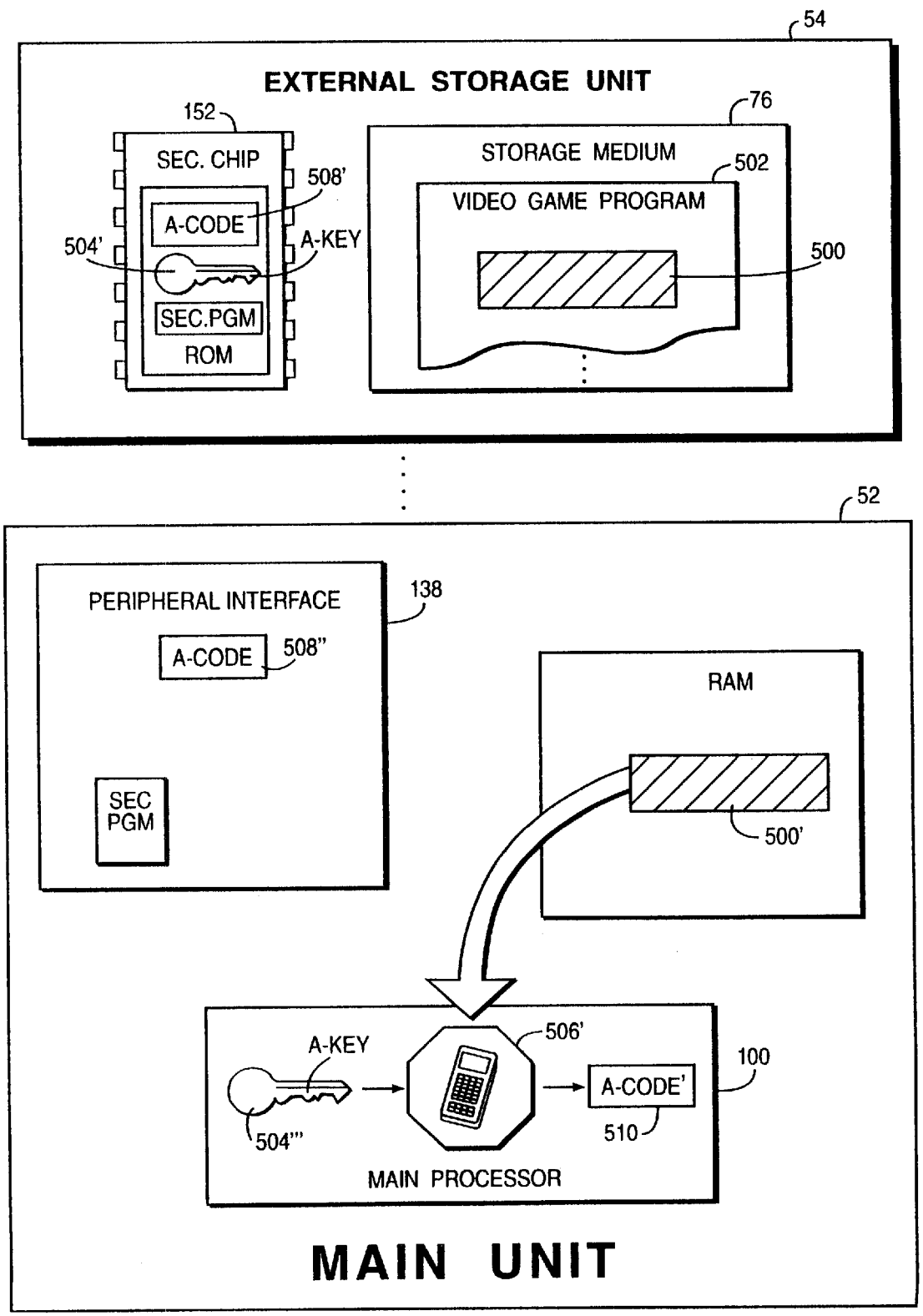

In this example, the main processor 100 performs exactly the same computation the manufacturing facility performed when it made the security microprocessor chip 152, based on the very same inputs (see FIG. 16D). Assuming the external storage unit 54 is authentic, the main processor 100 has the same computation program 506 and authentication key 504 used at the manufacturing facility, and can therefore perform the same one-way transformation the manufacturing facility performed. The main processor 100 also has the same video game program instruction/data block 500 the manufacturing facility used as input to the one-way transformation. The main processor 100 should therefore get the same authentication code result as the manufacturing facility got (or one that bears a predetermined relationship with the authentication code the manufacturing facility calculated). If the result is different (e.g., does not bear a predetermined relationship), the main unit 52 does not execute the video game program 502.

In more detail, the main processor 100 in this example uses authentication key 504 to select a particular one-way function from a family of functions defined by the computation program 506. Main processor 100 executes the computation program 506 to convert the video game program instruction/data block 500 to an authentication code 510 ("A-code'")(FIG. 16D). Assuming the external storage unit 54 is authentic, the authentication code "A-code'" 510 the main processor 100 computes will be identical to (or bear a predetermined relationship with) the authentication code "A-code" 508 the manufacturing facility computed when the security microprocessor chip 152 was manufactured. The two values should be the same in this particular example because: (a) the A-key 504 the security microprocessor chip 152 supplies to the main processor 100 is the same one used at manufacture time; and (b) the instruction/data block 500 input is the same one used at time of manufacturing; and (c) the one-way function the main processor performs is the same one the manufacturing facility used to compute the authentication code 504 stored in the security microprocessor chip 152.

Figure 16E:
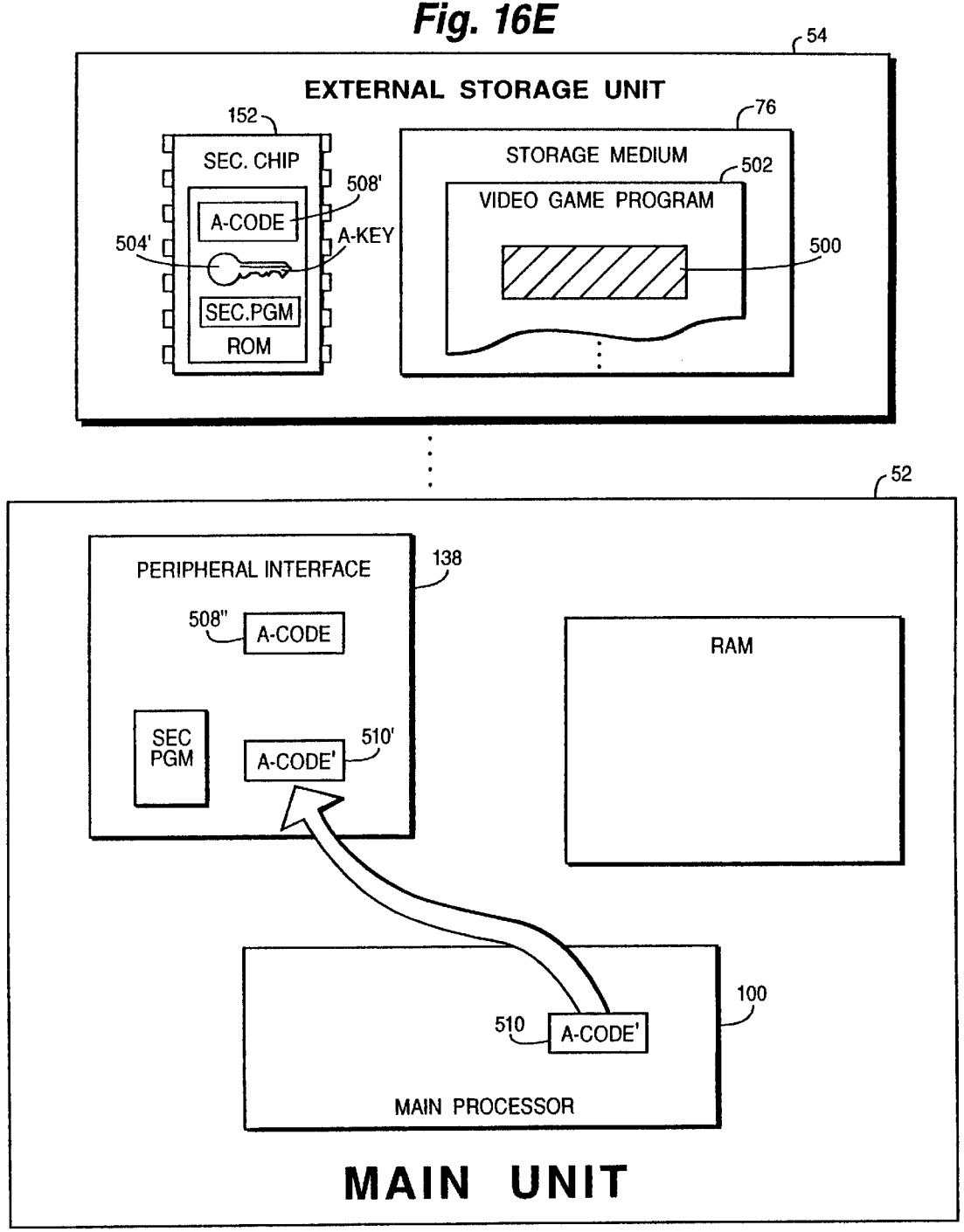

In this example, the main processor 100 sends the authentication code "A-code'" 510 it has calculated to the peripheral interface 138 (FIG. 16E). The peripheral interface 138 can be trusted to accurately compare the authentication code "A-code'" 510 supplied by the main processor 100 with the authentication code "A-code" 508 supplied by the security microprocessor chip 152 (FIG. 16E). If the two authentication codes are the same (or, in another example, if they bear a predetermined relationship to one another), the peripheral interface 138 is satisfied that the external storage unit's security microprocessor chip 152 matches at least block 500 within the video game program 502, and the peripheral interface 138 issues a "go" signal.

If there is no match (or predetermined relationship) between the two authentication codes 508, 510, this means the external storage unit 54 is not authentic For example, if there is no match, someone may be trying a "decoy" attack in which the security microprocessor chip 152 is being used with a different (unmatched) video game program. For example, the video game player may be using a "y" adapter to simultaneously connect, to the main unit 52, a security microprocessor chip 152 from an authentic external storage unit 54 and a bogus storage medium 76 having no (or a different) associated security microprocessor chip. In this example, the peripheral interface 138 will detect this situation and prevent the main unit 52 from playing the video game program. For example, the peripheral interface may reset or interrupt the main processor 100 and other components (e.g., the graphics coprocessor) to prevent the main unit from operating in this instance. See FIGS. 3A–3B and associated discussion concerning details of system "reset" and "NMI" operation.

Example Embodiment to Further Test Whether The Video Game Program is Authentic

Figure 17:
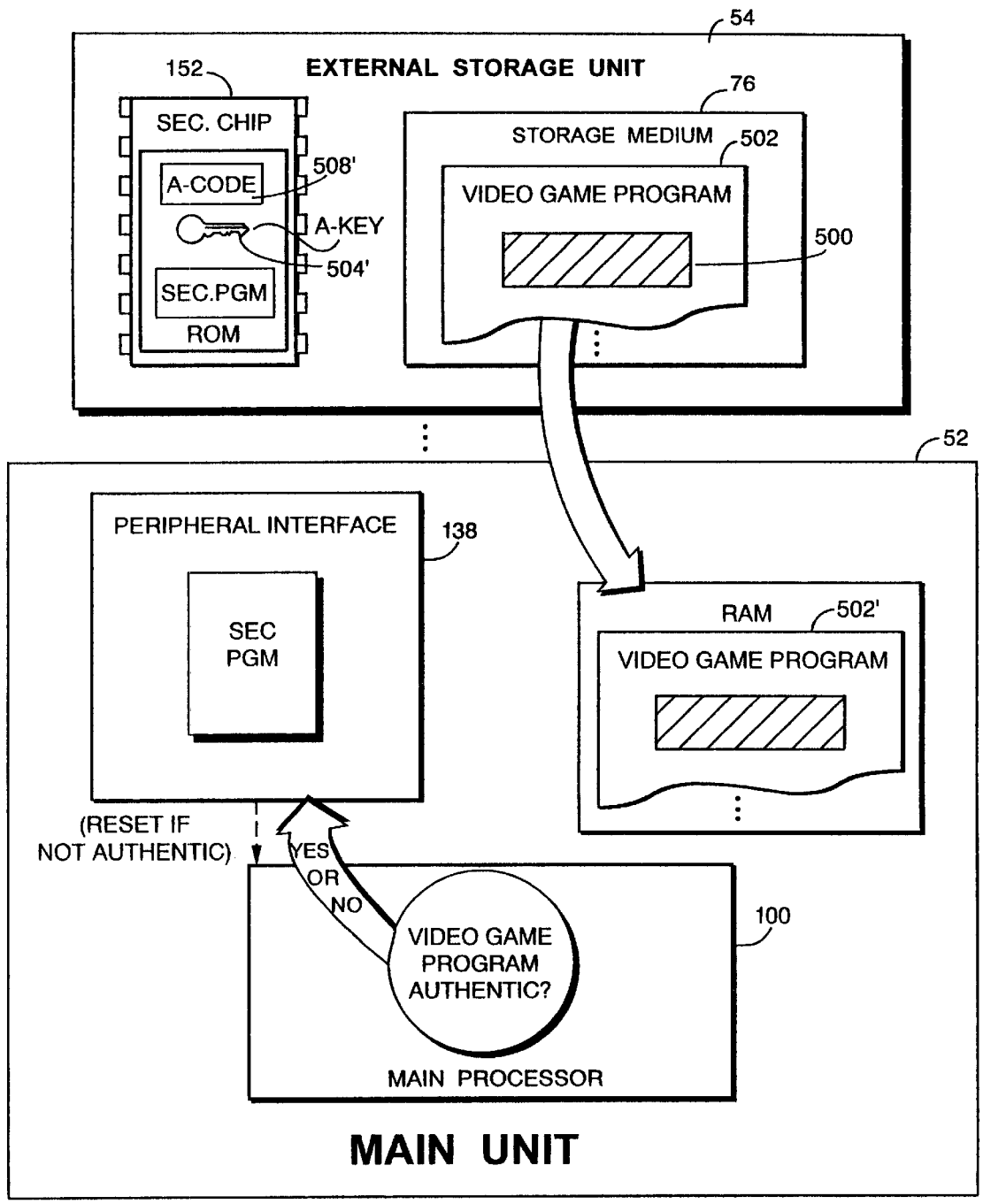
FIG. 17 shows an additional video game security arrangement embodiment.

The embodiment shown in FIG. 17 may provide additional methods to enforce the security level. In this FIG. 17 embodiment, the main unit 52 authenticates some or all additional portions of the video game program. In our example, main unit 52 may use a software-based authentication mechanism to perform this authentication step.

In one example arrangement, the peripheral interface 138 may execute, using its own internal microprocessor 250 and ROM 252 (see FIG. 7), a software authentication program to authenticate the video game program. In another example arrangement, the peripheral interface 138 may supply a software authentication program from boot ROM 262 to the main processor 100 for execution. In still another example arrangement, the video game program 502 may be self-authenticating in the sense that one part of the program authenticates another part (or the rest of) the video game program. For example, it is well known that the one-way function and associated comparisons of the type shown in FIGS. 16A–16F can be used to authenticate (and perform an integrity check on) the instruction/data block 500. Once such an authentication/integrity check has been completed on instruction/data block 500, the main processor 100 may then execute that block 500 to authenticate some or all additional portions of the video game program 502.

The particular algorithm or steps used to authenticate the video game program 502 is not a part of this invention. Those skilled in the art are aware of many different techniques for authenticating computer software. Different techniques or combinations of techniques can be used for different video games or game titles. One or more techniques may be chosen based on a variety of different factors including for example: the length of the video game program; the amount of time available for video game program authentication (generally, delay before starting game play should be minimized, consistent with security concerns, so the customer doesn't have to wait a long time before game play begins); the amount of storage space available in the storage medium 76 to store authentication procedures; whether the authentication should be performed a single time, more than once or repeatedly; the level of security required or desired; etc. By way of non-limiting example, the following are some of the many techniques known by those skilled in the art for authenticating software:

Confirming the presence of one or more predetermined codes hidden in predetermined places within the software;

Performing one or more one-way functions on some or all of the software, and comparing the one-way function results with results calculated beforehand at time of manufacture.

Decrypting software instructions and/or data using a symmetric or asymmetric key, and confirming that the decryption results are intelligible, executable and/or match values determined at time of manufacturing.

Using a symmetric or asymmetric key, decrypting one or more encrypted hash values embedded within the software, and confirming that the decrypted hash value(s) match corresponding hash value(s) calculated at run time based on predetermined portions (or the entirety) of the video game program.

Authenticating one or more digital certificates present within the software.

Techniques described in commonly assigned U.S. Pat. No. 5,134,391.

Example Embodiment to Test Whether The Security Microprocessor Chip is Authentic The embodiment of FIGS. 16A–16F could potentially be defeated by replacing the security microprocessor chip 152 with a non-authentic component that supplies the correct authentication code 508 and authentication key 504. To guard against this threat, the FIG. 18 video game security system embodiment can require the component that supplies the authentication code 508 and authentication key 504 to also conduct an endless series of data exchanges with peripheral interface 138. The embodiment shown in FIG. 18 allows the peripheral interface 138 to authenticate the external storage unit security microprocessor chip 152, and can also allow the external storage unit 54 to authenticate the main unit peripheral interface 138.

The data exchanges between the external storage unit security microprocessor chip 152 and the peripheral interface 138 may be based on security programs stored in the security microprocessor chip 152 and in the peripheral interface 138. Each of these security programs may perform calculations based on secret, complex algorithms that are difficult to ascertain merely by observing inputs and outputs. The calculations are not a part of this invention. Those skilled in the art will understand that any sufficiently complex, deterministic data transformation process can be used.

The operation of these security programs may be similar or identical to what is described in commonly-assigned U.S. Pat. No. 4,799,635 to Nakagawa. For example:

(1) the main unit peripheral interface 138 and the external storage unit security microprocessor chip 152 may each synchronously calculate values using a secret, complex algorithm, (2) the main unit peripheral interface 138 and the external storage unit security microprocessor chip 152 may each send some or all of their calculated values to the other chip exactly at the time the other chip expects to receive the values, (3) the main unit peripheral interface 138 and the external storage unit security microprocessor chip 152 may each receive, at exactly the right time, the values the other chip sends to it, (4) the main unit peripheral interface 138 and the external storage unit security microprocessor chip 152 may each compare the values they received with the value(s) they calculated internally, (5) the main unit peripheral interface 138 and the external storage unit security microprocessor chip 152 may each enter an "endless loop" (thus ending the "conversation") if the comparison is unfavorable—with the main unit peripheral interface 138 endless loop periodically disabling the main processor 100.

(6) the ongoing "conversation" between the peripheral interface 138 and the external storage unit security microprocessor chip 152 can be repeated over and over again—with the internal calculations based on new data calculated from the last "round" of calculations used to generate new values for the next data exchange. The time of each calculation can depend on the results of that "round" of the calculation to provide variable timing between data exchanges.

Further Embodiment

FIG. 19 is a simplified flowchart of a further embodiment of example security steps performed by main processor 100. These steps may be performed by one or more computer programs the main processor 100 executes. The coding details of such computer programs is not a part of this invention.

Upon power on (FIG. 19, block 702), main processor 100 executes an "IPL1" initialization routine that initializes the main processor 100 (FIG. 19, block 704) and the graphics coprocessor 200 (FIG. 19, block 706). For example, these steps may provide a minimal amount of initialization (e.g., set the main processor 100 to 16 or 32 bit operation) to get these components running. The "IPL1" instructions may be stored within the peripheral interface boot ROM 262, and executed by the main processor out of that boot ROM.

Main processor 100 then begins to execute an "IPL2" routine. The IPL2 routine may also, in this example, be stored by the peripheral interface boot ROM 262. In one example, main processor 100 may execute the IPL2 routine from the boot ROM 262. It may be desirable to load the IPL2 routine into a RAM before executing it in order to increase execution speed. For example, in one example, there are several different cache RAMs in the main processor 100's address space. These cache RAMs may, for example, be within the main processor 100 and/or the graphics coprocessor 200. One of these cache RAMs can be used to store the IPL2 routine during execution. As well known to people skilled in the art, these techniques may be used in combination with any number of different additional techniques to provide added tamper-resistance and/or security against unauthorized access to the security software executing in the main unit. See for example the following documents describing techniques known to those skilled in the art: White et al, "ABYSS: A Trusted Architecture For Software Protection" and references cited therein (IEEE 1987); Tygar et al, "Dyad: A System For Using Physically Secure Coprocessors" and references cited therein (CMU-CS-91-140R, Carnegie-Mellon University 1991); U.S. Pat. No. 5,537,544; U.S. Pat. No. 5,533,123; and U.S. Pat. No. 5,237,616.

Main processor 100 receives the authentication key 504 from peripheral interface 138—the peripheral interface having previously received it from the external memory unit security microprocessor chip 152 (FIG. 19, block 708; see FIGS. 16B, 16C). The peripheral interface 138 may also send the main processor 100 additional information at this time, including for example information indicating whether the external storage media 76 is a mask ROM or a bulk storage device.

The main processor 100 loads the instruction/data block 500 (which in this example contains "IPL3" instructions) of a predetermined length from a predetermined location within the external storage medium 76. The main processor 100 may load block 500 into a RAM accessible by the main processor, for example the same or different cache RAM storing the IPL2 instructions (FIG. 19, block 710; see FIG. 16C). Main processor 100 then performs a one-way function on the "IPL3" instruction/data block 500 using the authentication key 504 in order to generate an authentication code 510 about the "IPL3" data block 500 (FIG. 19, block 712; see FIG. 16D). Main processor 100 then sends the authentication code 510 it has calculated to the peripheral interface 138 via serial interface RAM 264 (FIG. 19, block 714; see FIG. 16E and FIG. 7).

Figure 16F:
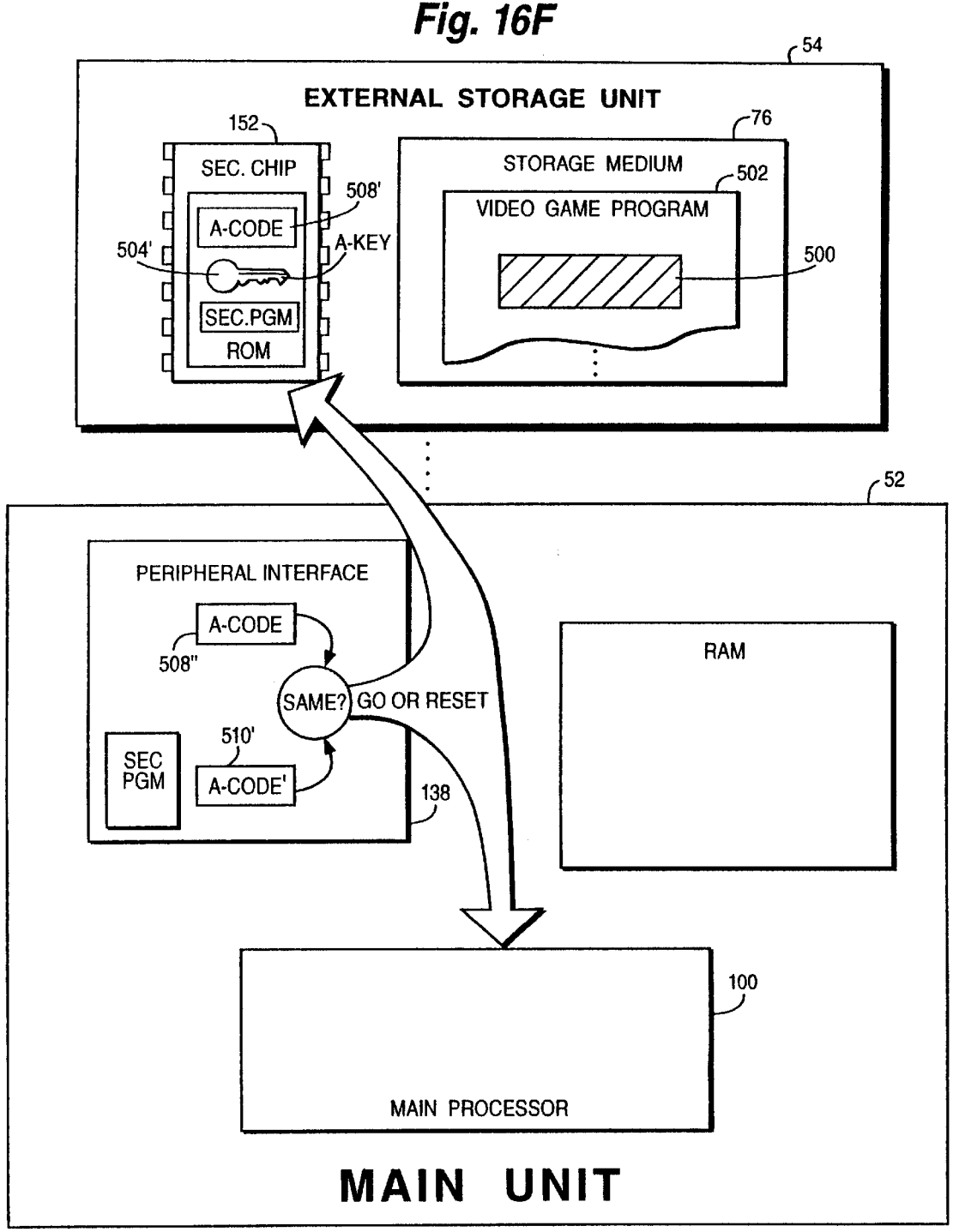
Figure 20A:
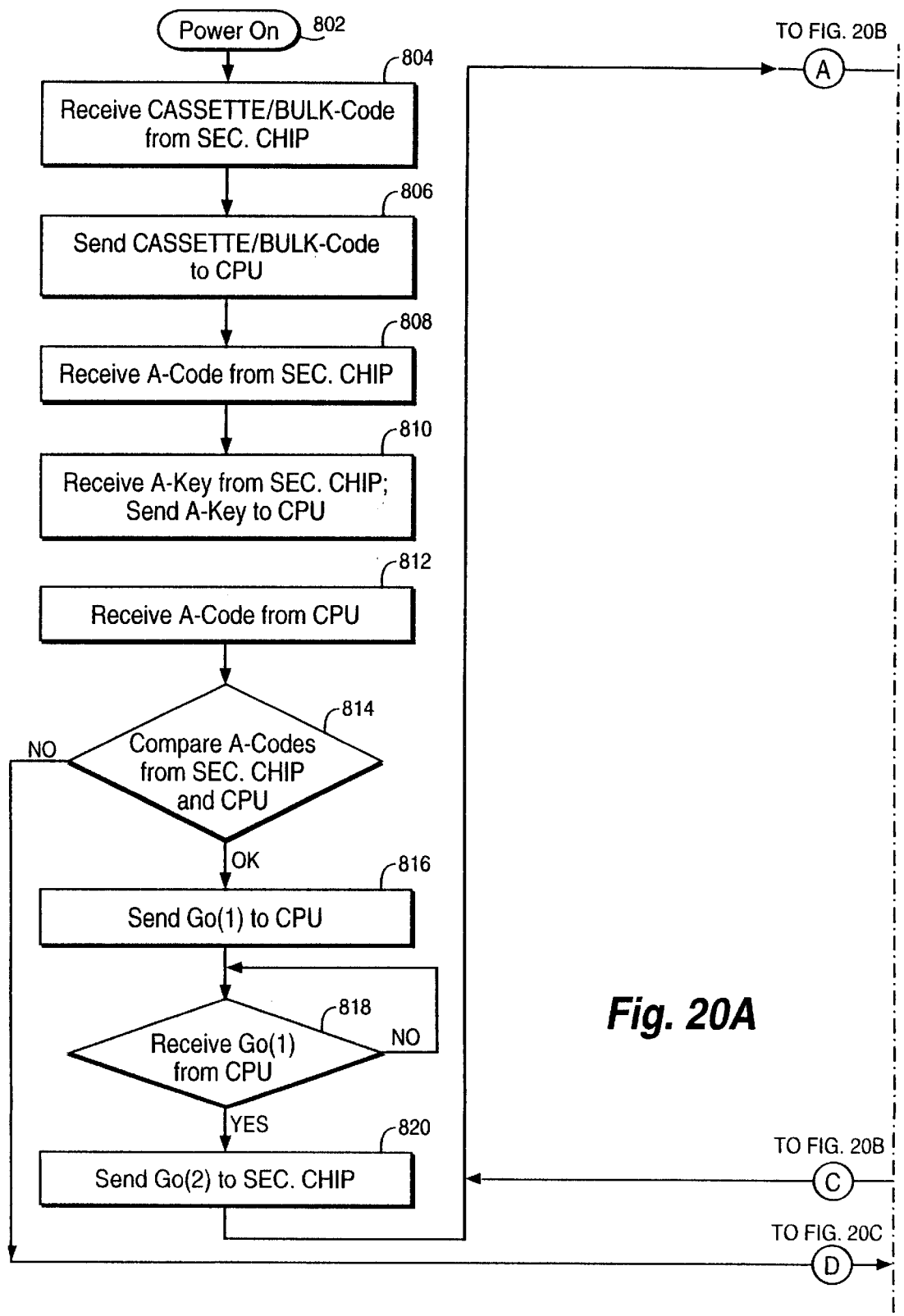

As described above, the peripheral interface compares the authentication code 510 the main processor 100 calculates with an authentication code 508 the external storage unit security microprocessor chip 152 supplies to the peripheral interface, to determine whether there is a match (see FIG. 16F; FIG. 20A, blocks 812–814). In this example, if there is no match, the peripheral interface 138 sends a reset or NMI (non-maskable interrupt) signal to the main processor 100—preventing it from proceeding. During the time the peripheral interface 138 is making its comparison, the main processor 100 waits and occasionally polls the peripheral interface (FIG. 19, block 716). Upon receiving a "go" signal from the peripheral interface 138, the main processor 100 begins executing the "IPL3" instruction/data block 500 (FIG. 19, block 718).

As part of the "IPL3" routine, the main processor loads some (e.g., a fixed length predetermined block) or all of the video game program from the external storage medium 76 into RAM 300 (FIG. 19, block 720). Main processor 100 authenticates the game program using a software authentication technique (FIG. 19, block 722; see FIGS. 17 and 17A). Because the peripheral interface 138 verified the IPL3 instruction/data block 500, the IPL3 block may be trusted to perform this further game program authentication. If the authentication step fails, main processor 100 stops operating and game play never begins. If the game program authentication step is successful, main processor 100 sends a "go" signal to the peripheral interface 138 (see FIGS. 17 and 17A), performs housekeeping functions (e.g., to clean away no longer need information in the various RAMs and registers), jumps to the game program in RAM (FIG. 19, block 724), and begins executing the game program (FIG. 19, block 726). Meanwhile, in response to the "go" signal the peripheral interface 138 receives from the main processor 100, the peripheral interface begins data exchange communications with the external storage unit security microprocessor chip 152 (FIG. 19, block 726).

Figure 20B:
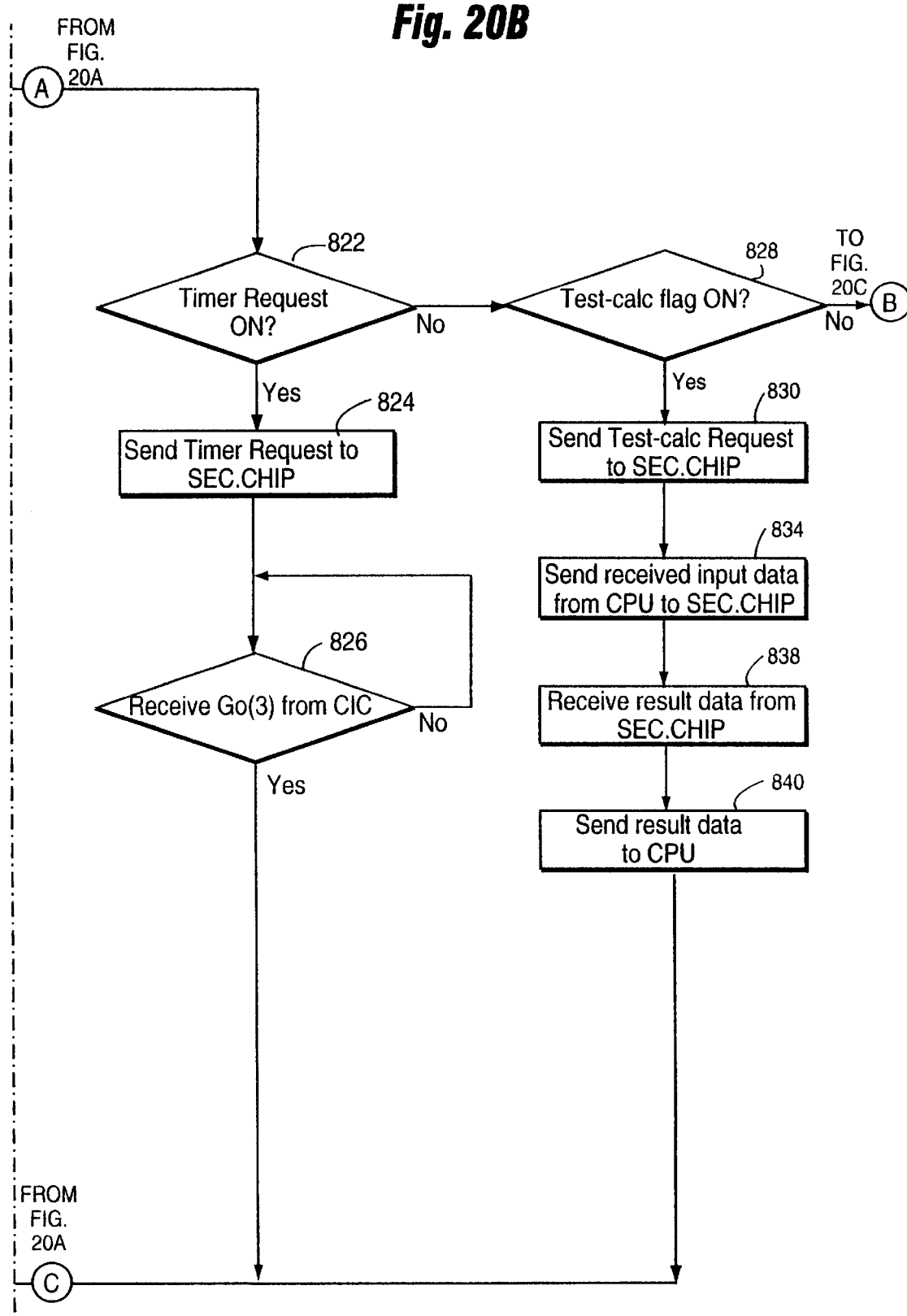
Figure 21:
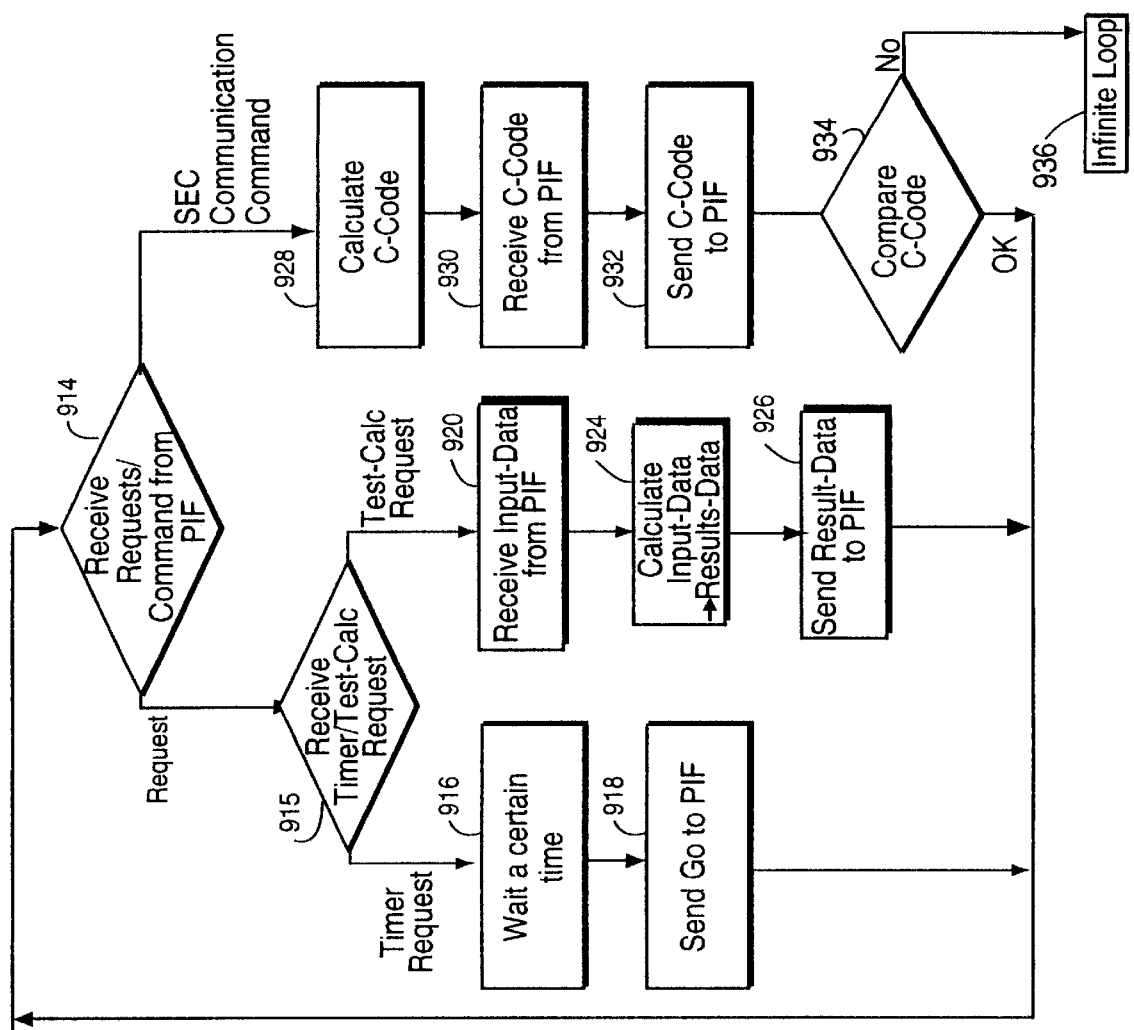
FIG. 21 is a simplified flowchart of a further embodiment of exmaple security steps performed by a video game security chip.

FIGS. 20A and 20B show example steps performed by the peripheral interface 138 in this example embodiment, and FIG. 21 shows example steps performed by the external storage unit security microprocessor chip 152. The steps shown in FIGS. 20A and 20B may be performed by a computer program the peripheral interface CPU 250 executes, and the steps shown in FIG. 21 may be performed by a computer program the external storage unit security microprocessor chip 152 executes. The coding details of such computer programs is not a part of this invention.

Referring to FIG. 20A, upon power on (FIG. 20A, block 802), the peripheral interface 138 receives a cassette/bulk code from the external storage unit security microprocessor 152 (see FIG. 21, blocks 904, 906, 908), and sends that code to the main processor 100 (FIG. 20A, blocks 804, 806). The external storage unit security microprocessor chip 152 then sends to the peripheral interface 138, and the peripheral interface receives, the authentication code 508 from the external storage unit security microprocessor chip 152 (FIG. 20A, block 808; FIG. 21, block 910). The external security microprocessor chip 152 also sends to the peripheral interface 138, and the peripheral interface receives, an authentication key 504 (FIG. 21, block 911; FIG. 20A, block 810). Peripheral interface 138 passes this A-key 504 along to the main processor 100 (FIG. 20A, block 810).

The peripheral interface 138 then receives the authentication code 510 calculated by the main processor 100 in FIG. 19, block 712 (FIG. 20A, block 812), and compares the authentication codes 508, 510 received from the external storage unit security microprocessor chip 152 and the main processor, respectively (FIG. 20A, block 814). If these two authentication codes do not match, the peripheral interface 138 enters an infinite loop (FIG. 20C, block 890). If there is a match, the peripheral interface 138 sends a "go" signal to the main processor (FIG. 20A, block 816), and waits to receive a "go" signal from the main processor upon the main processor's completion of the game program authentication step (FIG. 20A, block 818; see FIG. 19, block 722). Upon receiving the "go" signal from main processor 100 ("yes" exit to decision block 818, FIG. 20A), peripheral interface 138 sends a "go" signal to the external storage unit security microprocessor chip 152 (FIG. 20A, block 820; FIG. 21, block 912). This "go" signal synchronizes the peripheral interface 138 and the security microprocessor chip 152.

Figure 18:
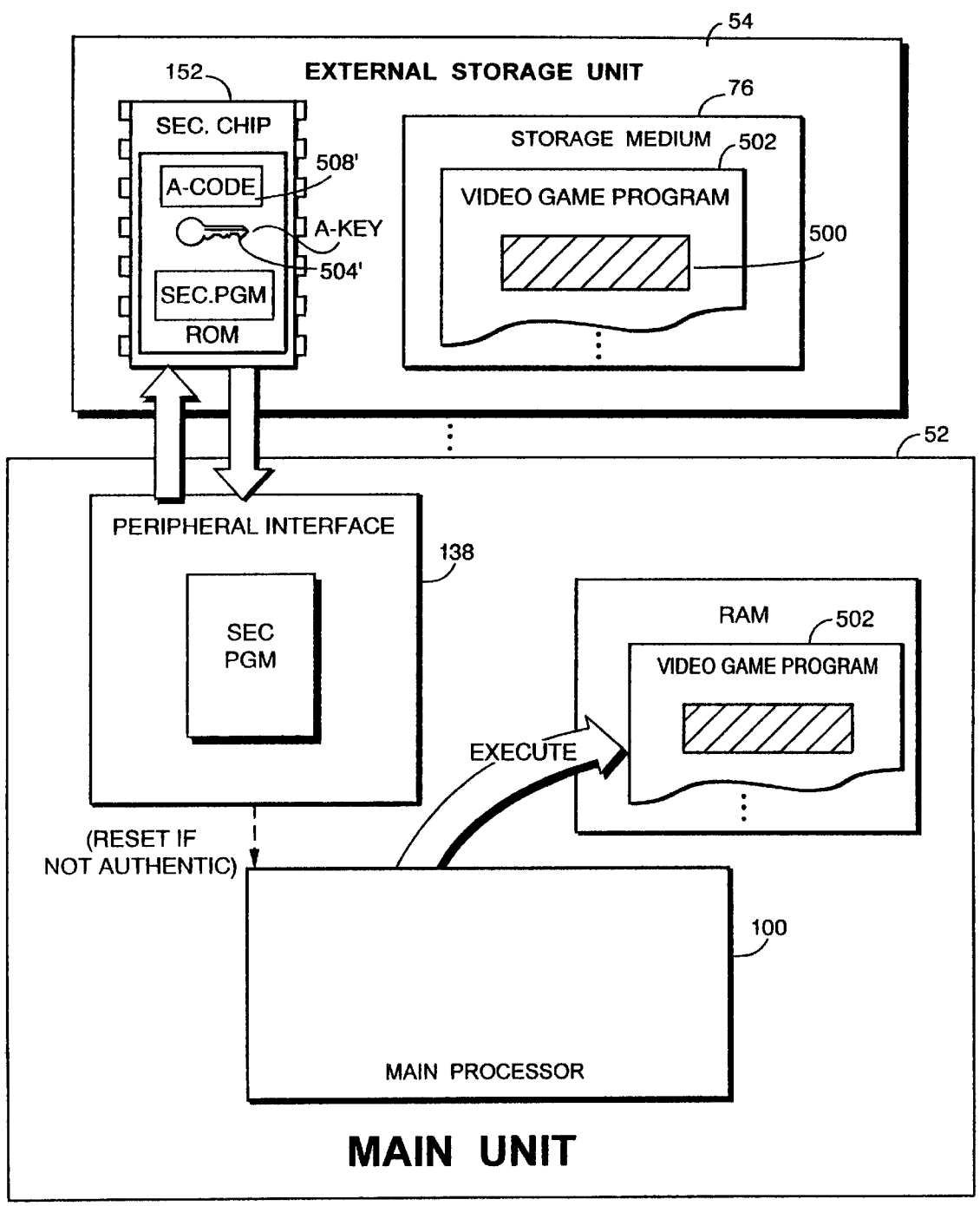
FIG. 18 shows a still additional video game security arrangement embodiment.

Once synchronization has been established, the peripheral interface 138 and external storage unit security microprocessor chip 152 begin communicating (see FIG. 18). In this example, the peripheral interface 138 and external storage unit security microprocessor chip 152 can communicate requests and commands as well as data. The peripheral interface 138 can send two different requests and a command to the external storage unit security microprocessor chip 152:

a timer request, a test-calc request, an SEC communication command.

The timer request causes the external storage unit security microprocessor chip 152 to wait a certain time period and then send a "go" signal to the peripheral interface 138. The test-calc request causes the external storage unit security microprocessor chip 152 to receive data from the peripheral interface 138, transform the data, and return the transformed data to the peripheral interface. The SEC communication command causes the external storage unit security microprocessor 152 to calculate a value based on an internal calculation, receive a value from the peripheral interface 138, send the calculated value to the peripheral interface, and compare the value it received from the peripheral interface with the value it has calculated internally (the values exchanged in the different directions are different to avoid a "play back" attack).

In this example, the peripheral interface 138 then determines whether the system "reset" signal is on (FIG. 20B, block 822). If the reset signal is on ("yes" exit to decision block 822), peripheral interface 138 sends a timer request to the external storage unit security microprocessor chip 152 (FIG. 20B, block 824). The peripheral interface 138 then waits to receive a responsive "go" signal from the external storage unit security microprocessor chip 152 (FIG. 20B, block 826). Meanwhile, in response to the received "timer" request, the external storage unit security microprocessor chip 152 waits a certain time period and then sends a "go" to the peripheral interface 138.

If the "test-calc" flag has been set (FIG. 20B, decision block 828), the peripheral interface 138 sends a "test-calc" request to the external storage unit security microprocessor chip 152 (FIG. 20B, block 830). The peripheral interface 138 then receives input data from main processor and sends that data to the external storage unit security microprocessor chip 152 (FIG. 20B, block 834). In response to the "test-calc" request, the external storage unit security microprocessor chip 152 receives the input data from the peripheral interface 138 (FIG. 21, block 920), transforms that input data into a result data (FIG. 21, block 924), and sends the result data back to the peripheral interface 138 (FIG. 21, block 926). The particular transformation used to calculate the data is not a part of this invention; any suitable calculating function can be used. The peripheral interface 138 receives the result data from the external storage unit security microprocessor chip 152 (FIG. 20B, block 838), and sends the result data to the main processor 100 (FIG. 20B, block 840). This test-calc operation may be used to allow the video game program 502 to authenticate the external storage unit security microprocessor chip 152. For example, the game program 502 can determine whether chip 152 performs a authentic transformation to calculate the data the game program provides.

If the test-calc flag is not on (FIG. 20B, block 828, "no" exit), then the peripheral interface 138 sends an "SEC communication" to the external storage unit security microprocessor chip 152 (FIG. 20C, block 842). In response to this SEC communicaiton, the peripheral interface 138 and the external storage unit security microprocessor chip 152 each perform the steps described in the above-referenced Nakagawa patents. Specifically, they each calculate an internal code (FIG. 20C, block 844; FIG. 21, block 928); they each send a part of the code they have calculated to the other (FIG. 20C, block 846; FIG. 21, block 932); they each receive the information sent by the other (FIG. 20C, block 848; FIG. 21, block 930); and they each compare the information they have received with information they have calculated internally (FIG. 20C, block 850; FIG. 21, block 934). If either the peripheral interface 138 or the external storage unit security microprocessor chip 152 fails to receive the information it expects to receive, the device enters an infinite loop (FIG. 20C, block 890; FIG. 21, block 936). Whenever the peripheral interface 138 enters an endless or infinite loop, it sends a "reset" or non-maskable interrupt to the main processor 100 to prevent game play from proceeding (FIG. 20C, block 890).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A video game system comprising:
    an external memory for storing a video game program,
    a game microprocessor for executing said video game program,
    at least one player controller operable by a player for generating video game control signals,
    a coprocessor, coupled to said game microprocessor, for cooperating with said game microprocessor to execute said video game program, said coprocessor being operable to generate at least one player controller related command requesting an operation be performed relating to said video game control signals generated by said at least one player controller;
    a peripheral processing memory device for storing a first set of instructions for controlling the performance of said operation relating to said video game control signals identified by said player controller related command, and a second set of instructions for authenticating said external memory; and
    a further microprocessor for executing said first set of instructions and said second set of instructions.

2. A video game system comprising:
    a main processor;
    a 3D graphics coprocessor;
    a peripheral interface coupled to at least one of the main processor and the 3D graphics coprocessor; and
    a connector adapted, in use, for accepting an external storage unit, the storage unit including video game program that controls at least one of the main processor and the 3D graphics coprocessor to generate video-graphics and sound,
    wherein the peripheral interface includes a structure that at least in part authenticates the video game program, and
    wherein the main processor performs a calculation based at least in part on the video game program, and provides the output of the calculation to the peripheral interface.

3. A video game system comprising:
    a main processor;
    a 3D graphics coprocessor;
    a peripheral interface coupled to at least one of the main processor and the 3D graphics coprocessor; and
    a connector adapted, in uses for accepting an external storage unit, the storage unit including video game program that controls at least one of the main processor and the 3D graphics coprocessor to generate video-graphics and sound,
    wherein the peripheral interface includes a structure that at least in part authenticates the video game program, and
    wherein the external storage unit includes a security microprocessor that stores a calculation result, and the peripheral interface obtains the stored calculation result from the security microprocessor and compares the obtained calculation result with the result of the calculation performed by the main processor.

4. An external storage unit for use with a video game system of the type comprising a main processor, a 3D graphics coprocessor, a peripheral interface coupled to at least one of the main processor and the 3D graphics coprocessor, and a connector adapted, in use, for accepting an external storage unit, the storage unit including:
    a storage medium that stores a video game program for, in use, controlling at least one of the main processor and the 3D graphics coprocessor to generate video-graphics and sound, and
    a security microprocessor that stores at least one authentication value corresponding to the video game program, the security microprocessor also storing a security program, the security microprocessor, in use, providing the authentication value to the main processor and repeatedly providing security data to the peripheral interface for authentication purposes.

5. An external storage unit for use with a video game system of the type comprising a main processor, a 3D graphics coprocessor, a peripheral interface coupled to at least one of the main processor and the 3D graphics coprocessor, and a connector adapted, in use, for accepting an external storage unit, the storage unit including:

a storage medium that stores a video game program for, in use, controlling at least one of the main processor and the 3D graphics coprocessor to generate videographics and sound, and a security microprocessor, wherein the video game program stored within the storage medium includes at least a first portion used to authenticate at least a second portion of the video game program, and the security microprocessor includes information for, in use, authenticating the video game program first portion.

6. An external storage unit for use with a video game system of the type comprising a main processor, a 3D graphics coprocessor, a peripheral interface coupled to at least one of the main processor and the 3D graphics coprocessor, and a connector adapted, in use, for accepting an external storage unit, the storage unit including:

a storage medium that stores a video game program for, in use, controlling at least one of the main processor and the 3D graphics coprocessor to generate videographics and sound, and a security microprocessor for, in use, receiving requests and commands from the peripheral interface, said requests and commands including at least a timer request, a test-calc request, and a secure communication command.

7. An external storage unit as in claim 6 wherein the security microprocessor, in use, waits a certain time period and then sends a go signal to the peripheral interface upon receipt of the timer request.

8. An external storage unit as in claim 6 wherein the security microprocessor, in use, receives data from the peripheral interface, transforms the received data, and returns the transformed data to the peripheral interface upon receipt of the test-calc request.

9. An external storage unit as in claim 6 wherein the security microprocessor, in use upon receipt of the secure communication command, calculates a value based on an internal calculation, receivs a value from the peripheral interface, sends the calculated value to the peripheral interface, and compares it received from the peripheral interface with the value it has calculated internally.

10. In a video game system for use with an external storage unit including a security chip and a storage medium, the storage medium storing a video game program, the video game system including a peripheral interface for, in use, communicating with the external storage unit security chip, the peripheral interface performing the following steps:

(a) authenticating at least one of the security chip and the storage medium;

(b) securely confirming a match between the security chip and the storage medium; and (c) disabling the video game system from operating upon failure of either step (a) and step (b).

11. A method as in claim 10 wherein step (a) includes comparing an authentication code supplied by the security chip with a code derived from the video game program.

12. A method as in claim 10 wherein step (a) includes checking data transmitted by the security chip with internally calculated data.

13. A method as in claim 10 wherein step (b) includes the step of performing a one-way transformation on at least a portion of the video game program.

14. A method as in claim 16 wherein step (b) includes the step of comparing at least one element derived from the video game program with at least one element derived from the security chip.

15. In a video game system for use with an external storage unit including a security chip and a storage medium, the storage medium storing a video game program, the video game system including a main processor and a peripheral interface for, in use, communicating with the external storage unit security chip, the video game system performing the following steps:

(a) using the peripheral interface to authenticate the security chip;

(b) using a combination of the peripheral interface and the main processor to authenticate a first part of the video game program; and (c) using the main processor to authenticate a further part of the video game program.

16. A method as in claim 15 wherein step (c) includes using the first part of the video game program to authenticate the future part.

* * * * *